US011021243B1

(12) United States Patent
Finnell

(10) Patent No.: US 11,021,243 B1
(45) Date of Patent: Jun. 1, 2021

(54) TENSION AIRFOIL ASSEMBLY AND IMPLEMENTATION FOR POWER GENERATION AND AVIATION

(71) Applicant: Alfred Finnell, Lake Worth, FL (US)

(72) Inventor: Alfred Finnell, Lake Worth, FL (US)

(*) Notice: Subject to any disclaimer, the term of this patent is extended or adjusted under 35 U.S.C. 154(b) by 40 days.

(21) Appl. No.: 16/595,428

(22) Filed: Oct. 7, 2019

Related U.S. Application Data

(63) Continuation-in-part of application No. 15/469,542, filed on Mar. 26, 2017, now Pat. No. 10,435,145, which is a continuation-in-part of application No. 14/204,931, filed on Mar. 11, 2014, now Pat. No. 10,443,569, which is a continuation-in-part of application No. 12/825,857, filed on Jun. 29, 2010, now Pat. No. 8,668,455, which is a continuation-in-part of application No. 12/496,769, filed on Jul. 2, 2009, now Pat. No. 7,775,760.

(51) Int. Cl.
*B64C 27/473* (2006.01)
*F03D 9/00* (2016.01)

(52) U.S. Cl.
CPC .............. *B64C 27/473* (2013.01); *F03D 9/00* (2013.01)

(58) Field of Classification Search
CPC .............. B64C 27/08; B64C 2201/108; B64C 2201/024; B64C 27/467; B64C 27/473; B64C 11/001; B64C 27/20; B64C 29/0033; B64C 29/0025; F03D 1/06; F03D 9/00; F03D 11/00
See application file for complete search history.

(56) References Cited

U.S. PATENT DOCUMENTS

| 155,472 A | 9/1874 | Smythe |
| 178,507 A | 6/1876 | Burrows |
| 243,169 A * | 6/1881 | Sprague ................ F04D 29/382 |
| | | 416/132 R |
| 320,273 A | 6/1885 | Munzinger |
| 726,439 A | 4/1903 | Knapp |
| 835,667 A | 11/1906 | Donnelly |
| 853,096 A | 5/1907 | Lewis |
| 864,597 A | 8/1907 | DeBavay |

(Continued)

FOREIGN PATENT DOCUMENTS

| FR | 2473465 A1 | 7/1981 |
| RU | 2694610 C1 | 1/2002 |

*Primary Examiner* — Assres H Woldemaryam
(74) *Attorney, Agent, or Firm* — Allen D. Hertz, P.A.; Allen D. Hertz

(57) ABSTRACT

A tension airfoil assembly includes an outer rim located concentrically with a hub supported by a plurality of spokes, each spoke extending therebetween. A series of airfoils, each airfoil having an aerodynamically lifting shape extending between a leading edge and a trailing edge. Each airfoil of the series of airfoils is assembled to the tension airfoil assembly by coupling an area of the airfoil proximate the leading edge to a leading edge spoke and an area of the airfoil proximate the trailing edge to a trailing edge spoke. The airfoils are arranged having a gap provided between the trailing edge of each forward located airfoil and the leading edge of each trailing located airfoil. The tension airfoil assembly can be employed as a propulsion and/or lifting device integrated into a vehicle, such as an airplane, a helicopter, a tandem rotor helicopter, etc.

20 Claims, 30 Drawing Sheets

(56) References Cited

U.S. PATENT DOCUMENTS

| | | | |
|---|---|---|---|
| 1,461,048 A * | 7/1923 | Roman | F03D 7/0224 416/51 |
| 3,902,072 A | 8/1975 | Quinn | |
| 3,930,625 A * | 1/1976 | Krivka | B64C 27/08 244/17.21 |
| 3,942,839 A * | 3/1976 | Chalk | F01D 5/021 301/73 |
| 3,974,395 A | 8/1976 | Bright | |
| 4,087,927 A | 5/1978 | Basmajian | |
| 4,146,264 A | 3/1979 | Korzeniewski | |
| 4,256,972 A | 3/1981 | Wyatt | |
| 4,280,061 A | 7/1981 | Lawson-Tancred | |
| 4,289,970 A | 9/1981 | Deibert | |
| 4,330,714 A | 5/1982 | Smith | |
| 4,331,881 A | 5/1982 | Soderholm | |
| 4,340,822 A | 7/1982 | Gregg | |
| 4,410,806 A | 10/1983 | Brulle | |
| 4,426,192 A | 1/1984 | Chertok | |
| 4,427,897 A | 1/1984 | Migliori | |
| 4,461,957 A | 7/1984 | Jallen | |
| 4,490,093 A | 12/1984 | Chertok | |
| 4,491,739 A | 1/1985 | Watson | |
| 4,503,673 A | 3/1985 | Schachle | |
| 4,656,413 A | 4/1987 | Bourbeau | |
| 5,798,632 A | 8/1998 | Muljadi | |
| 5,823,749 A | 10/1998 | Green | |
| 5,982,116 A | 11/1999 | Yang | |
| 6,064,123 A | 5/2000 | Gislason | |
| 6,155,785 A * | 12/2000 | Rechnagel | F03D 80/00 416/196 A |
| 6,320,273 B1 | 11/2001 | Nemec | |
| 6,726,439 B2 | 4/2004 | Mikhail et al. | |
| 6,853,096 B1 | 2/2005 | Yu et al. | |
| 6,864,597 B1 | 3/2005 | Ricker | |
| 6,957,946 B1 * | 10/2005 | Vander Kley | F03D 13/10 415/4.2 |
| 7,399,162 B2 * | 7/2008 | Williams | F03D 1/0675 416/189 |
| 7,425,774 B2 * | 9/2008 | Shibata | F03D 7/0236 290/55 |
| 8,011,614 B2 * | 9/2011 | Bird | B64C 27/18 244/17.19 |
| 8,178,987 B2 * | 5/2012 | Mahawili | H02K 7/1869 290/44 |
| 8,258,645 B2 * | 9/2012 | Barber | F03D 1/0608 290/55 |
| 8,464,990 B2 | 6/2013 | Flores | |
| 8,466,573 B2 | 6/2013 | Kikuchi | |
| 8,502,402 B2 | 8/2013 | Hamano | |
| 8,598,731 B2 * | 12/2013 | Pitre | F03D 3/061 290/55 |
| 8,736,093 B2 | 5/2014 | Kii | |
| 8,870,553 B2 | 10/2014 | Lavender | |
| 9,004,864 B2 | 4/2015 | Stimm | |
| 9,103,438 B2 | 8/2015 | Caldwell | |
| 9,194,371 B2 | 11/2015 | Stimm | |
| 9,328,720 B2 | 5/2016 | Caldwell | |
| 9,331,534 B2 | 5/2016 | Yost | |
| 9,631,503 B2 | 4/2017 | Ehrnberg | |
| 9,797,373 B2 | 10/2017 | Aihara | |
| 2006/0056972 A1 | 3/2006 | Delong | |
| 2006/0131890 A1 | 6/2006 | Gizara | |
| 2007/0024058 A1 | 2/2007 | McClintic | |
| 2007/0036653 A1 | 2/2007 | Bak et al. | |
| 2007/0138798 A1 | 6/2007 | McClintic | |
| 2007/0221779 A1 * | 9/2007 | Ikeda | B64C 11/001 244/7 A |
| 2008/0069696 A1 * | 3/2008 | Ball | F03D 7/0224 416/132 B |
| 2008/0240923 A1 | 10/2008 | Bonnet | |
| 2008/0253892 A1 | 10/2008 | Dehlsen | |
| 2008/0296962 A1 * | 12/2008 | Tsai | B60B 1/003 301/104 |
| 2009/0008986 A1 * | 1/2009 | Granieri | B60B 21/04 301/58 |
| 2009/0058095 A1 | 3/2009 | McClintic | |
| 2009/0110554 A1 * | 4/2009 | Dukovic | F03D 3/002 416/41 |
| 2009/0140522 A1 | 6/2009 | Chapple | |
| 2009/0230235 A1 * | 9/2009 | McNulty | B64C 27/467 244/17.23 |
| 2009/0236902 A1 * | 9/2009 | Zibkoff | B60B 5/00 301/104 |
| 2010/0109324 A1 | 5/2010 | Ben-David | |
| 2010/0140951 A1 | 6/2010 | Pitre | |
| 2010/0295317 A1 | 11/2010 | Mahawili | |
| 2010/0303623 A1 * | 12/2010 | Dawoud | F03D 7/0236 416/44 |
| 2011/0012363 A1 | 1/2011 | Finnell | |
| 2011/0107684 A1 | 5/2011 | Flores | |
| 2012/0045327 A1 | 2/2012 | Caldwell | |
| 2012/0060684 A1 | 3/2012 | Lavender | |
| 2012/0061958 A1 | 3/2012 | Tsutsumi | |
| 2012/0076652 A1 | 3/2012 | Ventzke | |
| 2012/0096844 A1 | 4/2012 | Caldwell | |
| 2012/0117958 A1 | 5/2012 | Caldwell | |
| 2012/0133342 A1 | 5/2012 | Murata | |
| 2012/0280503 A1 | 11/2012 | Mahawili | |
| 2013/0009612 A1 | 1/2013 | Caldwell | |
| 2013/0134708 A1 | 5/2013 | Hamano | |
| 2013/0149171 A1 | 6/2013 | Caldwell | |
| 2013/0214537 A1 | 8/2013 | Hashimoto | |
| 2013/0221676 A1 | 8/2013 | Caldwell | |
| 2013/0226458 A1 | 8/2013 | Nakamura | |
| 2013/0234436 A1 | 9/2013 | Kii | |
| 2013/0287572 A1 | 10/2013 | Ehrnberg | |
| 2014/0054893 A1 | 2/2014 | Lindholdt | |
| 2014/0070534 A1 | 3/2014 | Hamano | |
| 2014/0234120 A1 | 8/2014 | Aihara | |
| 2015/0219068 A1 * | 8/2015 | Port | F03D 9/25 290/39 |
| 2015/0240783 A1 | 8/2015 | Kii | |
| 2015/0244220 A1 | 8/2015 | Yost | |
| 2016/0138612 A1 * | 5/2016 | Swett | F04D 29/388 62/498 |
| 2016/0208898 A1 | 7/2016 | Caldwell | |
| 2017/0320564 A1 * | 11/2017 | Kuzikov | B64C 11/18 |

\* cited by examiner

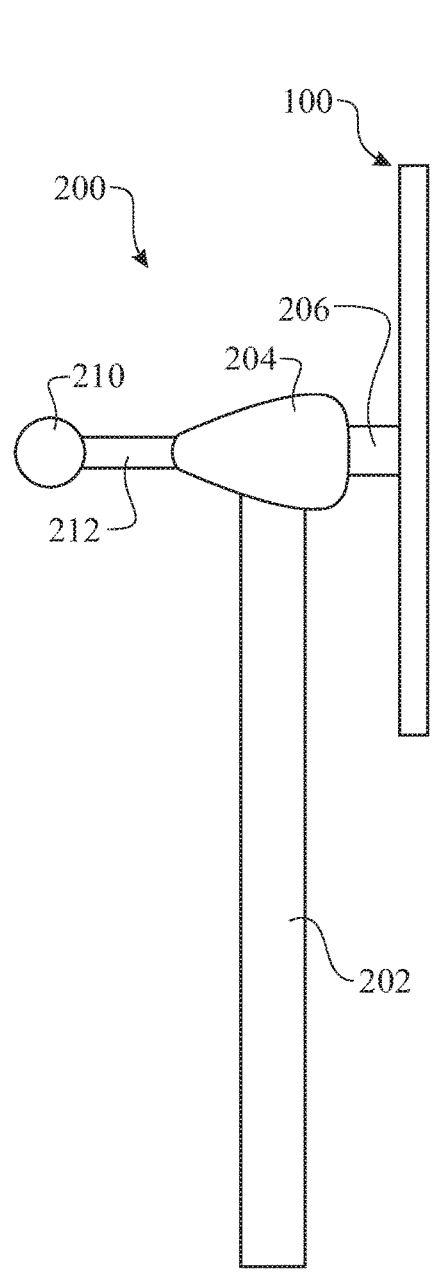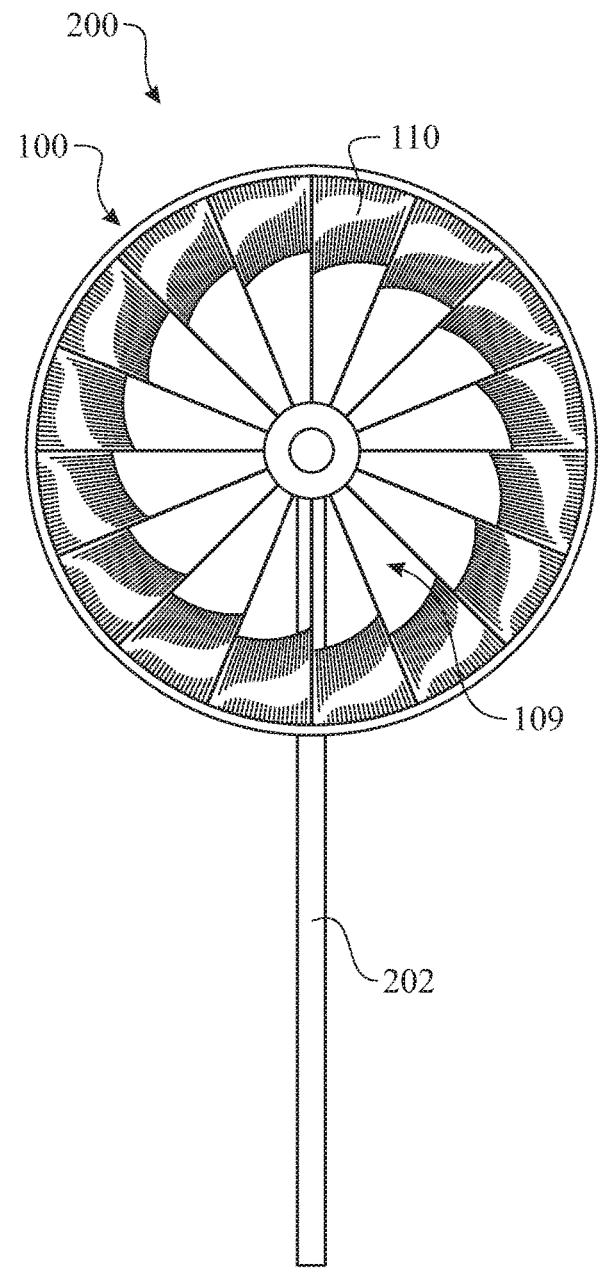
*FIG. 10*  *FIG. 11*

TENSION AIRFOIL ASSEMBLY AND IMPLEMENTATION FOR POWER GENERATION AND AVIATION

CROSS-REFERENCE TO RELATED APPLICATION

This Non-Provisional Utility Patent Application is:
A) a Continuation-In-Part Utility claiming the benefit of co-pending United States Non-Provisional Utility patent application Ser. No. 15/469,542, filed on Mar. 26, 2017 (Scheduled to issue as U.S. Pat. No. 10,435,145 on Oct. 8, 2019),
B) wherein United States Non-Provisional Utility patent application Ser. No. 15/469,542 is a Continuation-In-Part Utility claiming the benefit of co-pending United States Non-Provisional Utility patent application Ser. No. 14/204,931, filed on Mar. 11, 2014 (Scheduled to issue as U.S. Pat. No. 10,443,569 on Oct. 15, 2019),
C) wherein United States Non-Provisional Utility patent application Ser. No. 14/204,931 is a Continuation-In-Part Utility claiming the benefit of co-pending Non-Provisional Utility patent application Ser. No. 12/825,857, filed on Jun. 29, 2010 (Issued as U.S. Pat. No. 8,668,455 on Mar. 11, 2014),
D) which is a Continuation-In-Part Utility claiming the benefit of co-pending U.S. Non-Provisional patent application Ser. No. 12/496,769, filed on Jul. 2, 2009, (Issued as U.S. Pat. No. 7,775,760 on Aug. 17, 2010),
E) wherein all of which are incorporated herein in their entireties.

FIELD OF THE INVENTION

The present disclosure generally relates to an apparatus and method for converting wind or water flow to electrical energy. More particularly, the present disclosure relates to a turbine wheel having a plurality of blades disposed about an internal edge of a peripheral rim.

BACKGROUND OF THE INVENTION

Windmills and other wind driven turbines generally comprise a series of blades projecting radially from a centrally located hub. This configuration provides several limitations. A first limitation is efficiency. The energy utilized to turn an object is referred to as torque. The torque is calculated at a force times a distance from the center of rotation. The force applied near the center of rotation has a significantly lower impact than a force applied towards the outer edge of the blades, although resistance is created along the entire length of the blade. A second limitation is the potential injury or death to birds. Turbines of common windmills have a plurality of blades, which are spatially configured, allowing birds to fly between the swirling turbines. This poses a risk whereby one of the blades could collide with the passing bird.

A first known blade discloses a rotor blade, which includes a main blade and an extension nap, which is translationally moveable relative to the main blade. The main blade and transition blade at least form an airfoil lifting surface of the entire blade. The dimension of the airfoil lifting surface is variable by translationally moving the extension flap relative to the main blade.

A second known reference discloses self starting vertical-axis wind turbine, for economically competitive power production by driving large grid-corrected AC generators. The wind turbine includes a variable blade pitch-angle from 0 to 60 degrees, wherein the blades following variable wind speed for maximum efficiency and to keep constant turbine speed; a variable blade camber to optimize lift-to-drag ratio, controlled by pitch and cyclical variation of incidence-angle; improved airfoil shape of cambered blades; low cost automatic gear-train for two constant turbine speeds; protection against overload and prevention of power surge during wind gusts; low stress three-legged high tower assembled with nacelle and tail structure on ground level. This enables a tower to be built to any height required to harness maximum wind energy.

Yet another known embodiment discloses a wind or water flow energy converter that includes a wind or water flow actuated rotor assembly. The rotor includes a plurality of blades; the blades of are variable in length to provide a variable diameter rotor. The rotor diameter is controlled to fully extend the rotor at low flow velocity and to retract the rotor, as flow velocity increases such that the loads delivered by or exerted upon the rotor do not exceed set limits.

While another known embodiment discloses a rotation shaft which is installed in the center of a wind turbine. Blades are secured to the rotation shaft to be circumferentially spaced apart one from another. Each blade has a lattice composed of transverse lattice elements and longitudinal lattice elements which are plaited to cooperatively define a plurality of spaces. In each space, a rotation adjustment piece is coupled to a first portion of a lattice element to be capable of rotating between a closing position where it closes a predetermined number of the spaces and an opening position where it opens a predetermined number of the spaces, so that the blades as a whole can be rotated irrespective of a wind direction. Electricity is generated using wind applied to the rotation shaft through rotation adjustment pieces.

And another known embodiment discloses a multi-axis turbine with an external upper covering, a tower structure with a plurality of vertical elongated members connected to each other with supporting horizontal elongated members, and a plurality of smaller blades on a rotation connected to a tower structure with a plurality of the rotation. One embodiment includes impact impellers connected to a rotation creating a swept area with a height to diameter ratio of greater than four. In one embodiment the impact impellers are connected to a rotation means thereby creating a swept area with a height to diameter ratio of greater than ten.

While another embodiment discloses a power plant which extracts energy from a free flowing fluid by means of a transverse mounted generator with its rotor extending downward into the flow. Runner blades with hinges attain the greatest surface area when the flow is tangent to and in the same direction as the rotor rotation. The hinges fold the runner blades to minimize the surface area proportional to drag when the blades oppose the flow. The generator with feedback control charges batteries, produces hydrogen fuel by electrolysis of water, or further couples to a DC motor coupled to an AC generator. Other features optionally perform such tasks as adaptively locating the generator in the maximum velocity flow, controlling and communicating the state of charge of the battery, or gauging and controlling the electrolysis process and communicating the fullness of the hydrogen gas output tanks.

Yet another embodiment discloses a design of a wind turbine blade and a wind turbine by which the power, loads and/or stability of a wind turbine may be controlled by typically fast variation of the geometry of the blades using active geometry control (e.g. smart materials or by embedded mechanical actuators), or using passive geometry control (e.g. changes arising from loading and/or deformation of the blade) or by a combination of the two methods. A method of controlling the wind turbine is also disclosed.

While another embodiment discloses a wind turbine system, which incorporates a variable blade assembly including adjustable sails and wing shaped masts expanding the wind velocity capture envelope. The blade assembly turns a hydraulic pump, which pressurizes fluid and stores the pressurized fluid in a chamber in the support tower. Pressurized fluid is directed via an electronically controllable proportioning valve to a hydraulic motor, which is coupled to an electric generator. A computer control module operates the proportioning valve regulating pressure to the hydraulic motor, maintaining generator rotational speed, and providing consistent output frequency to the power grid. Stored energy in the high pressure tank is used to continue generator operation after the winds cease, allowing early warning notification to the power management system of impending power loss. Residual pressure maintained in the high pressure tank allows restart operations via hydraulic pressure rather than power grid energy drain. On site high energy capacitors store additional energy.

And another embodiment discloses a wind turbine capable of varying active annular plane area by composing such that blades are attached to a cylindrical rotor movable in the radial direction of the rotor, the blades being reciprocated in the radial direction by means of a blade shifting mechanism connected to the root of each blade, or the blade itself is divided so that the outer one of the divided blade is movable in the radial direction. With this construction, the: wind turbine can be operated with a maximum output within the range of evading fatigue failure of the blades and rotor by adjusting the active annular plane area in accordance with wind speed.

Common windmills comprise a plurality (generally three) of masts or blades extending from a central hub. The design of the blades must be structurally sound to accommodate the applied forces. This requirement dictates a heavier construction to the masts or blades. The heavy construction increases the inertial force, which reduces the rotational speed of the turbine assembly. The mass of material increases the cost of fabrication, transport, and the like to the site. Alternately, exotic materials and structural designs can be used to reduce the weight, while increasing cost and complexity of fabrication.

Wind studies show that as the velocity of the wind doubles, the power of the wind or water is cubed. Thus, if a turbine at 12 MPH wind generates 10 watts of power, at 24 MPH it will produce 1,000 watts of power.

A turbine will increase speed as the velocity of the air or water is sped up. The power of a generator is also increased as the rotational speed is increased. The power of the generator is not necessarily the same power curve of the turbine driving the generator. Therefore, losses can be expected because of the power mismatch between turbine and generator.

The described device monitors the rpm of a generator either directly or indirectly and provides a value, which corresponds to the rpm of the turbine. This in turn, is used to determining the amount of load (power) to be generated.

The angle difference of wing and wind is known as the Angle Of Attack (AOA). Experiments have determined that the optimum AOA is approximately 28° in a "climb angle" for a blade or wing. The closer the AOA can be to the 28°, the more power that can be generated. Two methods can be used to keep this angle of attack (AOA) constant. One is to pivot the blades to make the proper angle. This would keep the RPM of the turbine rather constant. The changing of the blade angle is used on large turbines. The other method to have the AOA stable is to change the rpm of the turbine.

Therefore, a wind driven turbine wheel with improved efficiency and a focus on bird safety is needed. The method described below is to change the rpm and the power extracted to keep the blades of the turbine at the optimum AOA for maximum power generation. The method described will better fit small turbines with a diameter of perhaps no more than 150 feet.

SUMMARY OF THE INVENTION

The present disclosure is generally directed to a wind driven turbine, and more specifically to a turbine blade having a peripheral rim assembled to a central hub via a plurality of spokes. A series of airfoil blades are disposed along an interior edge of the peripheral rim, being rotationally attached to the plurality of spokes. The blades leave an airflow breach between an interior edge of the blade and the central hub.

A wing provides lift in order to make heavier than air vehicles possible. The other use for a wing is to provide the ability to propel a vehicle such as an airplane. The wing, in a lifting or propulsion application is commonly referred to as a propeller or turbine.

The following are some characteristics of wings:
1. A larger wing will provide more lift than a small wing.
2. A wing that has high velocity up to close to the speed of sound will provide more lift than wings moving slower.
3. A wing that has the proper shape will provide more lift than others with different shapes.
4. A lighter wing will have less mass, and thus will be able to provide more lift than a heavier wing due to the limitations of the vehicle weight and the mass of the propeller.

Thus, to provide a superior lifting wing or propeller, all the above items must be considered to provide the maximum ability to provide lift. Wings attached to an airplane travel at the same speed as the airplane. Wings, when employed as propellers, have many different speeds, depending on where the point of reference is made away from the hub or axis of rotation.

On any circle, thirty percent (30%) of a circle on the outer portion of the circle will have fifty percent (50%) of the volume of the circle. On a propeller, the outer thirty percent (30%) has the fastest moving part of the propeller. Thus, by combining the area and the velocity of the propeller, the outer thirty percent (30%) of the circle will provide almost 100% of the possible lift made. If the outer thirty percent (30%) of the propeller blade can be made larger than most propellers, additional lift provided can be substantial.

The problem is that as a lever is made longer, the shear forces become too large for the propeller to bear.

The tension wing provides answers to all of the above as follows:
1. Multiple winglets are placed only on the outer portion of the wing.
2. The outer portion of the circle provides the velocity to provide the maximum lift.
3. No change is necessary on optimum shape of the winglets, so existing wing shape technology can be used.
4. A bicycle wheel is the lightest, strongest, most efficient rotating device known. The Tension Wing uses this embodiment of proven engineering to make a more efficient, lighter, more powerful rotating wing or propeller.

The tension wing allows more power to be input to the wing, and allows more lift to be provided.

In some embodiments, the wind turbine apparatus may include:
- a peripheral rim having a rim radius defined from a rim center to an interior edge of the rim;
- a central hub having a hub radius defined from a hub center to an exterior edge of the hub;
- a radial span dimension being defined as rim radius minus the hub radius;
- a plurality of spokes assembling the central hub to a rotationally centralized position within the peripheral rim; and
- a series of blades having a radial length being significantly less than the radial span dimension;
- wherein the each of the blades is assembled to the wind turbine apparatus positioning the blades within the peripheral ring and proximate the interior edge of the rim, leaving an airflow gap between an interior edge of the blades and the exterior edge of the hub.

In a second aspect, a leading edge of the blade is rotationally assembled to a spoke.

In another aspect, a trailing edge is assembled to the spoke via an adjusting mechanism.

In yet another aspect, the adjusting mechanism is operationally controlled via a feature within the respective spoke.

In yet another aspect, the adjusting mechanism is operationally controlled via a feature within the respective spoke by rotating the spoke or a member within the spoke.

In yet another aspect the plurality of spokes is configured having two adjacent spokes overlapping.

In yet further aspect, the adjusting mechanism is operationally controlled via a tension member, which is provided through a hollow portion of the spoke and controlled via a winding mechanism located proximate or within the central hub.

In yet another aspect, the trailing edge is assembled to a spoke via a breakaway mechanism.

In yet another aspect, the breakaway mechanism further comprises a means for automatically restoring the trailing edge to an operable configuration.

In yet aspect, breakaway mechanism is integrated with the adjusting mechanism.

In yet another aspect, the turbine wheel engages with an electrical power generator, with the assembly being positioned upon a vertical riser support.

In yet another aspect, the deployed turbine wheel can include a counterbalance assembly.

In yet another aspect, the deployed assembly can additionally include a rotational means, rotating about a vertical axis to reduce the frontal area respective to the airflow.

In yet another aspect, the turbine wheel comprises a plurality of masts extending radially from an axle, each mast comprising a blade. The masts are supported via a planar tension cable spanning between distal ends of adjacent masts and a radial tension cable spanning between the distal end of each mast and each of the two ends of the axle.

In yet another aspect, the blades can be replaceable with one's having different shapes, sizes, surface areas, and aerodynamic characteristics.

In a second embodiment, the wind turbine apparatus may include:
- a vertical riser support extending upward from a supporting surface;
- a turbine housing carried by the vertical riser support;
- a wind driven turbine blade subassembly in operational communication with a turbine shaft;
- a hydraulic pump carried by the turbine housing and in operational communication with the turbine shaft;
- a hydraulic motor comprising a hydraulic motor drive shaft, wherein the hydraulic motor is distally located from the turbine housing and in hydraulic communication with the hydraulic pump through hydraulic lines; and
- an electrical power generator comprising a generator drive shaft in rotational communication with the hydraulic motor drive shaft,
- wherein rotation of the wind driven turbine blade subassembly rotationally drives the hydraulic pump,
- wherein the hydraulic pump flows hydraulic fluid through the hydraulic lines to the hydraulic motor,
- wherein the hydraulic fluid flowing through the hydraulic lines drives rotation of the hydraulic motor;
- wherein the hydraulic motor drives rotation of the electric power generator, which outputs electric power.

In yet another aspect, the electrical output of the electric power generator is governed by an electric power output controller module.

In yet another aspect, the electric power output controller module varies a resistance of a current flow.

In yet another aspect, the electric power output controller module varies a resistance of a current flow, optimizing power generation efficiency and power output.

In yet another aspect, the electric power output controller module identifies a rotational speed of the hydraulic motor drive shaft and varies a resistance of a current flow based upon a predetermined rotational speed of the hydraulic motor drive shaft.

In yet another aspect, the electric power output controller module identifies a rotational speed of the generator drive shaft and varies a resistance of a current flow based upon a predetermined rotational speed of the generator drive shaft.

In another arrangement, the wind operated electrical power generating system may include:
- a wind turbine comprising a turbine blade assembly attached to a turbine blade subassembly shaft, the turbine blade subassembly shaft being rotationally carried by a turbine housing, the turbine housing being supported by a vertical riser support structure;
- a generator in one of direct and indirect operational communication with the turbine blade subassembly shaft, wherein rotation of the turbine blade subassembly shaft provides power to rotate an input shaft of the generator;
- a rotational speed sensor arranged to sense a rotational speed of one of the turbine blade subassembly shaft and the generator shaft;
- an electrical controller circuit in signal communication with the rotational speed sensor, wherein the electrical controller circuit identifies when a rotational speed determined by a signal from the rotational speed sensor is proximate a predetermined speed; and
- a potentiometer (variable resistor), wherein the electric potentiometer (variable resistor) increases a load upon the generator.

In yet another aspect, the system further comprises a power control module, wherein the power control module contains the electrical controller circuit and the potentiometer (variable resistor), wherein the potentiometer (variable resistor) is a manually adjusted potentiometer (variable resistor).

In yet another aspect, the electrical controller circuit further comprising at least one speed indicator, wherein each of the at least one speed indicator alerts a user when the electrical controller circuit identifies when a rotational speed determined by a signal from the rotational speed sensor is proximate a predetermined speed associated with each of the at least one speed indicator.

In yet another aspect, the electrical controller circuit further comprises a plurality of speed indicators, wherein one of the plurality of speed indicators alerts a user when the electrical controller circuit identifies when a rotational speed determined by a signal from the rotational speed sensor is proximate a predetermined speed associated with the one of the plurality of speed indicators.

In yet another aspect, the electrical controller circuit further comprises:
- a power control module, wherein the power control module contains:
  - the electrical controller circuit, which further includes a plurality of speed indicators, wherein one of the plurality of speed indicators alerts a user when the electrical controller circuit identifies when a rotational speed determined by a signal from the rotational speed sensor is proximate a predetermined speed associated with the one of the plurality of speed indicators; and
  - a plurality of the potentiometers (variable resistors), wherein each of the plurality of potentiometers (variable resistors) is associated with a respective speed indicator of the plurality of speed indicators.

In yet another aspect, the electrical controller circuit further comprises a transformer integrated in electric communication between the potentiometer (variable resistor) and a grid tie.

In an alternate application, the turbine wheel assembly can be modified and employed to provide lift, the tension lifting wing wheel assembly comprising:
- a peripheral rim having a rim radius defined from a rim center to an interior edge of the rim;
- a central hub having a hub radius defined from a hub center to an exterior edge of the hub;
- a radial span dimension being defined as rim radius minus the hub radius;
- a plurality of spokes assembling the central hub to a rotationally centralized position within the peripheral rim; and
- a series of wings, each wing having an aerodynamically lifting shape extending between a leading edge and a trailing edge,
- wherein the each wing of the series of wings is assembled to the tension lifting wing wheel assembly by coupling an area of the wing proximate the leading edge to a leading edge spoke and an area of the wing proximate the trailing edge to a trailing edge spoke,
- wherein the wings are arranged having a gap provided between the wing trailing edge of each forward located wing and the wing leading edge of each trailing located wing.

In a second aspect, the leading edge spoke and the trailing edge spoke are substantially parallel to one another.

In another aspect, wing is twisted along a transverse axis, wherein the transverse axis extends between a distal or outer edge of the wing and a proximal or hub edge of the wing.

In yet another aspect, each spoke can cross other spokes defining three crossover locations.

In yet another aspect, the spokes can be formed having at least one of: a circular cross section shape, an aerodynamic cross section shape, or any other suitable cross section shape.

In yet another aspect, the spokes can be arranged alternating between extending from an outer surface of each hub flange and from an inner surface of the same hub flange.

In yet another aspect, a first end of each spoke is assembled to a respective central hub flange and a second end of each spoke is assembled to the outer rim. A first spoke of the plurality of spokes is assembled to the respective central hub flange in an arrangement extending in an acute angular direction from a radial orientation in a first direction from a first side of the respective central hub flange and a second spoke of the plurality of spokes is assembled to the respective central hub flange in an arrangement extending in an acute angular direction from a radial orientation in a second direction from a second side of the respective central hub flange. One spoke of the plurality of spokes attached to the respective central hub flange crosses at least one other spoke of the plurality of spokes attached to the same respective central hub flange. Each airfoil of the series of airfoils is assembled to the tension airfoil assembly by coupling an area of the airfoil proximate the leading edge to a leading edge spoke of the plurality of spokes and an area of the airfoil proximate the trailing edge to a trailing edge spoke of the plurality of spokes.

In yet another aspect, one spoke of the plurality of spokes attached to the respective central hub flange can cross at least two another spokes of the plurality of spokes attached to the same respective central hub flange.

In yet another aspect, each leading edge spoke and each respective trailing edge spoke can be substantially parallel with one another.

In yet another aspect, the tension lifting wing wheel assembly can include a total of 36 spokes, 18 spokes per hub flange.

In yet another aspect, each spoke would preferably be assembled to the tension lifting wing wheel assembly having substantially equal tension.

In yet another aspect, tension can be applied to and retained within each spoke by a tension application system.

In yet another aspect, any suitable tensioning system or combination of tensioning systems can be employed.

In yet another aspect, one tension application system employs a spoke distal assembly tensioning nipple securing a threaded distal or rim end of the spoke to the rim.

In yet another aspect, a second tension application system employs a spoke proximal or hub assembly tensioning nipple securing a threaded proximal or hub end of the spoke to the hub. In one implementation, the proximal end of the spoke would be inserted through a hole or bore formed through a bracket or other axially extending feature. A threaded tensioning element would be threadably secured to the threaded proximal end of the spoke. The threaded tensioning element would be adjusted to increase or decrease the tension of the respective spoke.

In yet another aspect, a third tension application system employs a threaded coupling element securing a first centrally threaded section of a first segment of the spoke to a second centrally threaded section of a second segment of the spoke. The threaded segments would include threading in opposite directions. More specifically, the first centrally threaded section would including threading formed in a first rotational direction and the second centrally threaded section would including threading formed in a second, opposite rotational direction. The threaded coupling element would be formed having mating threading to each of the first centrally threaded section and the second centrally threaded section.

In another aspect, the spoke hub attachment holes can be even spaced about the hub flange. Alternatively, the spoke hub attachment holes can be arranged in pairs, wherein the pairs are arranged having a first spacing and each adjacent pair is arranged having a second spacing about the hub flange, wherein the first spacing and the second spacing differ from one another.

In another aspect, the series of spoke hub attachment holes of the tension lifting wing first central hub flange and the series of spoke hub attachment holes of the tension lifting wing second central hub flange are offset from one another.

In another aspect, the thickness or axial height of the tension lifting wing outer rim is determined by maximizing the desired strength of the tension lifting wing outer rim, while providing sufficient area to support a connection of each spoke.

In another aspect, the attachment locations of each spoke along an interior surface of the tension lifting wing outer rim are linear with one another. Alternatively, the attachment locations of each spoke along an interior surface of the tension lifting wing outer rim are located in an alternating configuration.

In another aspect, the tension lifting wing central hub assembly is preferably substantially centered axially respective to the tension lifting wing outer rim. Alternatively, the tension lifting wing central hub assembly can be offset axially respective to the tension lifting wing outer rim.

In another aspect, the angle of attack can be established by the arrangement of the, the height or span of the tension lifting wing central hub assembly, or the like, or any combination thereof.

In yet another aspect, the tension lifting wing wheel assembly can be rotationally driven by a rotational drive machine, such as a motor, an engine, a turbine, and the like.

In yet another aspect, the rotationally driven tension lifting wing wheel assembly can be integrated into a vehicle to provide at least one of lift and propulsion.

In yet another aspect, the rotationally driven tension lifting wing wheel assembly can be integrated into a vehicle in a substantially vertical orientation to provide propulsion to the vehicle.

In yet another aspect, the rotationally driven tension lifting wing wheel assembly can be integrated into a vehicle in a substantially horizontal orientation to provide lift to the vehicle.

In another application, a heavy-lift helicopter comprising:
a heavy-lift helicopter body;
at least one rotational drive machine carried by said heavy-lift helicopter body;
a tension lifting wing wheel assembly including:
 a peripheral rim having a rim radius defined from a rim center to an interior edge of the rim;
 a central hub having a hub radius defined from a hub center to an exterior edge of the hub;
 a radial span dimension being defined as rim radius minus the hub radius;
 a plurality of spokes assembling the central hub to a rotationally centralized position within the peripheral rim; and
 a series of wings, each wing having an aerodynamically lifting shape extending between a leading edge and a trailing edge,
 wherein the each wing of the series of wings is assembled to the tension lifting wing wheel assembly by coupling an area of the wing proximate the leading edge to a leading edge spoke and an area of the wing proximate the trailing edge to a trailing edge spoke,
 wherein the wings are arranged having a gap provided between the wing trailing edge of each forward located wing and the wing leading edge of each trailing located wing,
wherein each of the at least one tension lifting wing wheel assembly is assembled to a respective at least one rotational drive machine.

In a second aspect, the heavy-lift helicopter is a tandem rotor heavy-lift helicopter, comprising a pair of rotational drive machines supported by the body, each rotational drive machine having a respective tension lifting wing wheel assembly attached thereto.

In another aspect, the heavy-lift helicopter includes at least one of one horizontally oriented tension lifting wing wheel assembly and one vertically oriented tension lifting wing wheel assembly.

An optional feature of the tension wheel assembly is a spoke breakaway feature. The spoke breakaway feature is preferably integrated at a location along the spoke proximate the rim.

In a second aspect, the spoke can include one or more spoke breakaway features.

In another aspect, the spoke breakaway feature retains the spoke in an assembled configuration when the spoke is subjected to a tensile force (tension).

In yet another aspect, the spoke breakaway feature releases or decouples the spoke from the assembly when the tension is removed from the spoke.

In yet another aspect, the spoke breakaway feature includes a nipple flange or spoke flange formed or provided at a breakaway end of the spoke.

In yet another aspect, the spoke breakaway feature includes a tension generating feature.

In yet another aspect, the tension generating feature is provided in a form of a nipple assembly.

In yet another aspect, the spoke breakaway feature includes a nipple assembly comprising a nipple body and a nipple flange.

In yet another aspect, the nipple body includes a threaded section (male or female threading).

In yet another aspect, the nipple body includes a threaded section (male or female threading), wherein the threading of the threaded section is sized to mate with a mating threading (female or male threading) formed on the associated end of the spoke.

In yet another aspect, the nipple body includes a threaded interior bore.

In yet another aspect, the nipple body includes a threaded interior bore, wherein the threading of the threaded interior bore is sized to mate with a mating threading formed on the associated end of the spoke.

In yet another aspect, the spoke breakaway feature includes a stud assembly comprising a stud trunk and a stud flange.

In yet another aspect, the stud trunk is mechanically coupled to the rim.

In yet another aspect, the stud trunk is mechanically affixed to the rim.

In yet another aspect, the stud trunk is mechanically coupled to the hub.

In yet another aspect, the stud trunk is mechanically affixed to the hub.

In yet another aspect, the stud trunk is mechanically coupled to at least one of the rim and the hub.

In yet another aspect, the stud trunk is mechanically affixed to at least one of the rim and the hub.

In yet another aspect, the spoke breakaway feature includes a coupling element that bridges a nipple flange and a stud flange into a single assembly while tension is applied to the spoke.

In yet another aspect, the coupling element comprises at least two separate elements.

In yet another aspect, the coupling element comprises at least two separate elements hingeably assembled with one another.

In yet another aspect, the spoke breakaway feature includes an embossed surface mating with a debossed surface to retain mechanical communication between the coupling element and the nipple flange.

In yet another aspect, the spoke breakaway feature includes an embossed surface mating with a debossed surface to retain mechanical communication between the coupling element and the stud flange.

In yet another aspect, each surface of the coupling assembly applying a compression force is formed having an embossed surface.

In yet another aspect, each surface of the coupling assembly receiving the compression force is formed having a debossed surface.

In yet another aspect, the embossed surface is convex.

In yet another aspect, the debossed surface is concave.

These and other aspects, features, and advantages of the present invention will become more readily apparent from the attached drawings and the detailed description of the preferred embodiments, which follow.

BRIEF DESCRIPTION OF THE DRAWINGS

The invention will now be described, by way of example, with reference to the accompanying drawings, where like numerals denote like elements and in which:

FIG. 10 presents an elevation side view of a turbine wheel integrated into a wind power harnessing structure;

FIG. 11 presents an elevation front view of the wind power harnessing structure of FIG. 10;

Like reference numerals refer to like parts throughout the several views of the drawings.

DETAILED DESCRIPTION OF THE PREFERRED EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description.

Figure 1:
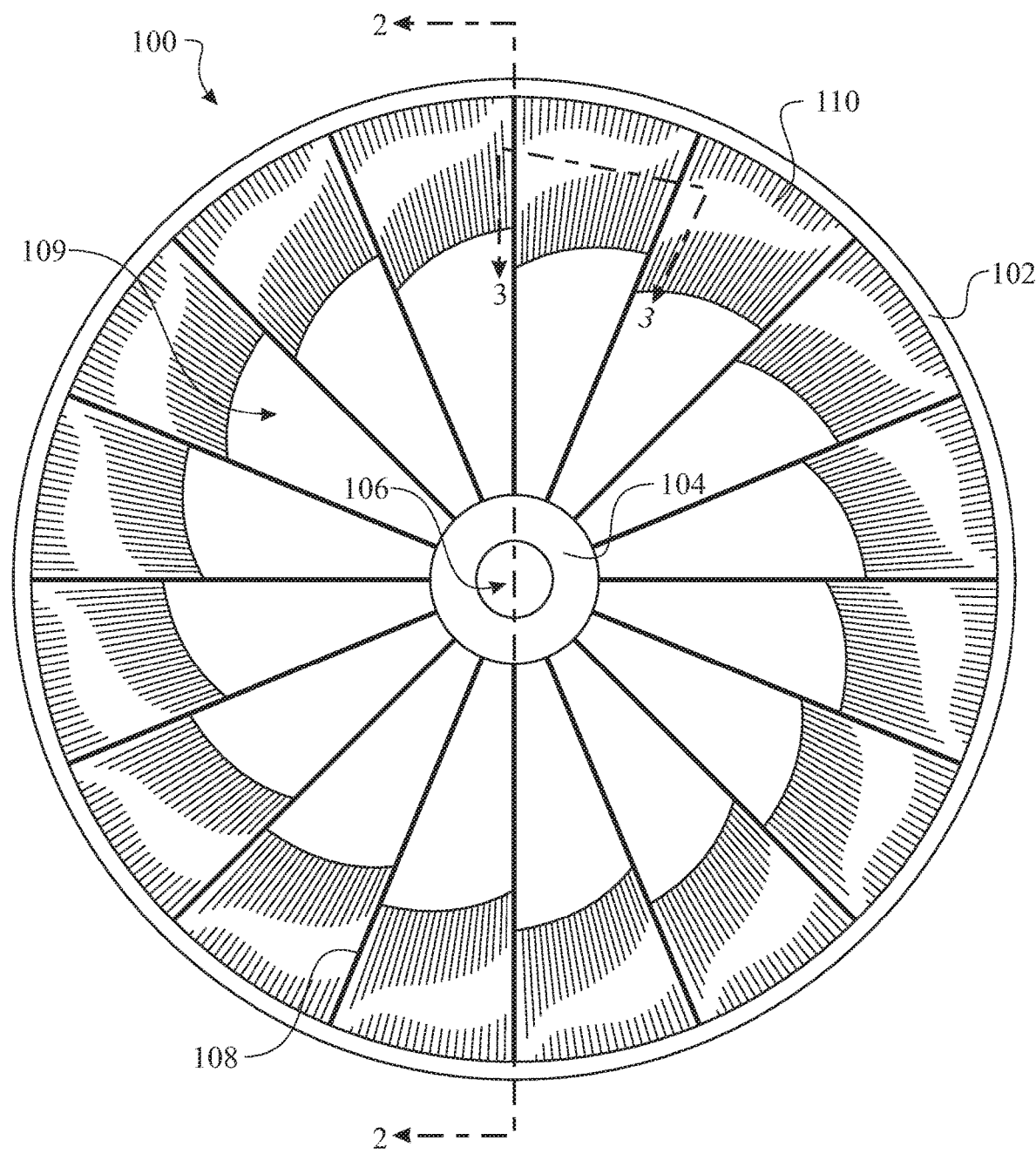
FIG. 1 presents a front view of an exemplary embodiment of a turbine wheel illustrating the general components of the present invention.

For purposes of description herein, the terms "upper", "lower", "left", "rear", "right", "front", "vertical", "horizontal", and derivatives thereof shall relate to the invention as oriented in FIG. 1, where applicable. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure is generally directed to a turbine wheel 100 and the integration of the turbine wheel 100 onto a turbine deployment assembly 200. The turbine wheel 100 and the respective application are detailed hereinafter.

Figure 2:
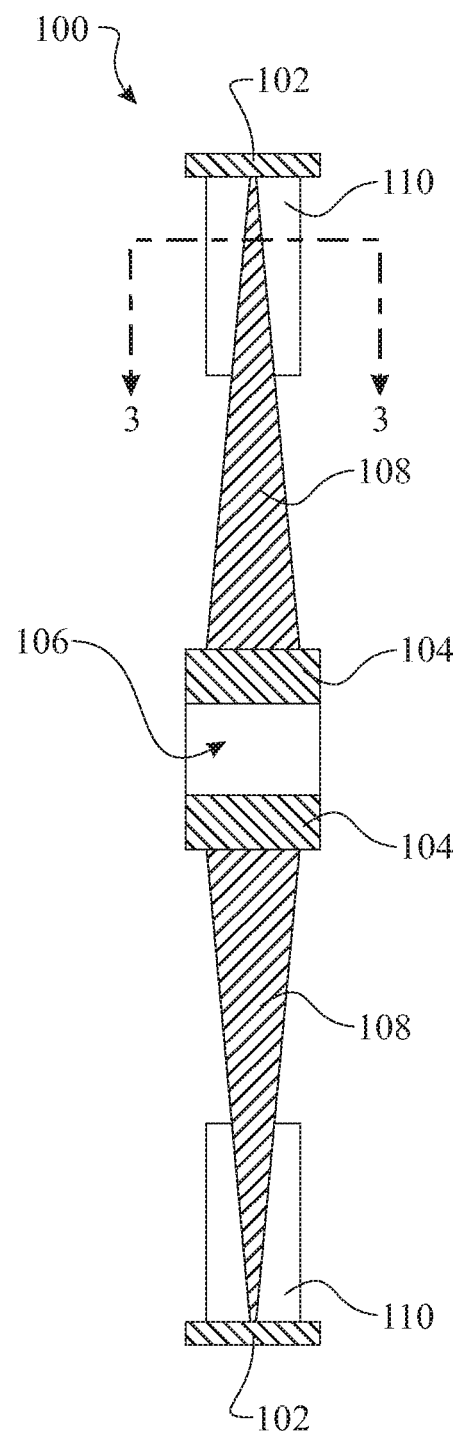
FIG. 2 presents a sectional side view of the turbine wheel taken along section line 2-2 of FIG. 1.
Figure 3:
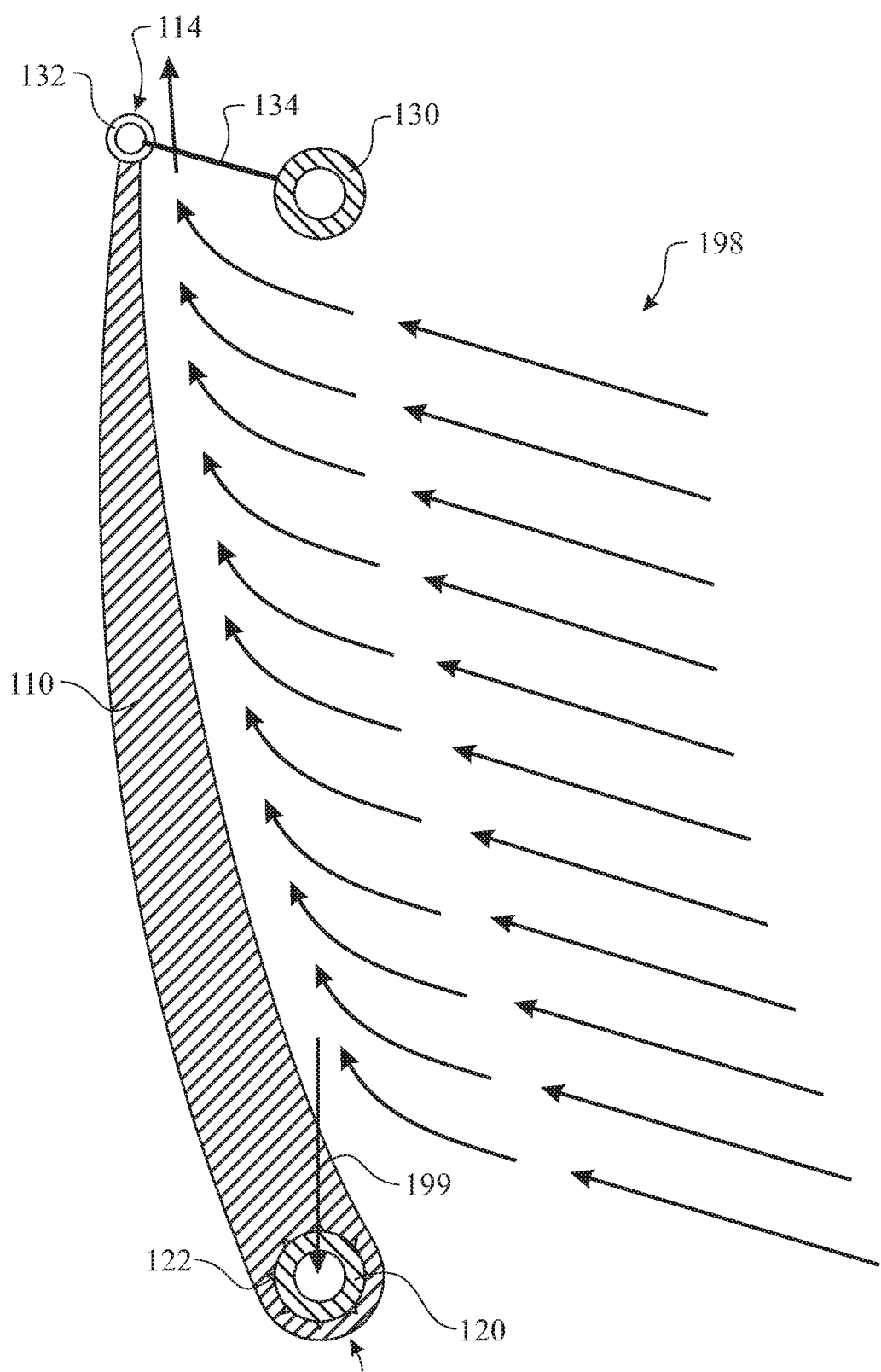
FIG. 3 presents a sectional end view of a turbine blade taken along section line 3-3 of FIG. 1 introducing an effect of wind flow on the blade.

Referring initially to FIGS. 1 through 3 of the drawings, an illustrative embodiment of a turbine wheel, hereinafter apparatus is generally indicated by reference numeral 100 in FIG. 1. The turbine wheel assembly 100 includes a turbine central hub 104 being centrally assembled to a turbine outer rim 102 via a plurality of turbine spokes 108. The turbine central hub 104 includes an axle bearing 106, which is centrally assembled, allowing the turbine central hub 104 to rotate about an axle that would be assembled to the axle bearing 106. The axle and axle bearing 106 can be of any known rotational interface capable of supporting the forces exerted by the wind and respective motion of the turbine wheel assembly 100 about the axle. The turbine spokes 108 are preferably assembled having a tensile force. The distributed tensile force ensures the turbine outer rim 102 remains in the circular shape, while reinforcing the assembly.

A series of turbine blades 110 are provided, having a blade leading edge 112 and a blade trailing edge 114. The distance between the blade leading edge 112 and the blade trailing edge 114 is preferably equal to or greater than a span between two adjacent spokes 108. This shape allows for the blade leading edge 112 to be assembled to a respective lead turbine spoke 108 and the blade trailing edge 114 to be assembled to the respective trailing turbine spoke 108. It would be preferable that the blade leading edge 112 be pivotally assembled to a blade leading edge pivot 120, wherein the blade leading edge pivot 120 can be utilized as the lead turbine spoke 108. The blade leading edge pivot 120 can include a hollow centerline, allowing the turbine spoke 108 to be inserted therethrough. A plurality of anti-slip interface 122 can be included ensuring the blade leading edge pivot 120 rotates in conjunction with the turbine blades 110, or excluded allowing the blade leading edge pivot 120 to rotate independently respective to the turbine blades 110.

The turbine blades 110 has a length parallel to the turbine spoke 108 that is significantly shorter than the distance between the exterior of the turbine central hub 104 and the interior of the turbine outer rim 102. This provides an airflow interior region 109 within an interior of the turbine outer rim 102 allowing airflow 198 to pass through the turbine wheel assembly 100. This configuration provides a centroid of the effective force closer to the turbine outer rim 102, thus increasing the generated torque, reduces the rotational resistance, thus increasing the efficiency.

The trailing edge can include an incident angle control mechanism, including an incident angle controller 130, an angle control cleat 132 and an angle control tether 134. In the exemplary embodiment, the turbine blade 110 pivots about the blade leading edge pivot 120 and is retained at an incident angle via the angle control tether 134. The angle control tether 134 is a cabling, which is released or retracted via an incident angle controller 130. The incident angle controller 130 can either rotate to adjust a released length of the angle control tether 134, or the angle control tether 134 can be routed through the incident angle controller 130 and released or retracted via a remotely located winding mechanism (not shown, but well understood as a motor, gearing and spool). The angle control tether 134 is secured to the turbine blades 110 via an angle control cleat 132 located proximate the blade trailing edge 114 of the turbine blades 110.

Figure 4:
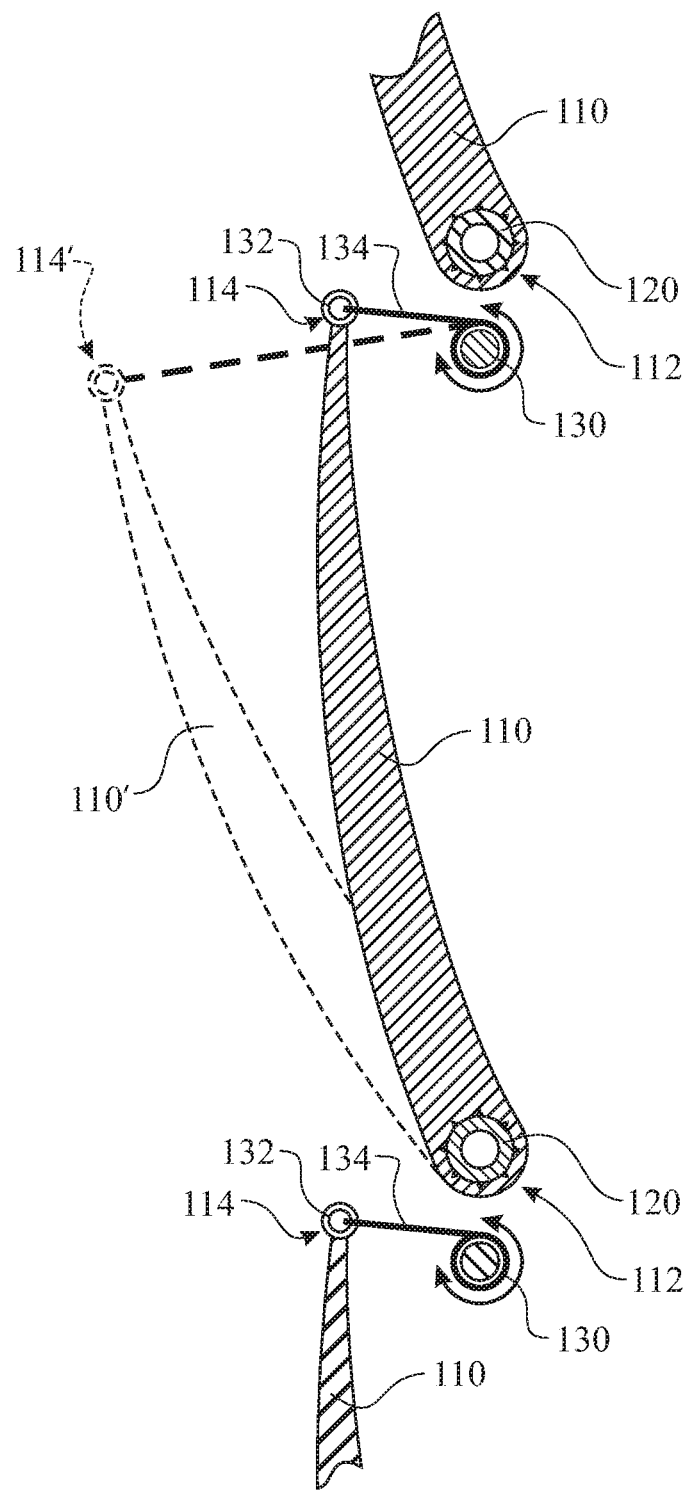
FIG. 4 presents a sectional end view of a series of turbine blades introducing an incident angle controlling mechanism.

As the incident angle controller 130 releases the angle control tether 134, a wind flow 198 applies a force to the facing side of the turbine blades 110 allowing the turbine blades 110 to rotate into position turbine blades 110' and repositioning the blade trailing edge 114 to position blade trailing edge 114' as shown in FIG. 4. The illustration presents an embodiment where the incident angle controller 130 is solid and rotates to release or retract the angle control tether 134 to adjust the released length. The angle of incident changes the resultant rotational speed of the turbine blades 110, as referenced as a resultant blade motion 199. The turbine blades 110 are positioned having the blade leading edge 112 overlapping the blade trailing edge 114, with the blade leading edge 112 being arranged on the wind receiving side of the turbine blades 110.

It is understood that other incident angle control mechanisms can be used, including a cam and respective control arm, and the like.

Figure 5:
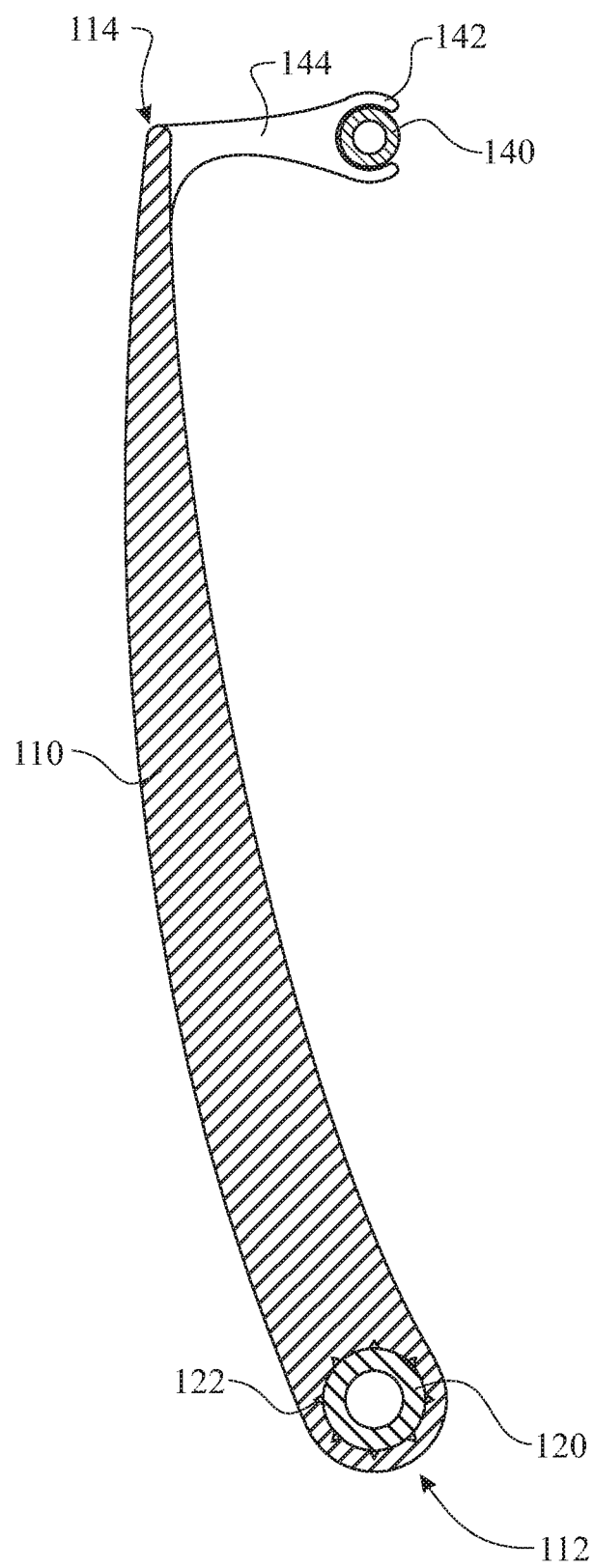
FIG. 5 presents a sectional end view of a turbine blade introducing an exemplary breakaway mechanism.
Figure 6:
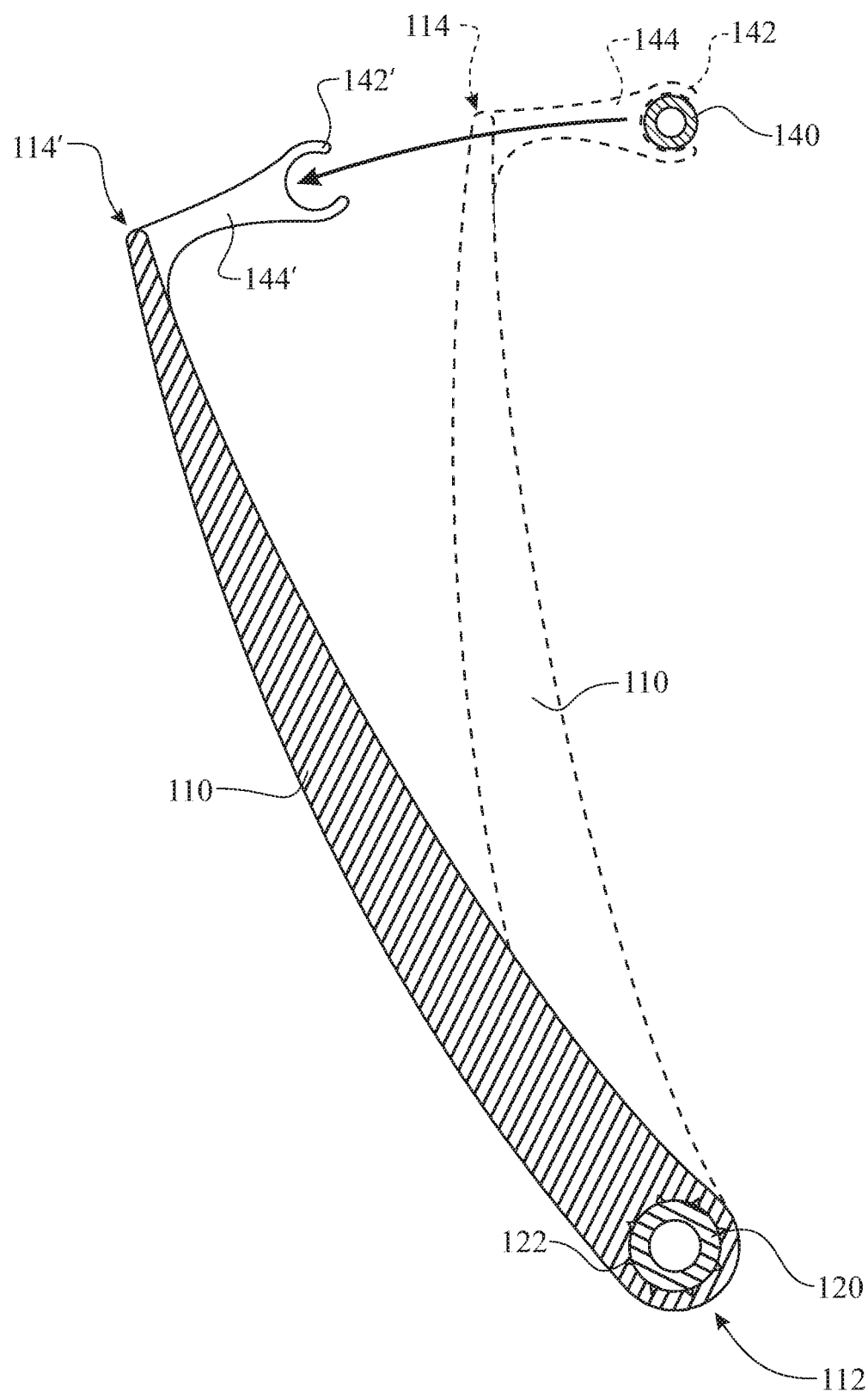
FIG. 6 presents a sectional end view of a turbine blade illustrating the operation of the breakaway mechanism of FIG. 5.

A breakaway mechanism can be incorporated to compensate when the turbine wheel assembly 100 encounters any unexpected excessive wind forces 198. One exemplary embodiment is presented in FIGS. 5 and 6. The breakaway mechanism detachably engages a breakaway clip 142 with a breakaway anchor 140. The breakaway clip 142 is secured to the blade trailing edge 114 via a breakaway frame 144. The breakaway clip 142 would detach from the breakaway anchor 140 when subjected to a predetermined force. An alternate configuration would utilize the incident angle mechanism of FIGS. 3 and 4. The incident angle controller 130 would include a ratcheting mechanism, which releases or free spools the angle control tether 134 when subjected to a predetermined force. It is understood that other configurations known by those skilled in the art can be integrated with the turbine wheel assembly 100, providing a breakaway mechanism.

Figure 7:
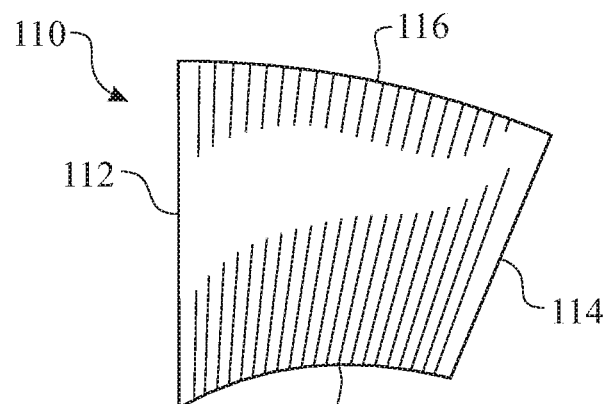
FIG. 7 presents a front view of a first exemplary turbine blade shape.
Figure 8:
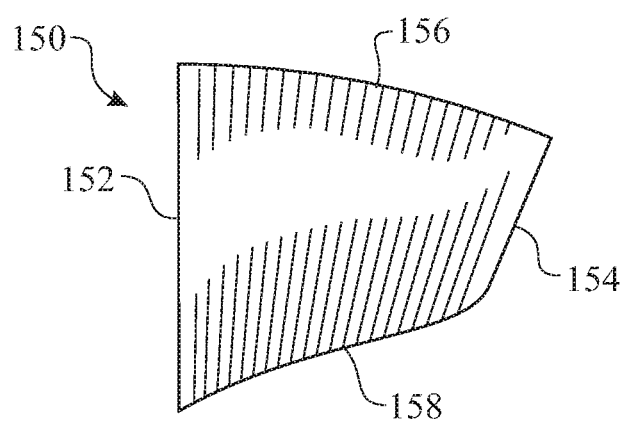
FIG. 8 presents a front view of a second exemplary turbine blade shape.
Figure 9:
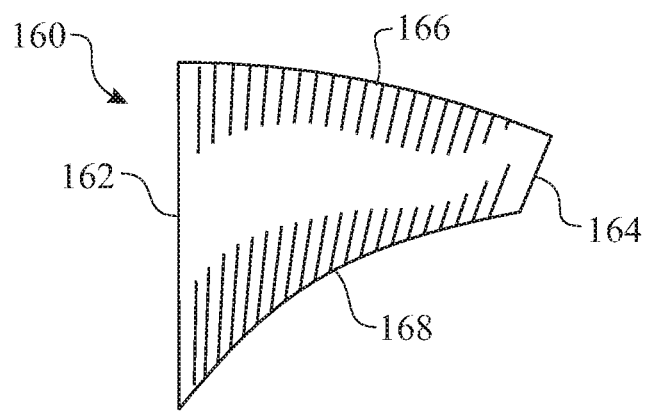
FIG. 9 presents a front view of a third exemplary turbine blade shape.

The turbine blades can be configured in a variety of shapes, as illustrated in FIGS. 7 through 9. A planar view of the turbine blades 110 is presented in FIG. 7, having an airfoil cross sectional shape bounded by a blade leading edge 112, a blade trailing edge 114, a posterior edge 116 and an interior edge 118. The turbine blades can be configured of a variety of cross sectional and peripheral shapes. The configuration defines the total surface area. The surface area, cross sectional shapes and peripheral shape all affect the efficiency of the turbine blades 110. The interior edge 118 provides an arched lower edge wherein the blade trailing edge 114 is equal to or slightly shorter than the blade leading edge 112. A planar view of a turbine blade 150 is presented in FIG. 8, having an airfoil cross sectional shape bounded by a blade leading edge 152, a blade trailing edge 154, a posterior edge 156 and an interior edge 158. The interior edge 158 provides an "S" shaped lower edge having a continuous line blending into the blade trailing edge 114, and wherein the blade trailing edge 114 is shorter than the blade leading edge 112. A planar view of a turbine blade 160 is presented in FIG. 9, having an airfoil cross sectional shape bounded by a blade leading edge 162, a blade trailing edge 164, a posterior edge 166 and an interior edge 168. The interior edge 168 provides an arched shaped lower edge wherein the blade trailing edge 164 is significantly shorter than the blade leading edge 162.

A turbine deployment assembly 200 is illustrated in FIGS. 10 through 15. A vertical riser support 202 provides a base member for the turbine deployment assembly 200. An electrical power generator 204 is pivotally assembled to the upper portion of the vertical riser support 202. The turbine wheel assembly 100 is in rotational communication with the electrical power generator 204 via a turbine wheel shaft 206. A counterbalance 210 can be incorporated providing a counterbalance to the turbine wheel assembly 100. The counterbalance 210 would be assembled to the turbine deployment assembly 200 via a counterbalance support beam 212.

Figure 12:
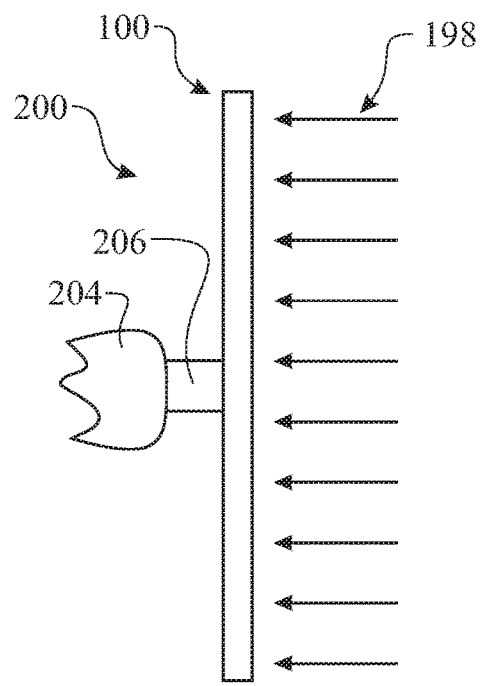
FIG. 12 presents a partial top view of the wind power harnessing structure of FIG. 10, configured perpendicular to an airflow.
Figure 13:
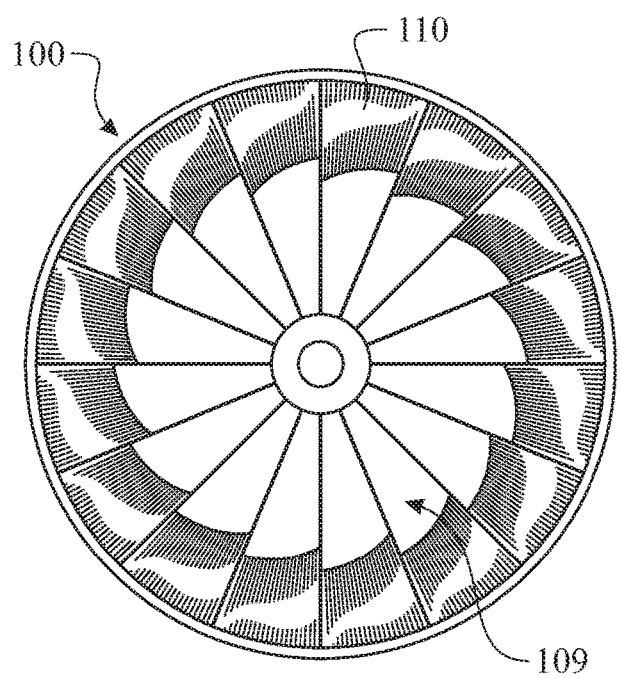
FIG. 13 presents a front view of the turbine wheel configured perpendicular to the airflow.
Figure 14:
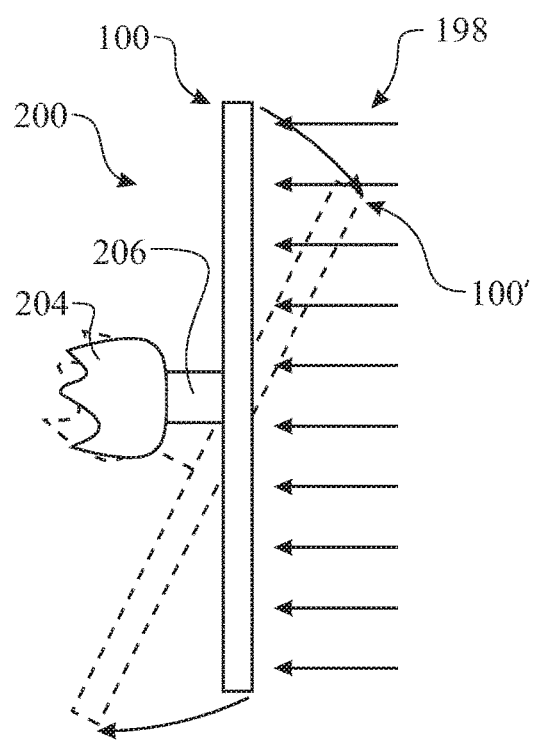
FIG. 14 presents a partial top view of the wind power harnessing structure of FIG. 10, rotated away from being perpendicular to the airflow.
Figure 15:
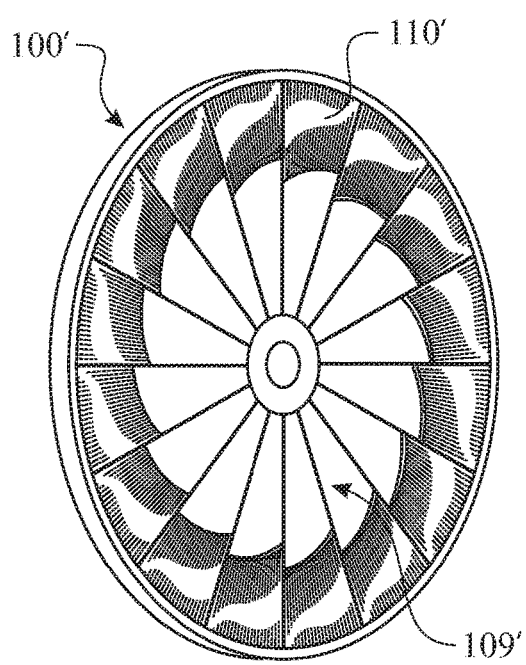
FIG. 15 presents a front view of the turbine wheel, rotated away from being perpendicular to the airflow.

The electrical power generator 204 is designed to rotate about a vertical axis parallel to a longitudinal axis of the vertical riser support 202 as shown in the top views of FIG. 14. The rotation positions the turbine wheel assembly 100 to rotated position turbine wheel assembly 100'. The rotation allows for several capabilities. The first, being positioning the turbine wheel assembly 100 perpendicular to the wind flow 198 as shown in FIG. 12, thus maximizing the frontal surface area as illustrated in FIG. 13. The second, being positioning the turbine wheel assembly 100 at an angle that is not perpendicular to the wind flow 198 as shown in FIG. 14, thus reducing the frontal surface area exposed to the wind flow 198 as illustrated in FIG. 15. This reduces any potential damage from excessive winds. The incident angle mechanism and the breakaway mechanism both additionally contribute to efficiency, reliability, and protection of the turbine deployment assembly 200.

Figure 16:
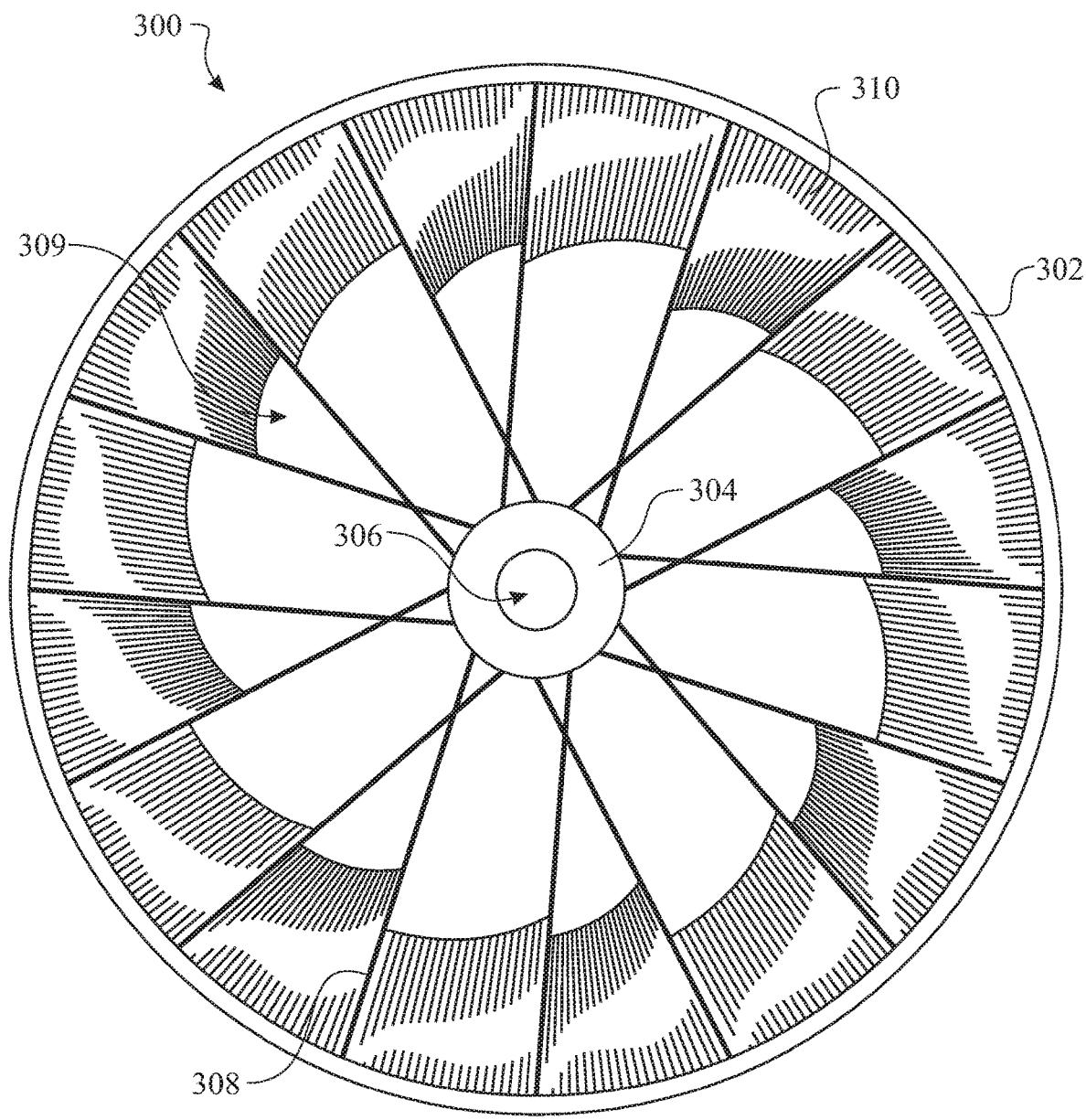
FIG. 16 presents a front view of a second exemplary embodiment of a turbine wheel assembling adjacent spokes in an overlapping configuration.

An alternate spoke configuration is presented in the exemplary embodiment referred to as a crossover spoke turbine wheel assembly 300, illustrated in FIG. 16. The crossover spoke turbine wheel assembly 300 is similar to the turbine wheel assembly 100. Like features of crossover spoke turbine wheel assembly 300 and turbine wheel assembly 100 are numbered the same except preceded by the numeral '3'. The turbine spokes 308 are arranged being fixed to the central hub 304 offset from the radial centerline. The turbine spokes 308 are configured whereby adjacent turbine spokes 308 overlap. The overlap between the spokes 308 occurs proximate the central hub 304.

Figure 17:
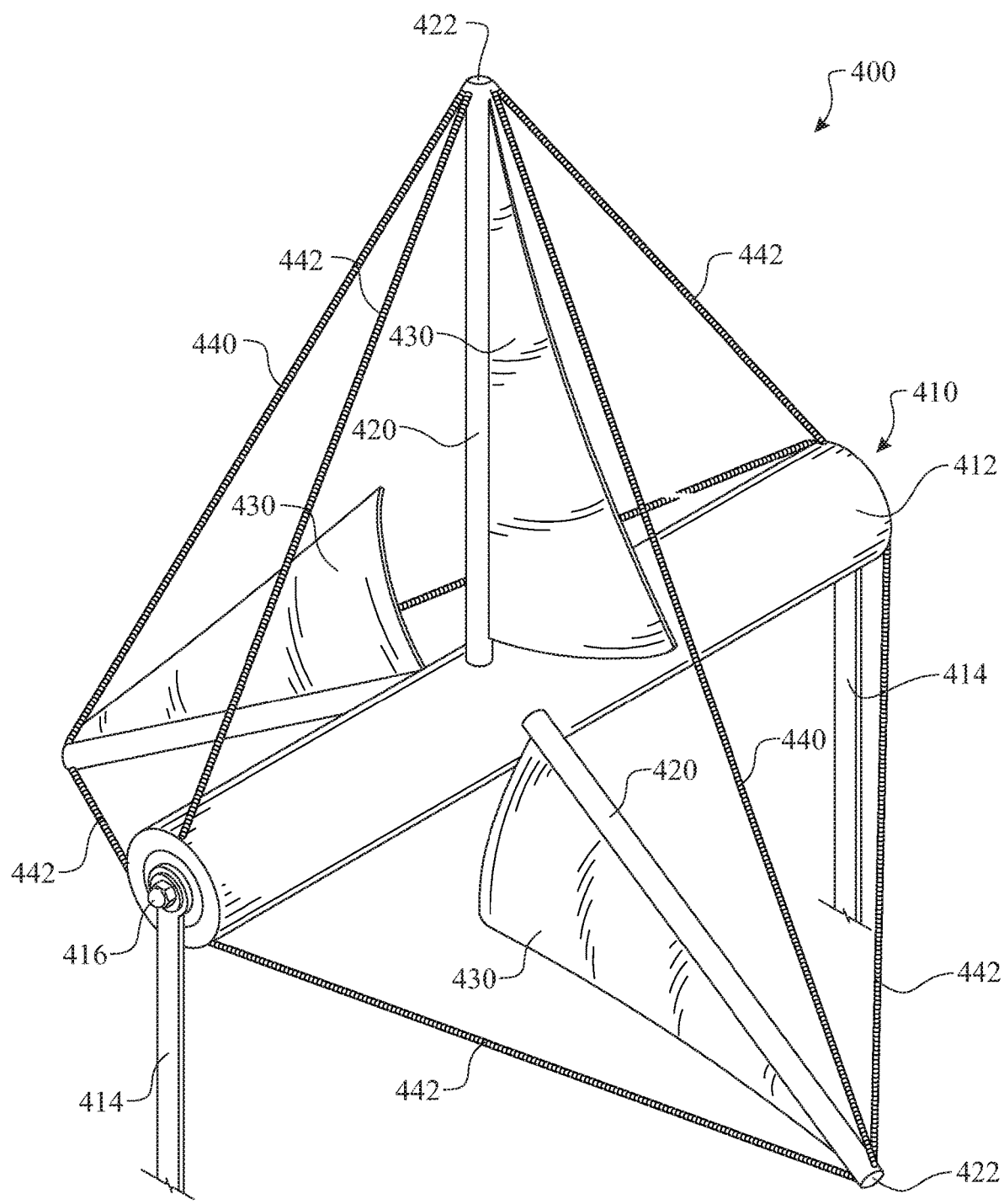
FIG. 17 presents an isometric view of a third exemplary embodiment of a turbine wheel utilizing a plurality of masts supported by an arrangement of tension cables.
Figure 18:
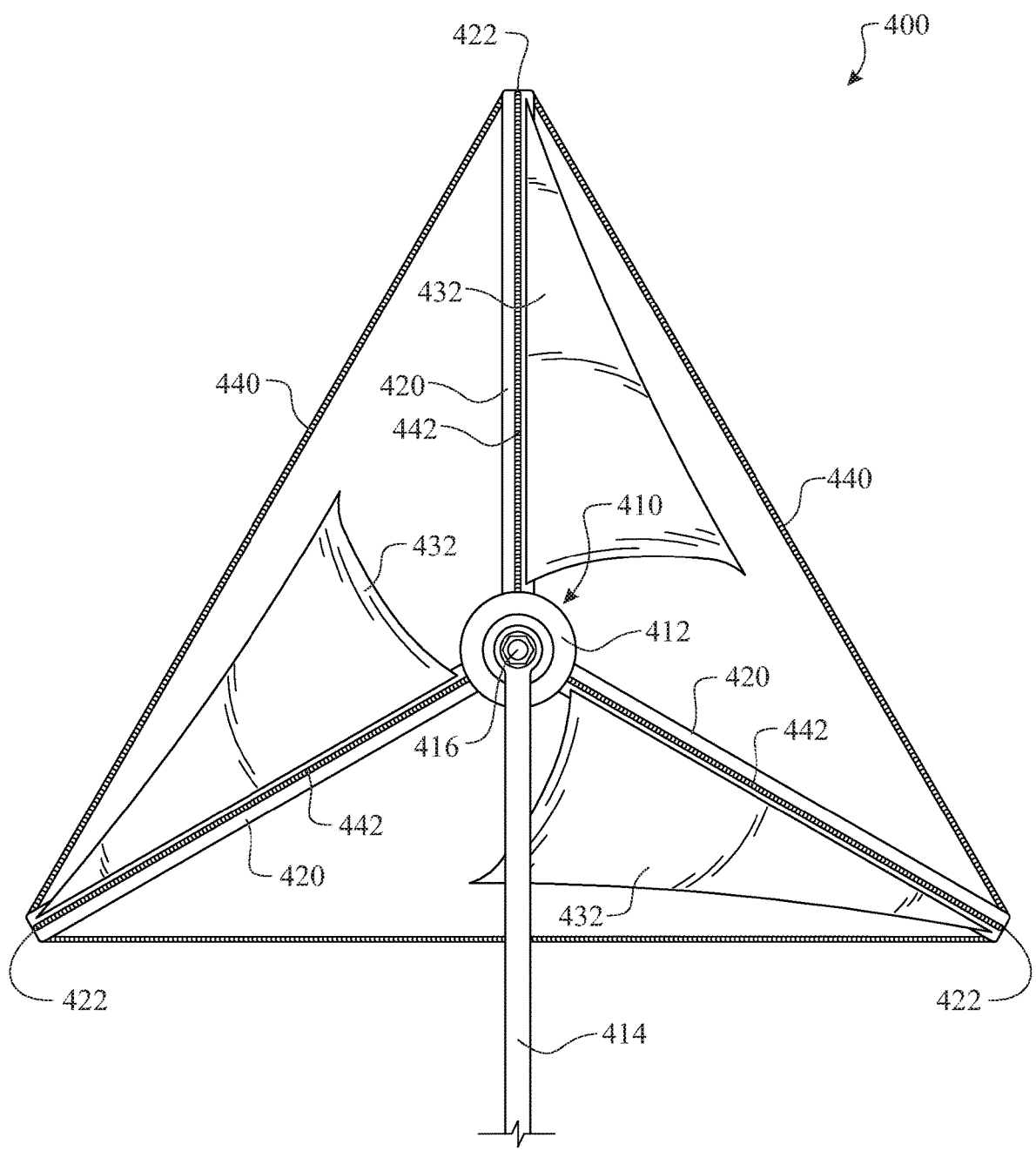
FIG. 18 presents a front elevation view of the third exemplary turbine wheel of FIG. 17.
Figure 19:
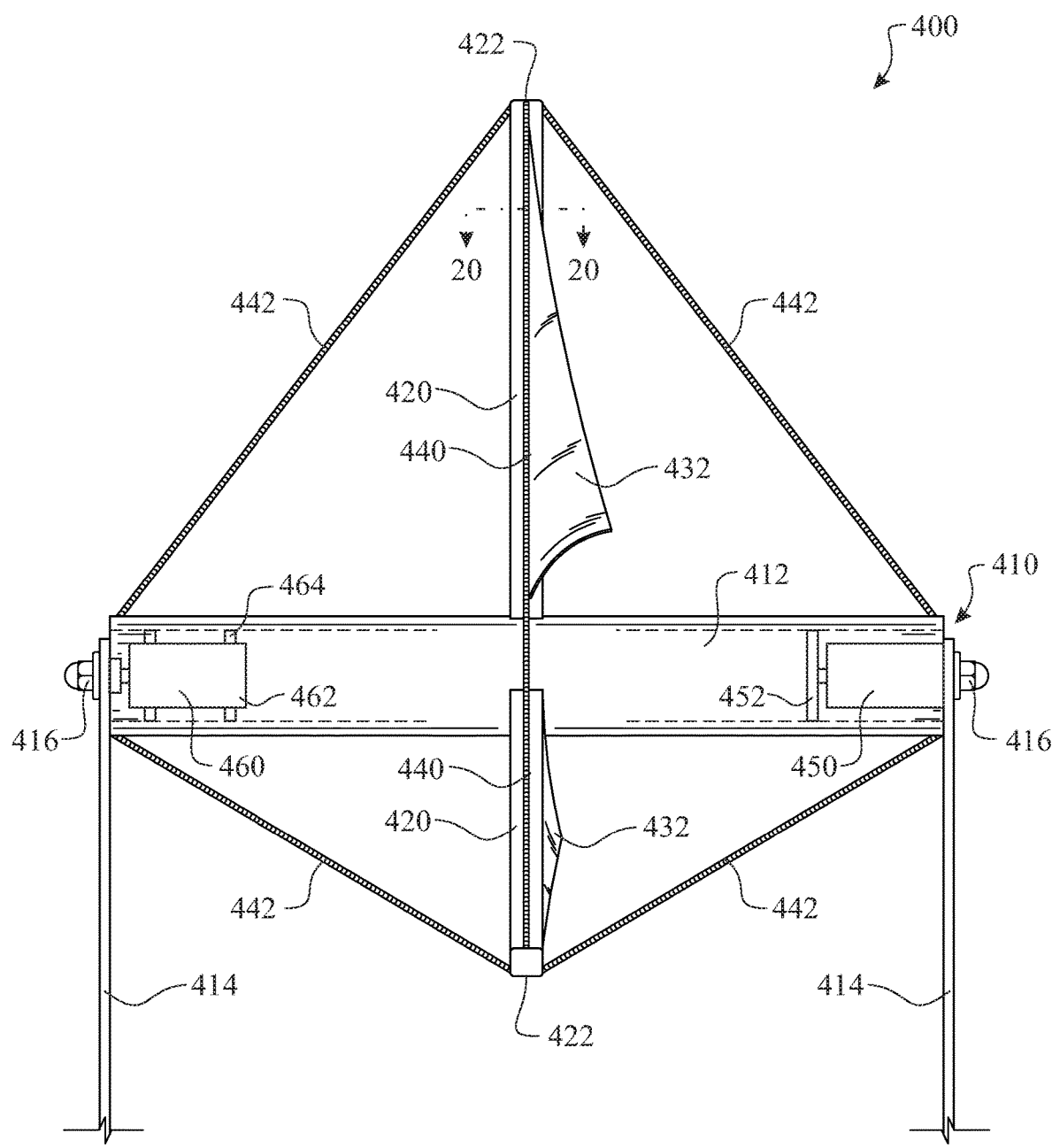
FIG. 19 presents a side elevation view of the third exemplary turbine wheel of FIG. 17.

Another exemplary embodiment is referred to as a cable supported mast turbine assembly 400, illustrated in FIGS. 17 through 19. The cable supported mast turbine assembly 400 is fabricated having a plurality of mast 420 extending radially from a central hub 412 of a power generating central hub assembly 410. The central hub 412 is supported by a pair of hub support members 414; having one hub support member 414 located at each end of the central hub 412. The central hub 412 is rotationally assembled to the hub support member 414 via a hub coupling member 416. A generator is provided in communication with the central hub 412, being placed within the central hub 412, adjacent to the central hub 412, or any other reasonable location. As the central hub 412 rotates, the generator creates electrical power. It is also understood that the rotational motion of the central hub 412 can be mechanically coupled to other objects to drive a motion of the other objects accordingly.

The masts 420 are supported by an arrangement of cabling. Mast-to-mast tension cables 440 span between mast distal ends 422 of each adjacent mast 420. Each mast-to-mast tension cable 440 is tightened having a tensile force equal to the others. The mast-to-mast tension cables 440 provide stability to the mast 420 against a torsional force generated by the rotation of the central hub 412. A mast-to-axle tension cable 442 spans between each end of the central hub 412 and the mast distal end 422 of each of the masts 420. The plurality of mast-to-axle tension cables 442 provides stability against any cross-directed forces, such as wind, vibrations, and the like.

The cables 440, 442 can be secured to the respective member using any reasonable and well-known interface. The interface can include a tensioning member, such as a turnbuckle, and the like. The cables 440, 442 can be fabricated using any of many well-known methods, including a single cable, a series of wrapped or bound smaller cables, and the like. The cross-sectional shape of the mast 420 are preferably aerodynamic, such as round (as shown), wing-shaped, and the like.

A turbine blade can be provided as either a pliant turbine blade 430 or a rigid turbine blade 432. When incorporating the pliant turbine blade 430, the cable supported mast turbine assembly 400 can include a tether or blade tensioning cable 444 spanning between an unattached corner or other region of the pliant turbine blade 430 and a location proximate an axial end of the central hub 412. The blade tensioning cable 444 can be fixed or adjustable. A motor can be utilized to retract or extend the blade tensioning cable 444, adjusting the tautness of the blade tensioning cable 444. A tensioning member can release the blade tensioning cable 444 should the blade tensioning cable 444 be subjected to a force above a predetermined limit, thus avoiding any damage to the cable supported mast turbine assembly 400.

Alternately, the rigid turbine blade 432 can be rigidly affixed to the mast 420. The mast 420 can be pivotally attached to the central hub 412, including a drive mechanism for rotating the mast 420, thus adjusting the angle of incidence of the pliant turbine blade 430.

Figure 20:
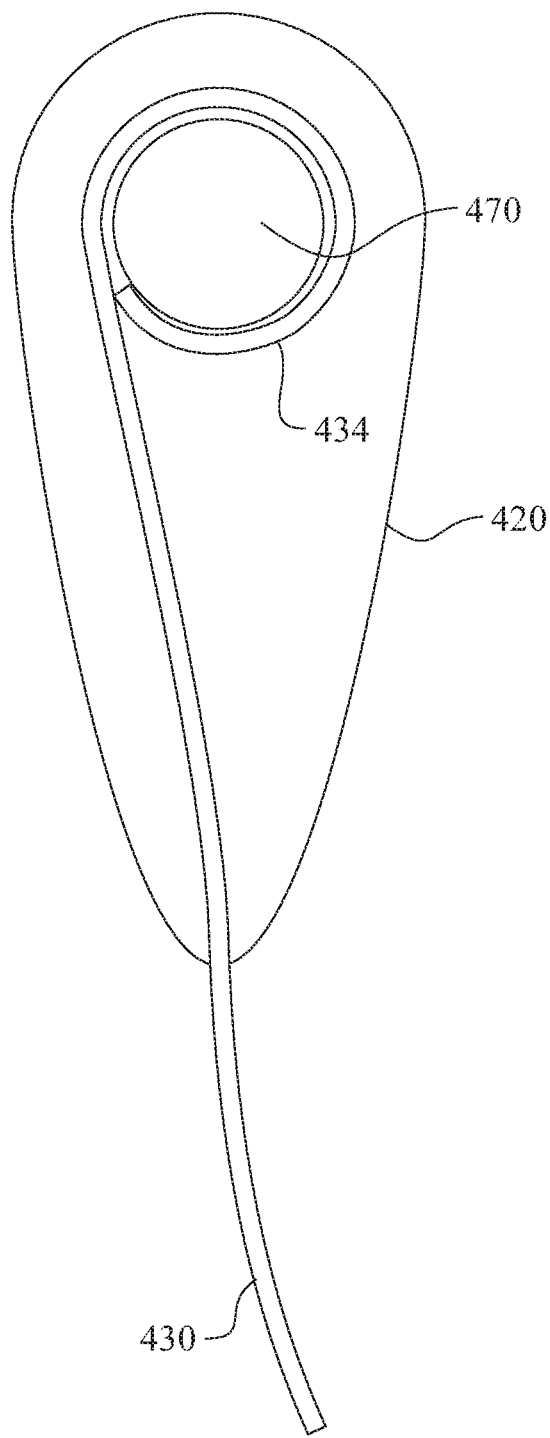
FIG. 20 presents a cross sectional view of the mast taken along section line 20-20 of FIG. 19, the illustration additionally introducing a blade retracting mechanism.

Any additional operational features of the turbine wheel assembly 100 can be applied to the cable supported mast turbine assembly 400. The mast 420 can include a hollow center, allowing the user to retract at least a portion of the pliant turbine blade 430 therein to reduce the exposed surface area thereof as illustrated in FIG. 20. A retracting mechanism 470 can be provided to gather the pliant turbine blade 430 within an interior section of the mast 420. One such means would be to rotate the retracting mechanism 470 collecting the pliant turbine blade 430, storing the excess material in a wrap referenced as a retracted turbine blade portion 434. The retracting mechanism 470 can be an elongated rotating structure such as an axle rotated by a motor or other rotational operating device.

The cable supported mast turbine assembly 400 is provided as a means for generating power. The cable supported mast turbine assembly 400 is designed whereby the central hub 412 is rotated by wind. The rotation of the central hub 412 is then converted into useable energy. A mechanical interface can engage with the central hub 412 to transfer mechanical power to drive a secondary apparatus. The mechanical interface can direct mechanical motion of a secondary apparatus. Alternately, an electricity generating apparatus 450 can engage with the central hub 412 to create electrical power. The electricity generating apparatus 450 can be located within an interior of the central hub 412 or external to the central hub 412. One portion of the electricity generating apparatus 450 remains stable and a second portion of the electricity generating apparatus 450 engages with the central hub 412 to rotate. The rotating motion drives the electricity generating apparatus 450 to create the electrical output. As illustrated on the right side of FIG. 19, the electricity generating apparatus 450 is secured to the hub support member 414. A generator interface 452 is attached to an axle of the electricity generating apparatus 450 and engages with an interior surface of the central hub 412. The central hub 412 rotationally drives the generator interface 452. The generator interface 452 rotates windings of a generator, which pass across fixed stators creating the electrical output. Conversely, as illustrated on the left side of FIG. 19, an electricity generating apparatus 460 can be secured to the interior surface of the central hub 412 via a generator mount 464. A generator interface 462 is attached to a fixed member, such as the hub support member 414. The motion of the central hub 412 causes the electricity generating apparatus 460 to rotate respective to the generator interface 462, thus generating the electrical output.

The turbine assemblies 100, 400 can be utilized for gas flow, such as gaseous flows, such as wind, or fluid flows, such as wave motion, currents, tidal flow, and the like. It is also understood that the turbine assembly 100, 400 can be attached to a moving object. The turbine assembly 100, 400 creates an output power based upon the relative motion between the turbine assembly 100, 400 and a fluid (either gaseous or liquid).

The previously described embodiments integrate the electric power generator 204, 450, 460 into the power generating central hub assembly 410 of the turbine assembly 200, 400. Electric power generators 204, 450, 460 are generally heavy, wherein the weight impacts the structural design and directional rotatability of the turbine assembly 200, 400.

Figure 21:
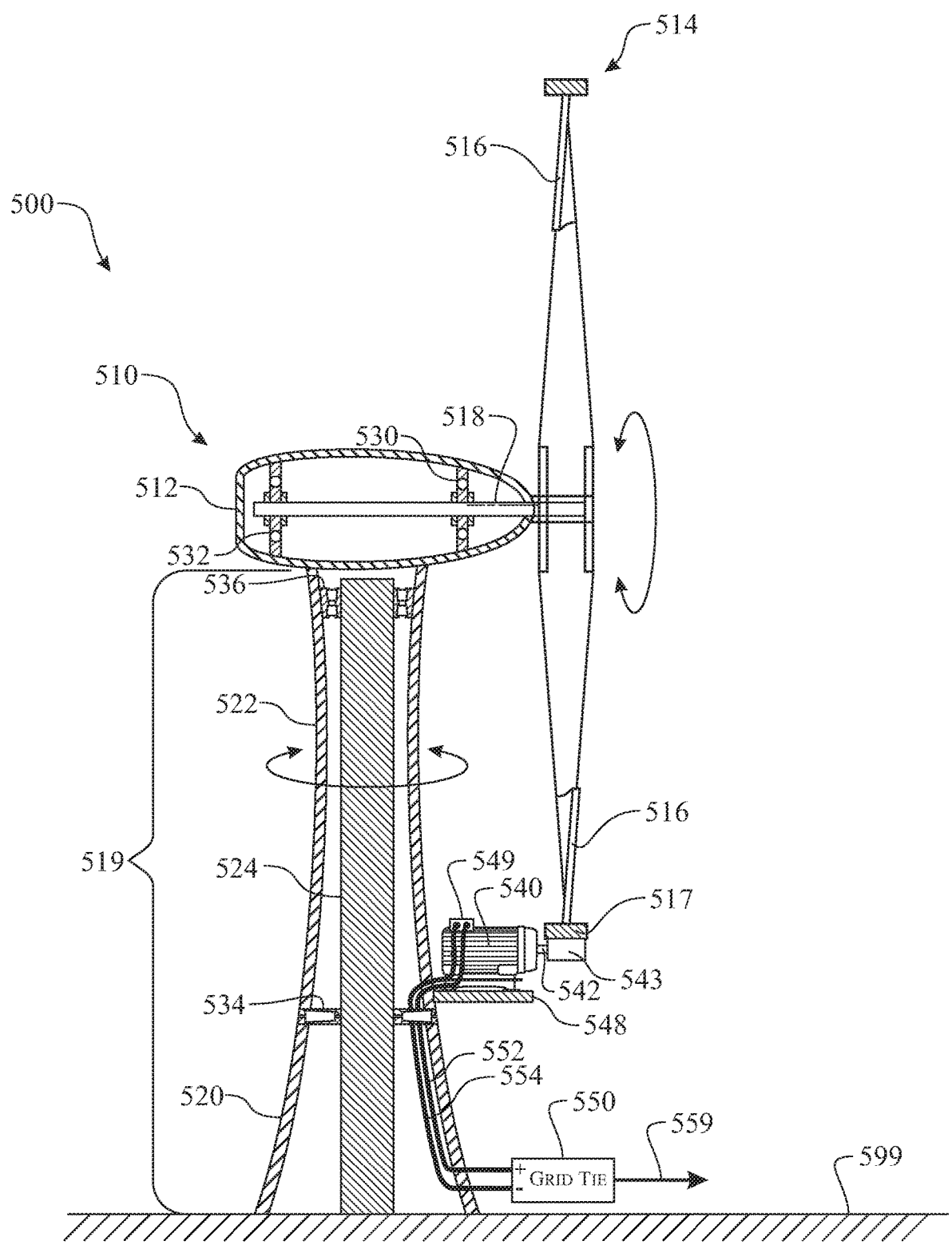
FIG. 21 presents a partially sectioned view of an exemplary wind operated electrical power generating system employing a peripheral edge of an outer rim of the exemplary turbine wheel to drive a generator.

A wind operated electrical power generating system 500, as shown in an exemplary illustration presented in FIG. 21, introduces an alternative configuration for transferring wind energy to an electric generator 540. In the exemplary illustration, The wind operated turbine assembly 510 includes a turbine housing 512 carried by a vertical riser support structure 519. The vertical riser support structure 519 is structurally supported by a system supporting surface 599. In a preferred configuration, the vertical riser support structure 519 is rigidly mounted to the system supporting surface 599. The system supporting surface 599 can be a cement slab; a natural earth surface, such as dirt, rocks, and the like; a wooden structure, a mobile vehicle, a floating vessel, and the like. The mounting configuration would be determined based upon the selected supporting material. The turbine housing 512 is preferably located atop a distal end of the vertical riser support structure 519. The turbine housing 512 includes various features required for operation of the wind operated turbine assembly 510. A turbine blade subassembly 514 is rotationally assembled to the turbine housing 512 using a turbine blade subassembly shaft 518. The turbine blade subassembly 514 can be of any suitable design, including a three blade 516 design as illustrated, the turbine wheel assembly 100, the crossover spoke turbine wheel assembly 300, the cable supported mast turbine assembly 400, a tension airfoil assembly 800 (oriented in a horizontal arrangement for lift, and referred to as a tension airfoil lifting assembly 800 as introduced in FIG. 27 and oriented in a vertical orientation for use as a wind collecting device and referred to as a tension airfoil turbine assembly 800) (and any of the associated variants), and any other suitable wind power collecting design.

The turbine blade subassembly shaft 518 can be supported by a series of bearing assemblies, such as a turbine blade shaft supporting forward bearing assembly 530 and a turbine blade shaft supporting rear bearing assembly 532 illustrated in FIG. 21. The bearing assemblies 530, 532 can employ spherical bearings, cylindrical rolling elements, tapered rolling elements, barrel shaped rolling elements, and the like. Each bearing assembly 530, 532 would include an inner ring and an outer ring (not identified but well known by description by those skilled in the art). The bearing assemblies 530, 532 enable rotation of the turbine blade subassembly shaft 518 with minimal friction. It is understood that any arrangement can be utilized to enable rotation of the turbine blade subassembly 514 about a substantially horizontal axis.

In the exemplary illustration, the electric generator 540 engages with a peripheral surface or of a turbine blade outer rim surface 517 of the turbine blade subassembly 514. More specifically, an electric generator turbine rim engagement wheel 543 is secured to a distal or free end of an electric generator shaft 542 of the electric generator 540. The electric generator turbine rim engagement wheel 543 can be directly engaging with the peripheral surface of an electric generator turbine rim engagement wheel 543, engaging via a gearing arrangement or a transmission, engaging using a belt that partially circumscribes the peripheral surface of an electric generator turbine rim engagement wheel 543, engaging using a belt that partially circumscribes the turbine blade subassembly shaft 518, or any other suitable arrangement to transfer a rotational motion caused by the turbine blade subassembly 514 to the electric generator shaft 542 of a distally mounted electric generator 540. The electric generator 540 is preferably supported by an electric generator support component 548, where the electric generator 540 is mechanically coupled to the electric generator support component 548 and the electric generator support component 548 is mechanically assembled to a vertical riser support structure rotating section 522 of the vertical riser support structure 519.

In the arrangement of the wind operated electrical power generating system 500, the electric generator 540 should remain in alignment with rotational transferring element of the turbine blade subassembly 514. In order to accomplish this, the vertical riser support structure 519 is arranged in at least two sections: a vertical riser support structure rotating section 522 rotationally assembled to a vertical riser support structure base section 520. Rotation and support between the vertical riser support structure rotating section 522 and the vertical riser support structure base section 520 can be provided by a vertical riser support structure base bearing assembly 534. The vertical riser support structure base bearing assembly 534 would be arranged similar to any rotating mechanism that rotates an upper element respective to a lower element about a vertical axis. The rotation can be provided by a powered arrangement or a free motion, where wind could orient the direction of the vertical riser support structure rotating section 522. In the exemplary illustration, tapered rolling elements are contained between an outer ring and an inner ring forming the vertical riser support structure base bearing assembly 534. An inner diameter of one of the bearing assembly rings can be assembled to a vertical riser support structure stabilizing column 524, where the vertical riser support structure stabilizing column 524 provides support along a length of the vertical riser support structure 519. A vertical riser support structure upper stabilizing bearing assembly 536 can be assembled at an upper end of the vertical riser support structure 519 to provide additional support of the vertical riser support structure rotating section 522. The vertical riser support structure upper stabilizing bearing assembly 536 could be arranged having an inner ring assembled to the vertical riser support structure stabilizing column 524 and an outer ring assembled to the vertical riser support structure rotating section 522. In the exemplary illustration, the vertical riser support structure upper stabilizing bearing assembly 536 employs pairs of tapered rolling elements to maintain support of the bearing elements in a vertical direction, while stabilizing the vertical riser support structure rotating section 522 in a horizontal direction.

The turbine housing 512 can be rigidly fixed to the vertical riser support structure 519 or rotationally carried by the vertical riser support structure 519. In a configuration where the turbine housing 512 is rotationally carried by the vertical riser support structure 519, the turbine housing 512 would rotate to optimize the directional relationship between the turbine blade subassembly 514 and the direction of the wind. In the exemplary embodiment, the vertical riser support structure rotating section 522 would rotate respective to the vertical riser support structure base section 520. The combination of the vertical riser support structure base section 520 and the vertical riser support structure stabilizing column 524 provides support to the vertical riser support structure rotating section 522.

Electrical power generated by the electric generator 540 would be collected and transferred to a grid tie 550 by an electric output panel 549, a positive electrical output cable 552, and a negative electrical output cable 554. The grid tie 550 would, in turn, transfer the generated electrical power to a power grid 559 for collection and use.

Figure 22:
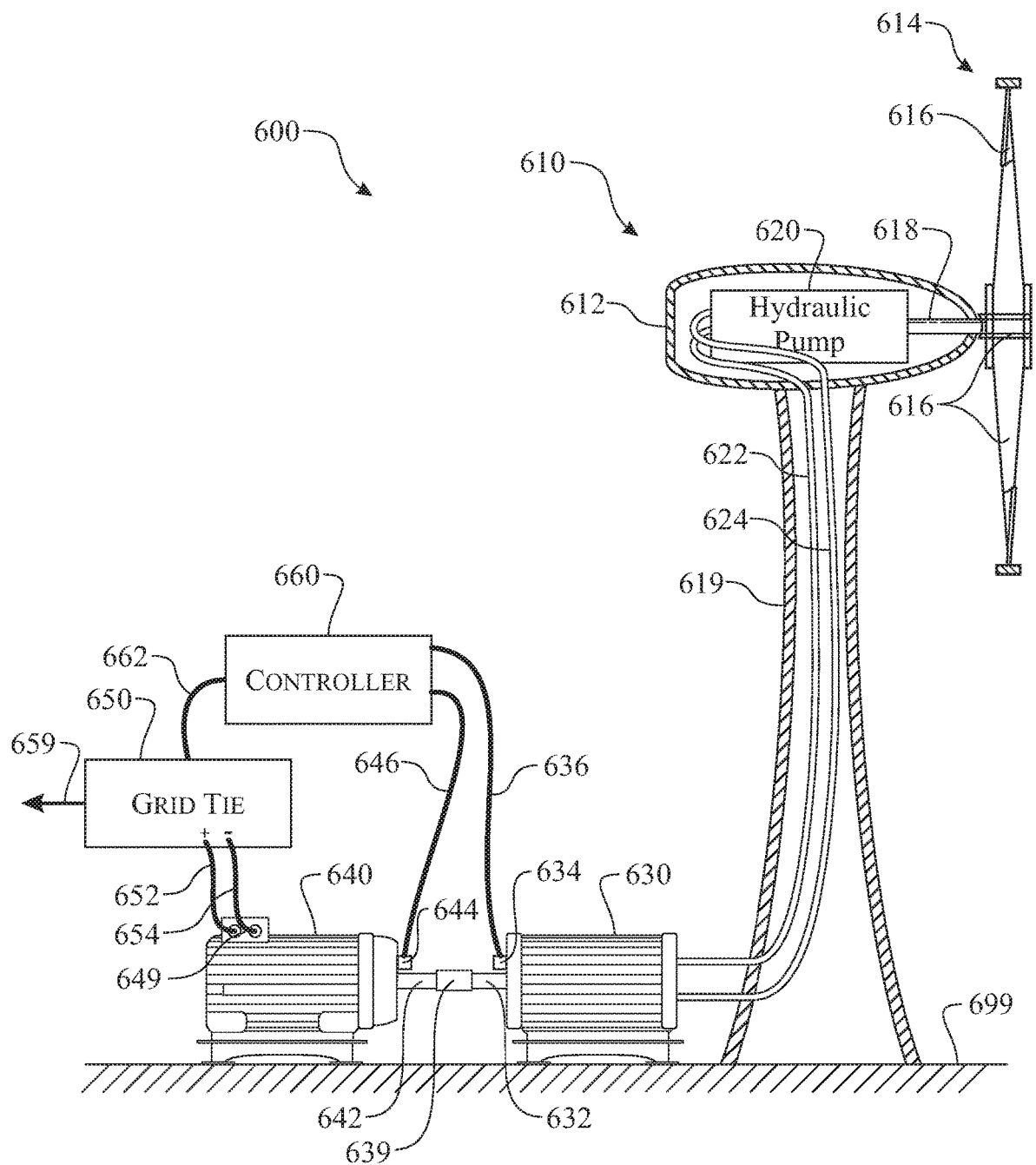
FIG. 22 presents a partially sectioned view of an exemplary wind operated electrical power generating system employing a hydraulic power transfer system and a power optimizing controller.

A wind operated electrical power generating system 600, as shown in an exemplary illustration presented in FIG. 22, introduces another alternative configuration for transferring wind energy to an electric generator 640. The wind operated electrical power generating system 600 and the wind operated electrical power generating system 500 include a number of like elements. Like elements of the wind operated electrical power generating system 600 and the wind operated electrical power generating system 500 are numbered the same, where elements associated with the wind operated electrical power generating system 600 are preceded by the numeral "6", except where disclosed herein. The wind operated electrical power generating system 600 employs a hydraulic system for transferring energy collected from wind to the electric generator 640. In the exemplary configuration, the vertical riser support structure 619 is rigidly mounted to the system supporting surface 699 (similar to the system supporting surface 599). The turbine housing 612 is preferably located atop a distal end of the vertical riser support structure 619. The turbine housing 612 includes various features required for operation of the wind operated turbine assembly 610. The turbine housing 612 can be rigidly fixed to the vertical riser support structure 619 or rotationally carried by the vertical riser support structure 619. In a configuration where the turbine housing 612 is rotationally carried by the vertical riser support structure 619, the turbine housing 612 would rotate to optimize the directional relationship between the turbine blade subassembly 614 and the direction of the wind. In the exemplary illustration, the 612# would be rotationally assembled to a distal, free end of the 619#.

The hydraulic system includes a hydraulic pump 620 carried by the turbine housing 612, a hydraulic motor 630 distally located from the turbine housing 612 and preferably carried by the system supporting surface 699. A pair of hydraulic pipes, tubes or lines 622, 624 extends fluid communication between the hydraulic pump 620 and the hydraulic motor 630. The hydraulic lines 622, 624 can be routed within an interior of the vertical riser support structure 619, along an interior surface of the vertical riser support structure 619, along an exterior surface of the vertical riser support structure 619, or along any other supporting structure. The hydraulic lines 622, 624 can be fabricated of any suitable material. The hydraulic lines 622, 624 can be fabricated of a rigid material, such as PVC, copper, and the like, of a flexible material, such as plastic, nylon, rubber, and the like, or any combination thereof. The structure of the hydraulic lines 622, 624 can be rigid or include features to introduce flexure.

The hydraulic motor 630 is assembled in rotational communication with an electric generator 640. The hydraulic motor 630 includes a hydraulic motor shaft 632 that is rotationally driven by fluid flowing through the hydraulic lines 622, 624. The electric generator 640 includes an electric generator shaft 642, which is arranged in rotational communication with the hydraulic motor shaft 632 of the hydraulic motor 630. The hydraulic motor 630 and electric generator 640 are preferably rigidly mounted in a manner that provides and maintains dynamic alignment between the hydraulic motor shaft 632 and the electric generator shaft 642. In the exemplary embodiment, the hydraulic motor shaft 632 and the electric generator shaft 642 are coupled to one another using a shaft coupling 639. It is understood that the operational engagement can transfer a rotational force from the hydraulic motor shaft 632 to the electric generator shaft 642 using any suitable interface, including one or more gears, a clutch, a transmission, and the like.

A power control module 660 can be integrated into the wind operated electrical power generating system 600 to optimize power. The power control module 660 monitors the rotational speed of either shaft 632, 642. The wind operated electrical power generating system 600 can include at least one of a hydraulic motor shaft rotational speed sensor 634 and an electric generator shaft rotational speed sensor 644. The hydraulic motor shaft rotational speed sensor 634 would be arranged to monitor the rotational speed of the hydraulic motor shaft 632. A hydraulic motor shaft rotational speed sensor signal communication link 636 provides signal communication between the hydraulic motor shaft 632 and the power control module 660. The electric generator shaft rotational speed sensor 644 would be arranged to monitor the rotational speed of the electric generator shaft 642. An electric generator shaft rotational speed sensor signal communication link 646 provides signal communication between the electric generator shaft 642 and the power control module 660. The power control module 660 can operate using the hydraulic motor shaft rotational speed sensor 634, the electric generator shaft rotational speed sensor 644 or both. It is understood that the power control module 660 can include compensation information when gears, a transmission, or any other ratio translating interface is integrated between the hydraulic motor shaft 632 and the electric generator shaft 642. The components of the power control module 660 can be assembled into and/or onto a power controller enclosure 664.

The controller governs the power output from the electric generator 640 to a grid tie 650. The power control module 660 is in electric communication with the grid tie 650 using a power control module electrical communication link 662. Alternatively, the power control module 660 can be in electric communication with the electric generator 640 to accomplish the same end result using an alternate power control module electrical communication link 561.

Electrical power generated during operation of the electric generator 640 is transferred from the electric generator 640 through an electric output panel 649. In the exemplary embodiment, a pair of electrical output cables (a positive electrical output cable 652 and a negative electrical output cable 654) is used to provide electric communication between the electric generator 640 and the grid tie 650. The grid tie 650 provides electrical communication between at least one of the controller 660 and the generator 640 and an electric power grid 659. The generated electric power is transferred to a power grid 659 for use.

In operation, rotation of the turbine blade subassembly 614 is transferred to the hydraulic pump 620 by the turbine blade subassembly shaft 618. The rotational input to the hydraulic pump 620 generates a hydraulic fluid flowing down the first hydraulic line 622 and returning through the second hydraulic line 624. The hydraulic fluid flows through the hydraulic motor 630 causing the hydraulic motor 630 to rotate. The rotational motion of the hydraulic motor shaft 632 created by the hydraulic fluid flow drives a rotation of the electric generator shaft 642. The rotational motion of the electric generator shaft 642 powers the electric generator 640 to generate electric power. The electric power is fed to the electric output panel 649, which distributes the generated electric power through any number of electrical output cables 652, 654. It is understood that a grounding connection can be provided through a casing, frame, or other electrically conductive component of the electric generator 640.

Figure 23:
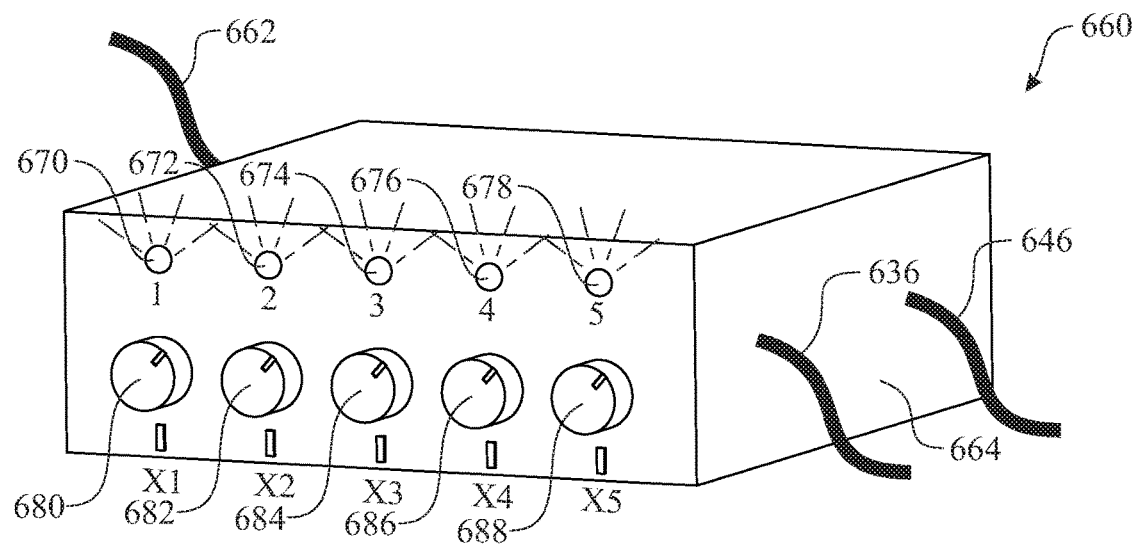
FIG. 23 presents an enlarged view of the power optimizing controller introduced in FIG. 22.

The power control module 660 is integrated into the wind operated electrical power generating system 600 to optimize or maximize electric output. Details of the power control module 660 are provided in FIG. 23. Integration of the power control module 660 is illustrated in an exemplary schematic diagram shown in FIG. 24.

The power control module 660 includes a circuit that monitors the rotational speed of either or both of the hydraulic motor shaft 632 and electric generator shaft 642 using the hydraulic motor shaft rotational speed sensor 634 and/or the electric generator shaft rotational speed sensor 644. The circuit includes a microprocessor, a digital memory device, at least one rotational speed indicator and at least one potentiometer (variable resistor) 680, 682, 684, 686, 688, wherein each of the at least one potentiometer (variable resistor) 680, 682, 684, 686, 688 is associated with a respective rotational speed indicator 670, 672, 674, 676, 678 of the at least one rotational speed indicator 670, 672, 674, 676, 678. The rotational speed indicator can be any suitable alert, including an audible alert, a visual alert, a transmitted message, a tactile alert, and the like, and any combination thereof. The audible alert can be a continuous audible signal, a cyclical or pulsed audible signal, a siren, and the like. The visual alert can be a continuously illuminated light, a flashing light, a light changing color, and the like. The light can be a Light Emitting Diode (LED), an incandescent bulb, a fluorescent bulb, and the like. A transmitted message can be a text message, an email, a broadcast message, an audible or recorded message, an audible message transmitted to a cellular phone, and the like.

Each employed rotational speed sensor 634, 644 is in signal communication with the microprocessor by any suitable communication element, including hardwired, wireless, magnetic communication, and the like, and any combination thereof. As the rotational speed of the shafts 632, 642 approach a predetermined rotational speed, the associated rotational speed indicator 670, 672, 674, 676, 678 changes state to alert an individual monitoring the system. The individual monitoring the system would subsequently adjust the associated potentiometer (variable resistor) 680, 682, 684, 686, 688 to optimize the electric power output. Each of the rotational speed indicators 670, 672, 674, 676, 678 is associated with a specific predetermined rotational speed. It is understood that the predetermined rotational speed can be programmable, adjustable, or automatically determined by an algorithm programmed into the microprocessor/memory. The change in resistance is conveyed through the power control module electrical communication link 662. It is understood that any suitable circuitry can be employed to introduce the variable resistance from the associated potentiometer (variable resistor) 680, 682, 684, 686, 688 into the electric circuit of the electric generator 640 and/or the grid tie 650, such as integration of a transformer 690. Although the exemplary power control module 660 presents a manual implementation, it is understood that the process can be automated.

Figure 24:
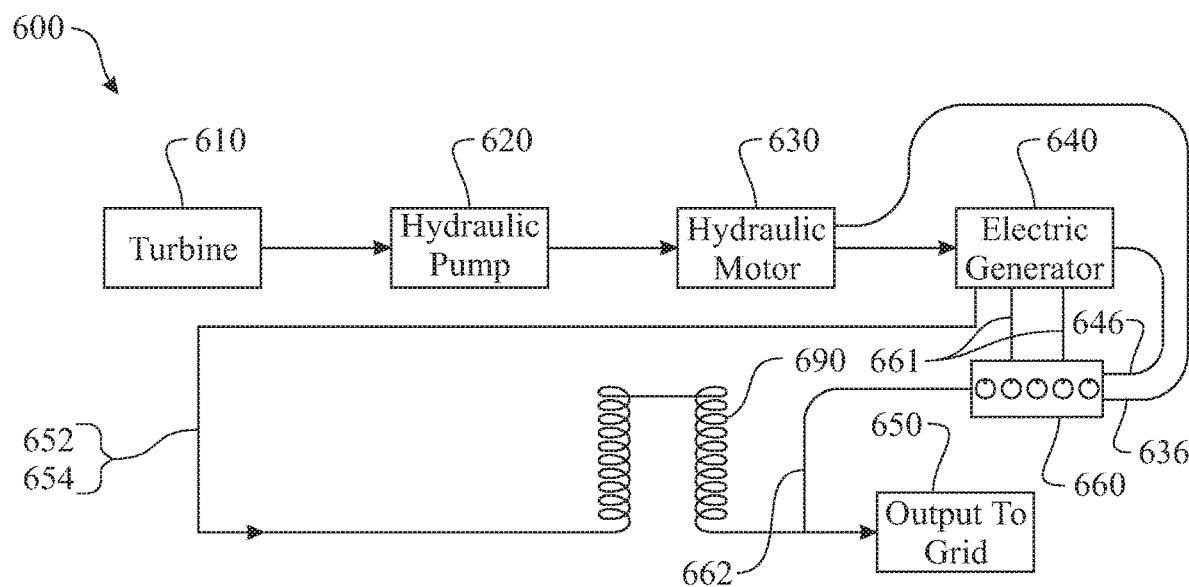
FIG. 24 presents an exemplary schematic diagram illustrating operational interactions between various components of the exemplary wind operated electrical power generating system introduced in FIG. 22.

The exemplary schematic diagram shown in FIG. 24 additionally illustrates the interaction between each of the primary components, as previously described herein.

Figure 25:
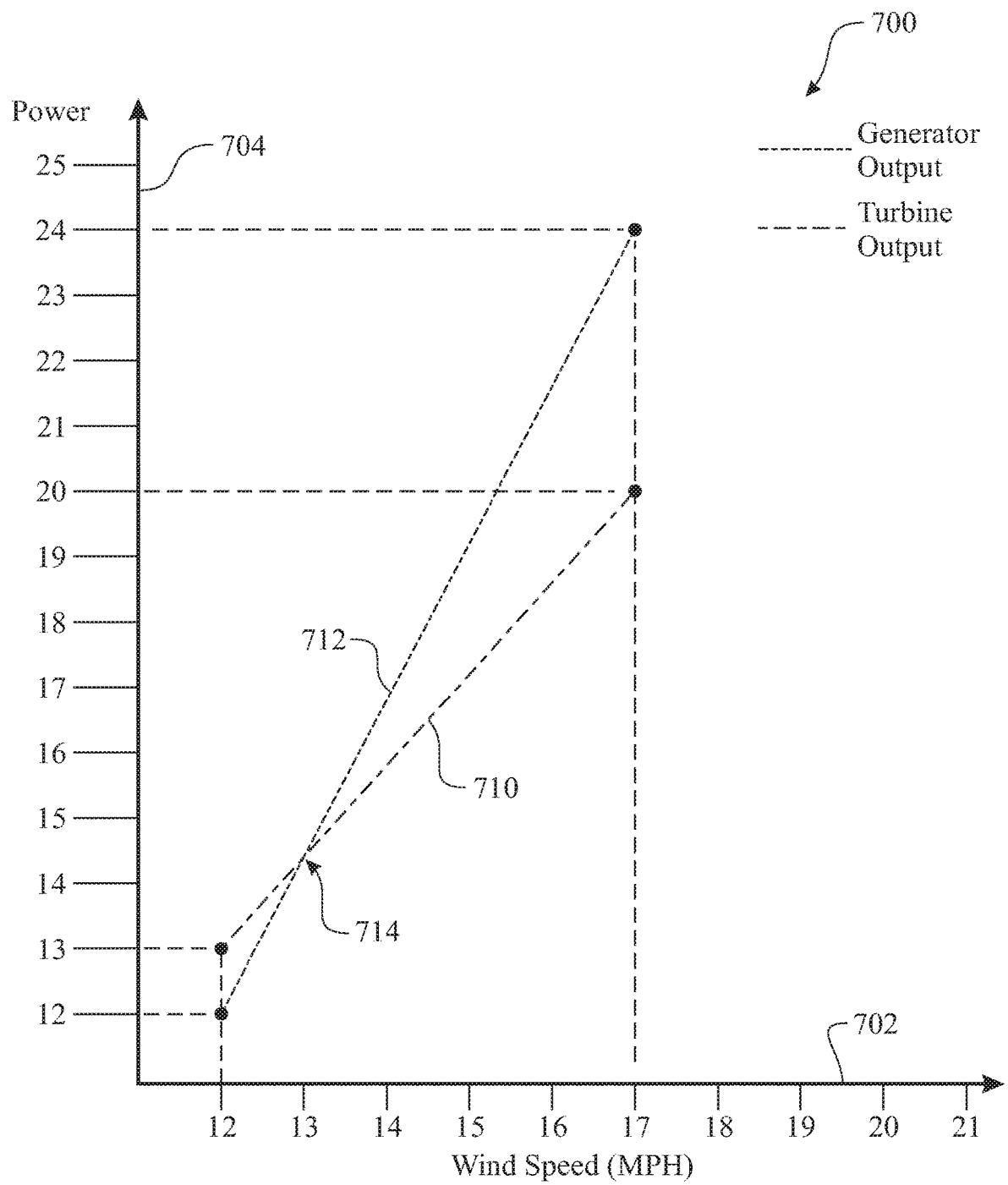
FIG. 25 presents an exemplary power output chart illustrating a power output to rotational speed relationship.

An exemplary power output chart 700 is presented in FIG. 25. The power output chart 700 plots a power output based upon a rotational speed of each of a generator (illustrated as a turbine theoretical output power curve 710) and a wind turbine (illustrated as a generator theoretical output power curve 712). The rotational speed of the associated element is referenced along a rotational speed axis 702. The output power of the associated element is referenced along a power output axis 704. The power output of the generator increases at a greater rate compared to the output of the turbine. The speed in which the generator theoretical output power curve 712 crosses over the turbine theoretical output power curve 710 defines a stall point 714. It is desired to optimize the electric power output by the generator, wherein the electric power output by the generator remains slightly below the power output by the turbine.

Figure 26:
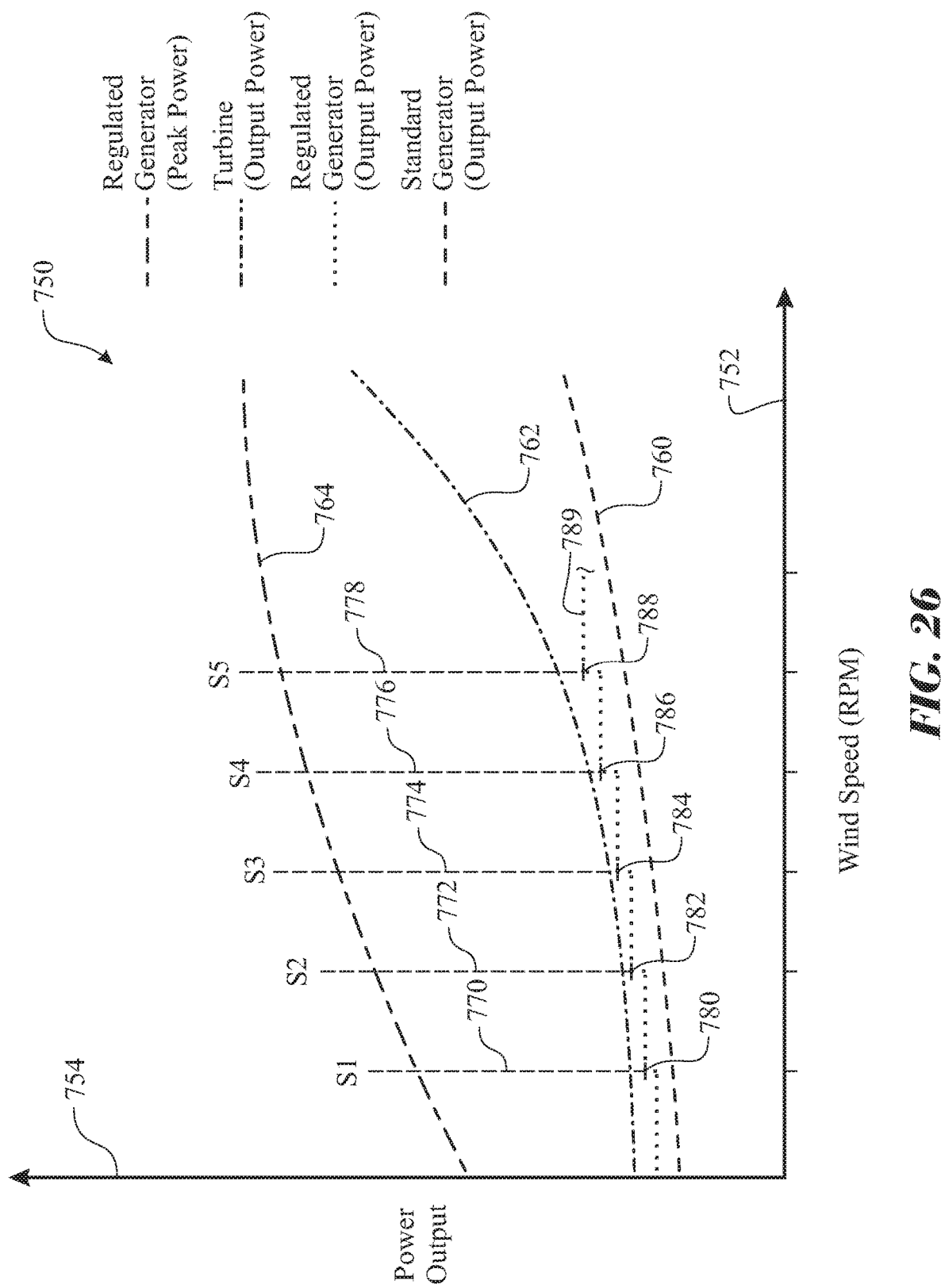
FIG. 26 presents an exemplary power output chart illustrating benefits of the power optimizing controller introduced in FIG. 22.

An exemplary power output chart 750 is presented in FIG. 26 by plotting a power output (that is associated with a wind speed. The wind or associated rotational speed is referenced along a wind speed generated RPM axis 752. The output power of the associated element is referenced along a power output axis 754.

The current technology employs a generator that has a lower output than the power captured by the wind operated turbine assembly 610. The infrastructure is configured in this manner to avoid overpowering the turbine, where a larger or excessive generator would overdrive the turbine. Alternatively stated, if the power extracted from the wind operated turbine assembly 610 is greater than the 100% of the power allowed by the wind operated turbine assembly 610, the wind operated turbine assembly 610 stalls. Therefore, it had been established that the generators should remain below the stall point of the associated turbine 610. This principle was understood to be a fundamental requirement, thus limiting the power output to the maximum capabilities of the currently utilized generators. An exemplary input, or power captured by the wind operated turbine assembly 610, is represented by a turbine power curve 762. The associated power output using currently deployed generators is represented by a current generator curve 760. The vertical gap between the turbine power curve 762 and the current generator curve 760 depicts losses.

Conversely, implementation of a larger generator in conjunction with the power control module 660 enables optimization of the power output while avoiding overpowering or governing the wind operated turbine assembly 610. The associated power output using a regulated generator is represented by a regulated generator curve 764, wherein the regulated generator creates excessive power or power greater than the power obtained by the turbine 610. Power optimization is accomplished by introducing a variable resistance into the electric network. The process is further optimized by monitoring for predetermined rotational speeds 770, 772, 774, 777, 778 of the electric generator 640 (or calibrated to determine an associated rotational speed) and adjusting the resistance accordingly by adjusting an associated potentiometer (variable resistor) 680, 682, 684, 686, 688. The goal is to maintain or govern a power output, identified as an adjusted power output 780, 782, 784, 786, 788 at a level slightly less than the power obtained by the wind operated turbine assembly 610. The power output chart 750 illustrates the small gap between each adjusted power output point 780, 782, 784, 786, 788 and the associated curve of the turbine power curve 762. The power output remains constant, independent of the speed of rotation of the turbine blade assembly 614, as illustrated by the regulated power output curve 789. The resulting regulated power output curve 789 has a step curve shape. The exemplary power output chart 750 illustrates the additional electric power output at each respective rotational speed 770, 772, 774, 777, 778 compared to the power output from the standard generator 760. The gap parallel to the power output axis 754 between each adjusted power output level 780, 782, 784, 786, 788 and the associated power output level of the standard generator 760 defines the increase in power output, based upon the same energy created by the wind operated turbine assembly 610. Those skilled in the art would understand that the number of predetermined rotational speeds 770, 772, 774, 777, 778 and the number of associated potentiometer (variable resistor) 680, 682, 684, 686, 688 can vary based upon the characteristics and engineering of the system.

In operation, as the rotational speed approaches each predetermined rotational speed, the respective rotational speed indicator 670, 672, 674, 676, 678 converts to a notification state. The service person adjusts the associated potentiometer (variable resistor) 680, 682, 684, 686, 688 to optimize the power output to the desired level of slightly lower than the turbine power curve 762. The associated potentiometer (variable resistor) is in electrical communication 561 with the electric generator 560, providing a varied resistance or load to the electric generator 560. The increased load acts as a brake and decreases the rotational speed of the turbine blade subassembly 614. By varying the electric load, the rotational speed of the turbine blade subassembly 614 changes to optimize the power generated across many different bands of rotational speeds.

Although the exemplary embodiment integrates a controller 660 into a system employing a hydraulically driven system, it is understood that the power control module 660 can be integrated into any system employing a wind driven turbine used to power an electric generator.

Although the exemplary embodiments are directed towards a wind powered system, it is understood that the same power optimization system can be applied to a water driven turbine system.

Figure 27:
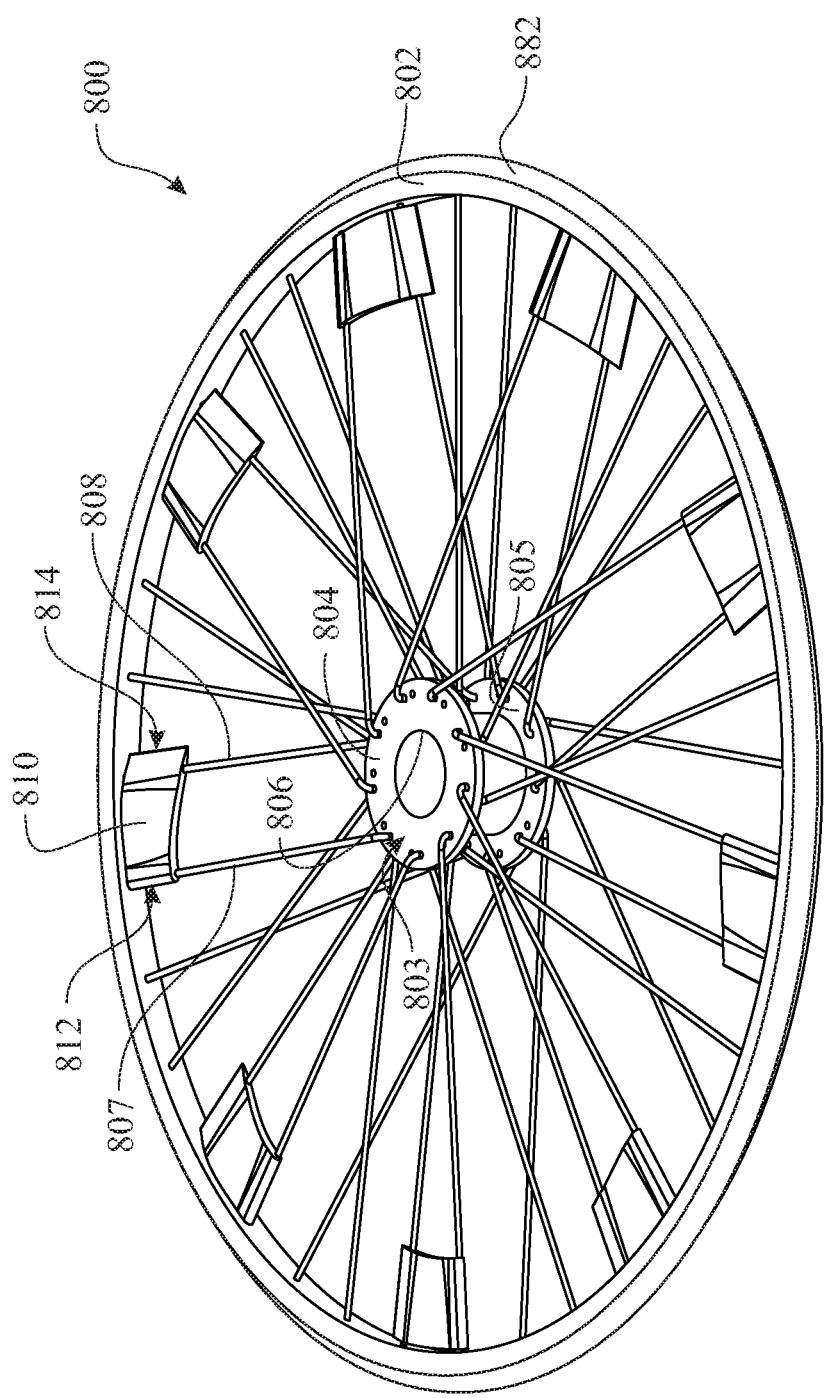
FIG. 27 presents an isometric view of an exemplary tension lifting wing wheel assembly.
Figure 28:
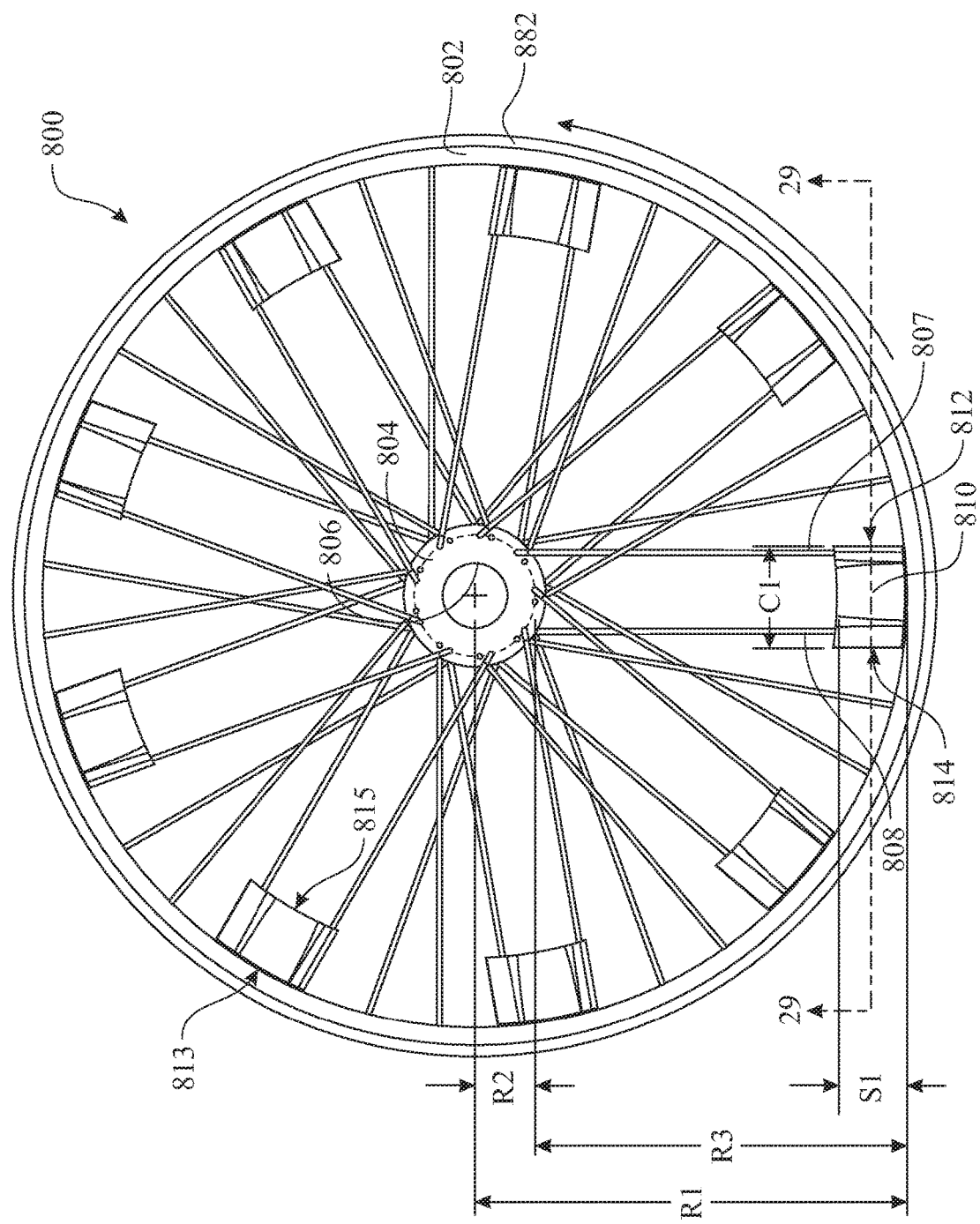
FIG. 28 presents a front view of the exemplary tension lifting wing wheel assembly originally introduced in FIG. 27.
Figure 29:
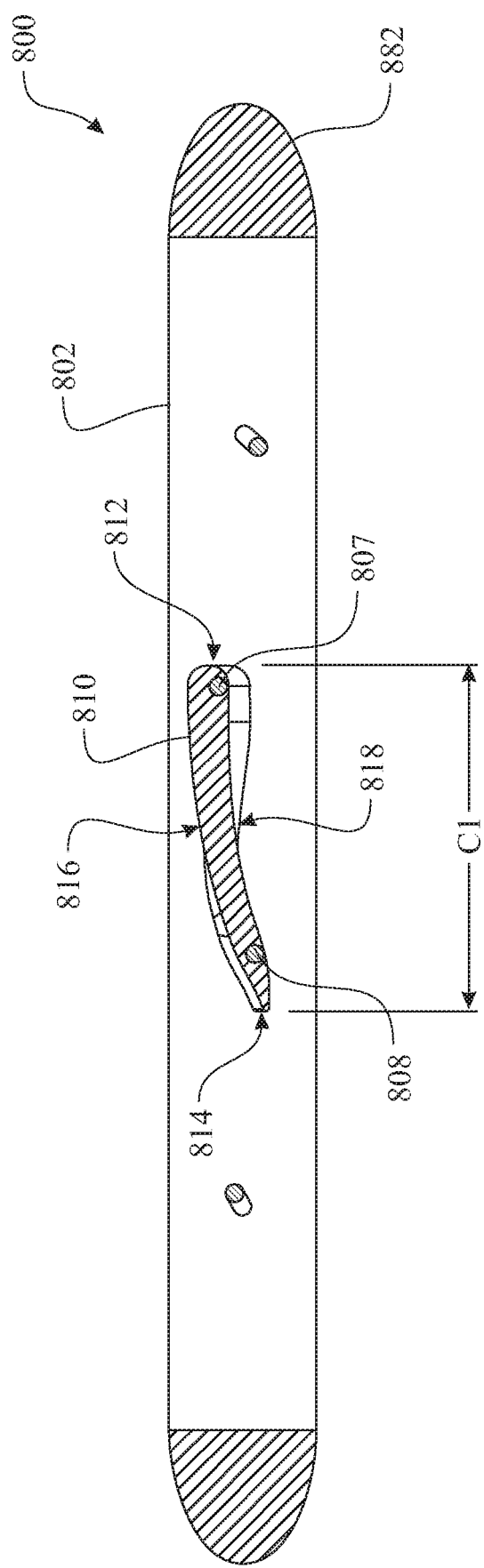
FIG. 29 presents a cross section view of the exemplary tension lifting wing wheel assembly originally introduced in FIG. 27, the section being taken along section line 29-29 of FIG. 28.

The turbine wheel assembly 100 can be modified and adapted for other applications. A tension airfoil turbine or lifting wing assembly 800, illustrated in FIGS. 27 through 29, is an adaptation designed to provide lift. The tension airfoil turbine or lifting wing assembly 800 and the turbine wheel assembly 100 comprise a number of like features. Like features of the tension airfoil turbine or lifting wing assembly 800 and the turbine wheel assembly 100 are numbered the same except preceded by the numeral '8'. The tension airfoil turbine or lifting wing assembly 800 is an assembly comprising a tension airfoil outer rim 802 assembled to a tension airfoil central hub assembly 803 by a series of spokes 807, 808. The tension airfoil central hub assembly 803 includes a tension airfoil first central hub flange 804 and a tension airfoil second central hub flange 805 extending radially outward from opposite ends of an axle bearing 806. The outer edge of the tension airfoil outer rim 802 is preferably shaped having a tension airfoil outer rim aerodynamic surface 882, as illustrated. The tension airfoil outer rim 802 is designed having an internal radius R1. The central hub flanges 804, 805 are designed having an external radius R2. The hub external radius R2 is defined as a distance between the rotational axis of the hub 806 and a ring defined by the centers of the spoke hub attachment holes or other spoke attachment features. A different between the radii R1 and R2 (R1-R2) defines an effective length (radial span of each spoke) R3 of each spoke 807, 808. The optimal design would include a R1 to R2 ratio of 6:1. The optimal ratio provides a configuration where the tension airfoil leading spoke 807 and the tension airfoil trailing spoke 808 are substantially parallel with one another and run parallel to a radial axis extending outward from a central point of the axle bearing 806. Although the optimal ration is 6:1, it is recognized that the ratio can vary between 4:1 and 8:1.

As illustrated, a first end of each spoke 807 is assembled to a respective central hub flange 804, 805 and a second end of each spoke is assembled to the outer rim 802. A first spoke 807 of the plurality of spokes 807 is assembled to the respective central hub flange 804, 805 in an arrangement extending in an acute angular direction from a radial orientation in a first direction from a first side of the respective central hub flange 804, 805 and a second spoke 807 of the plurality of spokes 807 is assembled to the respective central hub flange 804, 805 in an arrangement extending in an acute angular direction from a radial orientation in a second direction from a second side of the respective central hub flange 804, 805. One spoke 807 of the plurality of spokes 807 attached to the respective central hub flange 804, 805 crosses at least one another spoke 807 of the plurality of spokes 807 attached to the same respective central hub flange 804, 805. Each airfoil 810 of the series of airfoils 810 is assembled to the tension airfoil assembly 800 by coupling an area of the airfoil 810 proximate the leading edge 812 to a leading edge spoke 807 of the plurality of spokes 807 and by coupling an area of the airfoil 810 proximate the trailing edge 814 to a trailing edge spoke 807 of the plurality of spokes 807. In the exemplary illustrations, one spoke 807 of the plurality of spokes 807 attached to the respective central hub flange 804, 805 crosses at least two another spokes 807 of the plurality of spokes 807 attached to the same respective central hub flange 804, 805. This arrangement of the spokes dramatically increases the strength of the assembly. Radially arranged spokes are susceptible to non-radial forces and are known to bend, this reducing the integrity of the tension airfoil turbine or lifting wing assembly 800. Conversely, having spokes 807 arranged at acute angles from a radial orientation, and more so, having the first spoke 807 of the plurality of spokes 807 assembled to the respective central hub flange 804, 805 in an arrangement extending in the acute angular direction from the radial orientation in the first direction from the first side of the respective central hub flange 804, 805 and the second spoke 807 of the plurality of spokes 807 assembled to the respective central hub flange 804, 805 in the arrangement extending in the acute angular direction from the radial orientation in the second direction from the second side of the respective central hub flange 804, 805 provides an increase in strength when the tension airfoil turbine or lifting wing assembly 800 is subjected to a force that is not in a radial direction respective to the tension airfoil outer rim 802.

It is preferred that the airfoil 810 be assembled to the tension airfoil turbine or lifting wing assembly 800 having an airfoil outer edge 813 being located proximate an inner surface of the tension airfoil outer rim 802. Dimensions of the airfoil 810 are defined by an airfoil span S1 and an airfoil chord C1. The airfoil span S1 refers to a distance between the airfoil outer edge 813 and an airfoil inner edge 815 of the airfoil 810. The airfoil chord C1 refers to a distance between the leading edge 812 and the trailing edge 814 of the airfoil 810. The airfoil span S1 is preferably equal to or less than fifty percent (50%) of the effective length R3 of each spoke 807, 808. The airfoil span S1 is more preferably equal to or less than thirty three percent (33%) of the effective length R3 of each spoke 807, 808. The airfoil span S1 is even more preferably equal to or less than thirty percent (30%) of the effective length of each spoke 807, 808. The airfoil span S1 is even more preferably equal to or less than twenty-five percent (25%) of the effective length of each spoke 807, 808.

Other design features of the tension airfoil turbine or lifting wing assembly 800 include:
  a. Each spoke 807, 808 can cross other spokes defining three crossover locations.
  b. The spokes 807, 808 can include a circular cross section shape, an aerodynamic cross section shape, or any other suitable cross section shape.
  c. Spokes can be arranged to alternate between extending from an outer surface of each hub flange 804, 805 and from an inner surface of the same hub flange 804, 805.
  d. It is preferred that the tension airfoil turbine or lifting wing assembly 800 includes a total of 36 spokes, 18 per hub flange 804, 805.
  e. Each spoke 807, 808 would preferably be assembled having substantially equally tension.
  f. The spoke hub attachment holes can be even spaced about the hub flange 804, 805. Alternatively, the spoke hub attachment holes can be arranged in pairs, wherein the pairs are arranged having a first spacing and each adjacent pair is arranged having a second spacing about the hub flange 804, 805, wherein the first spacing and the second spacing differ from one another.
  g. The series of spoke hub attachment holes of the tension airfoil first central hub flange 804 and the series of spoke hub attachment holes of the tension airfoil second central hub flange 805 are offset from one another.
  h. The axial height of the tension airfoil outer rim 802 is determined by maximizing the desired strength of the tension airfoil outer rim 802, while providing sufficient area to support a connection of each spoke 807, 808.
  i. The attachment locations of each spoke 807, 808 along an interior surface of the tension airfoil outer rim 802 are either linear with one another or located in an alternating configuration.
  j. The tension airfoil central hub assembly 803 is preferably substantially centered axially respective to the tension airfoil outer rim 802. Alternatively, the tension airfoil central hub assembly 803 can be offset axially respective to the tension airfoil outer rim 802.

The tension airfoil turbine or lifting wing assembly 800 includes a series of airfoils 810. Each airfoil 810 has an airfoil or lifting shape, where a length of an airfoil upper surface 816, extending from an airfoil leading edge 812 to an airfoil trailing edge 814, is longer than a length of an airfoil lower surface 818, extending from the airfoil leading edge 812 to the airfoil trailing edge 814. The airfoil upper surface 816 is a preferably a convex surface. The airfoil lower surface 818 is preferably a planar or a concave surface. The airfoil 810 can be a solid assembly or hollowed to reduce weight. The airfoil 810 can be of any suitable shape. The exemplary airfoil 810 is rectangular or square in shape. The airfoil leading edge 812 preferably is formed having a rounded edge. The airfoil trailing edge 814 preferably is formed having a tapering edge. Each airfoil 810 is preferably located proximate the outer region of the tension airfoil turbine or lifting wing assembly 800, or proximate the interior surface of the tension airfoil outer rim 802.

In one configuration, the airfoil 810 would be sized to extend along approximately thirty percent (30%) of the outermost or distal portion of the spoke 807, 808. In an alternate configuration, the airfoil 810 would be sized to extend along between twenty percent (20%) and forty percent (40%) of the outermost or distal portion of the spoke 807, 808. In another alternate configuration, the airfoil 810 would be sized to extend along between ten percent (10%) and fifty percent (50%) of the outermost or distal portion of the spoke 807, 808. The outermost portion of the tension airfoil turbine or lifting wing assembly 800 travels at the greatest linear velocity. Lift is a function of velocity.

Each airfoil 810 is assembled to a pair of spokes 807, 808 using any suitable mechanical assembly configuration. In the exemplary embodiment, the airfoil 810 is assembled to the pair of spokes 807, 808 by inserting each spoke through a respective bore formed through the airfoil 810. The airfoils 810 are spatially arranged about the tension airfoil turbine or lifting wing assembly 800. A space or gap is provided between the airfoil trailing edge 814 of a forward located airfoil 810 and an airfoil leading edge 812 of a trailing located airfoil 810. The airfoil 810 can be formed having a slight twist, as illustrated, to accommodate the respective angles of the respective spokes 807, 808. Alternatively, the airfoil 810 can have a greater thickness. The twisted blade shape of the airfoil 810 produces more power or lift compared to straight airfoils. This is because as the airfoil 810 gets closer to the hub 803, the wind speed becomes less, requiring more a greater angle of attack to produce lift.

Figure 30:
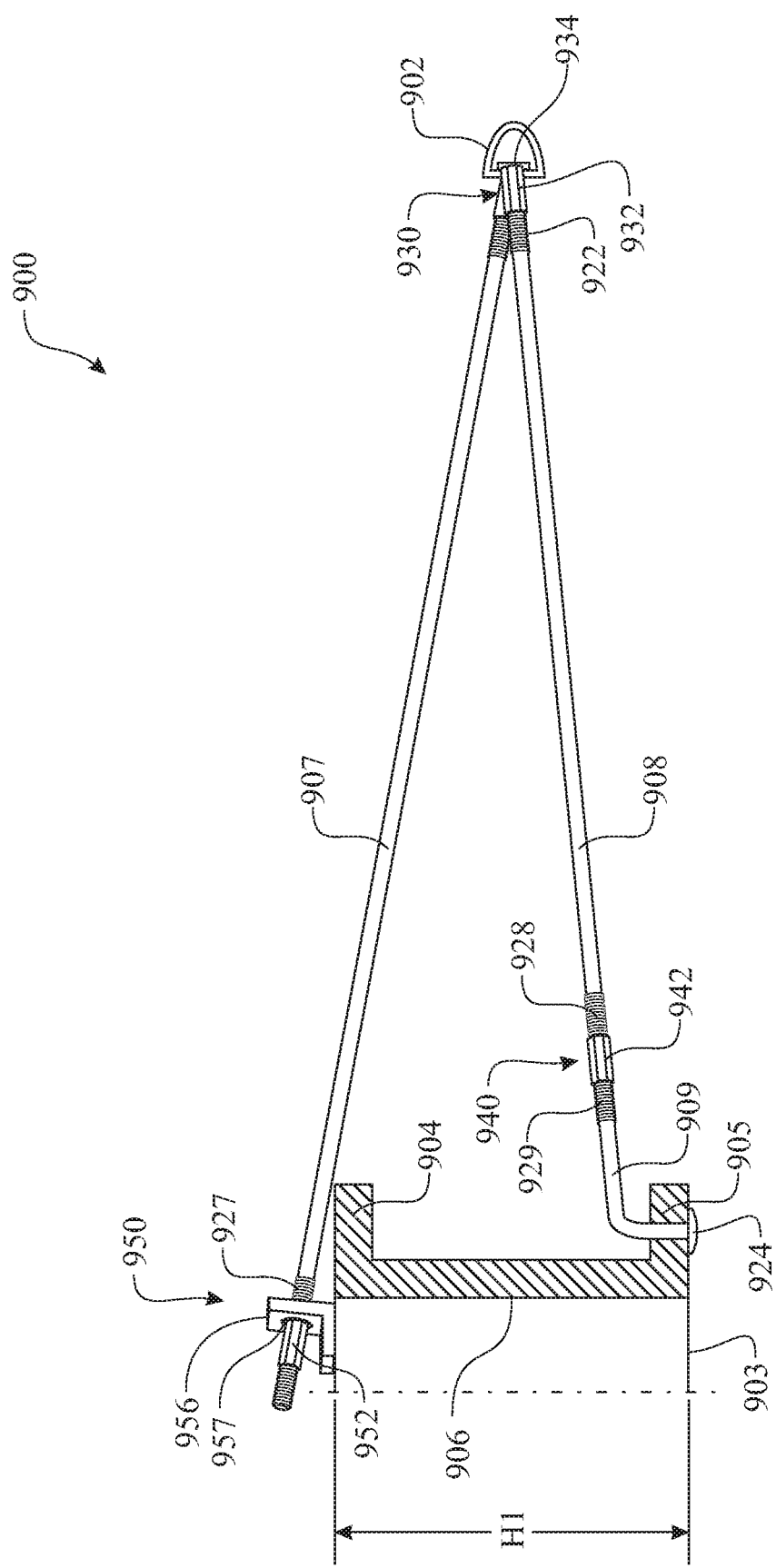
FIG. 30 presents a cross section view of an enhanced exemplary tension lifting wing wheel assembly introducing several optional tension adjusting configurations.

The angle of attack can be established by the arrangement of the spokes 807, 808, the height H1 (identified in FIG. 30) of the tension airfoil central hub assembly 803, or the like, or any combination thereof. The greater the height of hub H1 or the span between the hub flanges 804, 805, the greater the angle of attack.

The tension airfoil turbine or lifting wing assembly 800 is designed to be implemented to provide lift. The tension airfoil turbine or lifting wing assembly 800 includes features to drive a rotational motion. For example, the axle bearing 806 can include one or more features which would engage with a rotating shaft of a drive system, such as a motor. In another example, one or both hub flanges 804, 805 can be fixed to the rotating shaft of a drive system. In yet another example, the tension airfoil central hub assembly 803 can include a unidirectional drive mechanism, wherein the drive system drives a rotation in a lifting direction, but when necessary, the tension airfoil turbine or lifting wing assembly 800 can rotate freely in a reverse direction.

It is understood that the tension airfoil turbine or lifting wing assembly 800 would be rotationally balanced. Rotational balancing can be accomplished by any known method of balancing a rotating assembly, including by design, balancing of components, balancing of the assembly, and the like, or any combination thereof.

The spokes are assembled having a tension. The tension can be created by any suitable tension generating system or any combination of suitable tension generating systems. Examples of various suitable tension generating systems, including a spoke distal assembly tensioning nipple 930, a spoke distal assembly central tensioning system 940, and a hub located spoke tensioning system 950, are illustrated being employed on a tension airfoil turbine or lifting wing assembly 900, as presented in FIG. 32. Like features of the tension airfoil turbine or lifting wing assembly 900 and the tension airfoil turbine or lifting wing assembly 800 are numbered the same except preceded by the numeral '9'. One or more of the spoke distal assembly tensioning nipple 930, the spoke distal assembly central tensioning system 940, and the hub located spoke tensioning system 950 would be integrated into the tension airfoil turbine or lifting wing assembly 800, providing to and retaining tension in the spokes 807, 808.

The spoke distal assembly tensioning nipple 930 includes a spoke distal assembly tensioning nipple body 934 formed at a distal end of a spoke distal assembly tensioning nipple flange 932. The spoke distal assembly tensioning nipple body 934 is sized and shaped to adequately support tension applied to the spoke 907, 908 against a mating surface of the tension airfoil outer rim 902. The spoke distal assembly tensioning nipple body 934 can be of a fixed size and shape or capable of changing shape after being inserted through a respective receiving aperture formed through the tension airfoil outer rim 902. For example, the spoke distal assembly tensioning nipple body 934 can be shaped and function similar to a wall molly, a rivet, or the like. A spoke distal threading 922 is formed at a distal end of each spoke 907, 908. Threading (not shown, but well understood) is formed within an interior cylindrical surface of a cavity of each spoke distal assembly tensioning nipple flange 932, wherein the threading has the same thread size and pitch to mate with the spoke distal threading 922.

In the exemplary tension airfoil turbine or lifting wing assembly 900, the tension airfoil trailing spoke 808 is represented by a spoke segmented into a tension airfoil trailing spoke distal segment 908 and a tension airfoil trailing spoke proximal segment 909; the segments 908, 909 being assembled by the spoke distal assembly central tensioning system 940. A spoke distal segment proximal threading 928 is formed at a proximal end of the tension airfoil trailing spoke distal segment 908. A spoke proximal segment distal threading 929 is formed at a distal end of the tension airfoil trailing spoke proximal segment 909. The spoke distal segment proximal threading 928 and the spoke proximal segment distal threading 929 would have counter rotating threading, wherein a rotational direction the spoke distal segment proximal threading 928 is formed having a first rotational direction and the rotational direction of the spoke proximal segment distal threading 929 is formed having an opposite rotational direction. A spoke distal assembly central tensioning element 942 of the spoke distal assembly central tensioning system 940 would include a central bore having threaded ends. The threaded ends would also include counter rotating threading to mate with the spoke threading 928, 929. Tension can be adjusted by rotating the spoke distal assembly central tensioning element 942 in a first rotational direction to increase tension or rotating the spoke distal assembly central tensioning element 942 in a second rotational direction to decrease tension. The tensioning element 942 can be any suitable component or series of components enabling creation and/or adjustment of a tension of the respective spoke 907.

A proximal or hub end of each spoke, such as the exemplary tension airfoil trailing spoke proximal segment 909 can be bent and formed creating a spoke anchor flange 924. The spoke anchor flange 924 engages with a mating surface of the hub flange 904, 905 to adequately support the tension generated along the spoke 908, 909. The bend in the tension airfoil trailing spoke proximal segment 909, when inserted through the spoke hub attachment hole, also refrains the tension airfoil trailing spoke proximal segment 909 from rotating.

The hub located spoke tensioning system 950 employs an alternative assembly configuration compared to the bend and formation of the spoke anchor flange 924 of the tension airfoil trailing spoke proximal segment 909. The hub located spoke tensioning system 950 includes a spoke proximal threading 927 formed at a proximal or hub end of the tension airfoil leading spoke 907. A hub located spoke tensioning bracket 956 would be integrally formed with or assembled to the tension airfoil first central hub flange 904. The tension airfoil leading spoke 907 would be inserted through an aperture formed through the hub located spoke tensioning bracket 956. A hub located spoke tensioning element 952 would be threadably secured to the proximal end of the spoke proximal threading 927 on a hub side of the hub located spoke tensioning bracket 956 and adjusted to generate and retain a tension along the tension airfoil leading spoke 907. An optional tensioning bracket cavity 957 can be formed within the hub located spoke tensioning bracket 956 to seat the hub located spoke tensioning element 952 accordingly.

It is understood that the spoke distal assembly tensioning nipple 930, the spoke distal assembly central tensioning system 940, and the hub located spoke tensioning system 950 can be used individually, or in any suitable combination thereof. The spoke distal assembly tensioning nipple 930, the spoke distal assembly central tensioning system 940, and the hub located spoke tensioning system 950 are only exemplary and any suitable tension generating system or systems can be integrated into the tension airfoil turbine or lifting wing assembly 800, 900.

The spoke assembly configuration can be adapted to include a spoke breakaway feature 1050. An exemplary spoke breakaway feature 1050 is introduced in FIGS. 31 and 32. The spoke tensioning breakaway assembly 1050 is integrated into a tension airfoil turbine or lifting wing assembly 1000, wherein the tension airfoil turbine or lifting wing assembly 1000 is a modified variant of the tension airfoil turbine or lifting wing assembly 800 and/or tension airfoil turbine or lifting wing assembly 900. Like elements of the tension airfoil turbine or lifting wing assembly 1000 and the tension airfoil turbine or lifting wing assembly 900 are numbered the same, except preceded by a numeral "10". The exemplary illustration integrates the spoke tensioning breakaway assembly 1050 at an end of each spoke 1007, 1008 located proximate a tension airfoil outer rim 1002. It is understood that the spoke tensioning breakaway assembly 1050 can be integrated at a location proximate the turbine wheel assembly 100 or the hub (not shown). In another alternative configuration, the spoke tensioning breakaway assembly 1050 can be integrated at any position along a length of the spoke.

The concept behind operation of the spoke tensioning breakaway assembly 1050 is that while a tension is applied along a length of the spoke 1007, 1008, at least one tensioning assembly coupling element 1070 retains a coupling between a tensioning nipple assembly 1030 and a tensioning stud 1060. In a preferred configuration, the spoke tensioning breakaway assembly 1050 employs at least two tensioning assembly coupling elements 1070.

The tensioning nipple assembly 1030 includes a spoke tensioning nipple flange 1034 extending radially outward from a distal end of a spoke tensioning nipple body 1032, as shown, or from a distal end of a segment of the respective spoke. The spoke tensioning nipple body 1032 can include a threaded surface to matingly engage with a mating threaded portion 1022 of the spoke 1008, as illustrated. In the exemplary embodiment, the spoke tensioning nipple body 1032 includes a female threaded bore and the spoke distal threading 1022 is formed having male threading. It is understood that the spoke tensioning nipple body 1032 can comprise male threading and the spoke distal threading 1022 can be formed as female threading. Inclusion of threaded mating surfaces enables the tensioning nipple assembly 1030 to be used to generate tension along the spoke 1008. It is understood that alternate configurations, such as those included in the tension airfoil turbine or lifting wing assembly 900 can be employed to create and maintain tension within the spoke 1008.

The tensioning stud 1060 includes a tensioning stud flange 1064 extending radially outward from a distal end of a tensioning stud trunk 1062. The tensioning stud trunk 1062 can be attached to a tension airfoil rim inner surface 1084 of the tension airfoil outer rim 1002, an end of a segment of the spoke 1007, 1008, a flange of the hub (not shown), or any other suitable element of the tension airfoil turbine or lifting wing assembly 1000. The tensioning stud 1060 can be mechanically assembled to the respective element of the tension airfoil turbine or lifting wing assembly 1000 using a permanent assembly method or a temporary mechanical interface. The tensioning stud 1060 can be welded to the respective element of the tension airfoil turbine or lifting wing assembly 1000, bolted to the respective element of the tension airfoil turbine or lifting wing assembly 1000, or any other permanent assembly method. Alternatively, the tensioning stud 1060 can include a suitable flange, wherein the flange would be larger than a respective aperture formed through the respective element of the tension airfoil turbine or lifting wing assembly 1000, or any other temporarily assembly configuration. In another alternate configuration, the tensioning stud 1060 can be integrally formed with the respective element of the tension airfoil turbine or lifting wing assembly 1000, such as by machining, casting, and the like. In yet another configuration, the tensioning stud 1060 can be integrated into an end of a segment of the spoke 1007, 1008 using any suitable manufacturing process.

Figure 31:
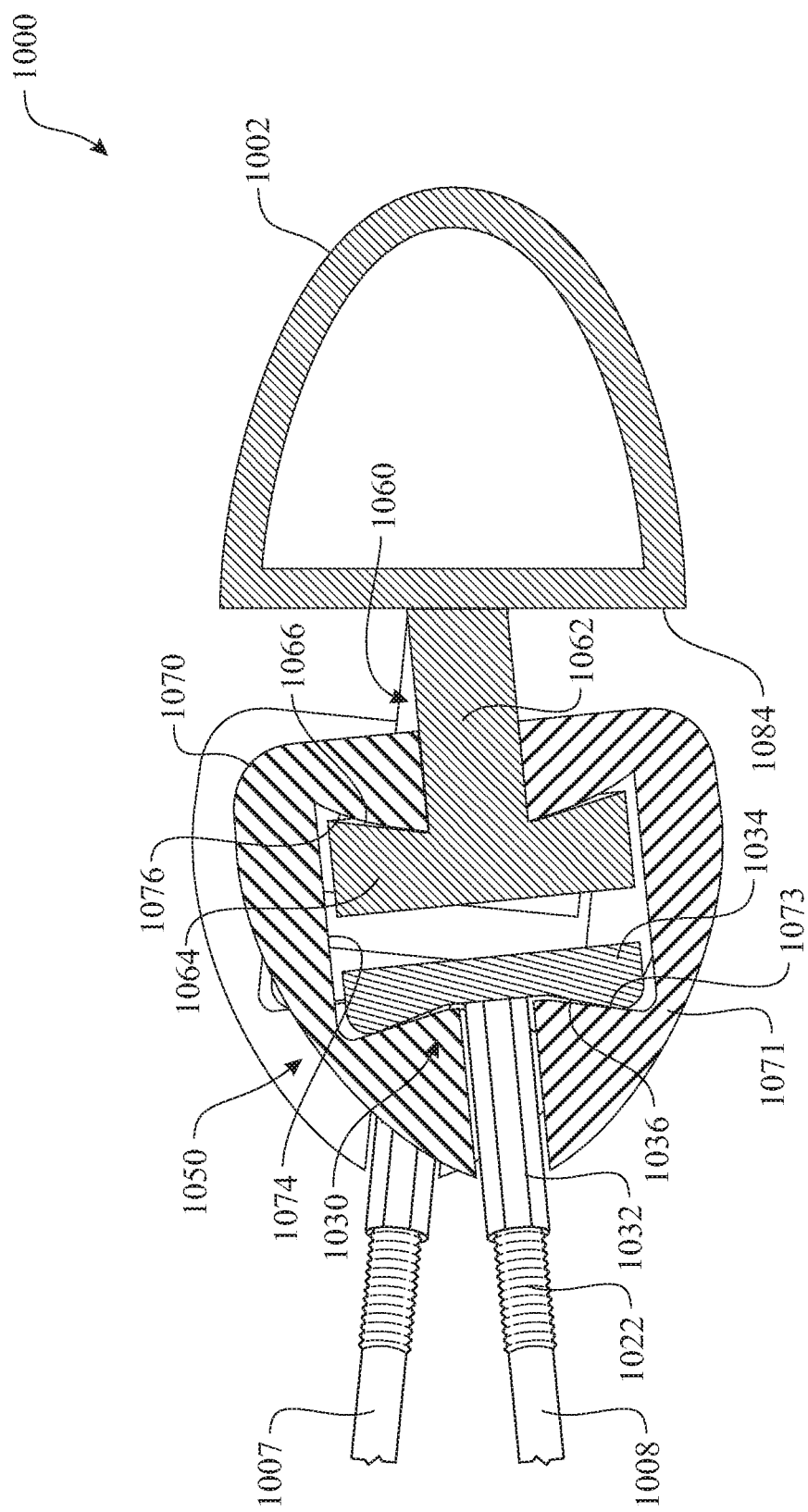
FIG. 31 presents a cross section view of an enhanced exemplary tension lifting wing wheel assembly introducing a spoke breakaway feature, wherein the spoke breakaway feature is shown in an assembled state, retained by tension within the spoke.
Figure 32:
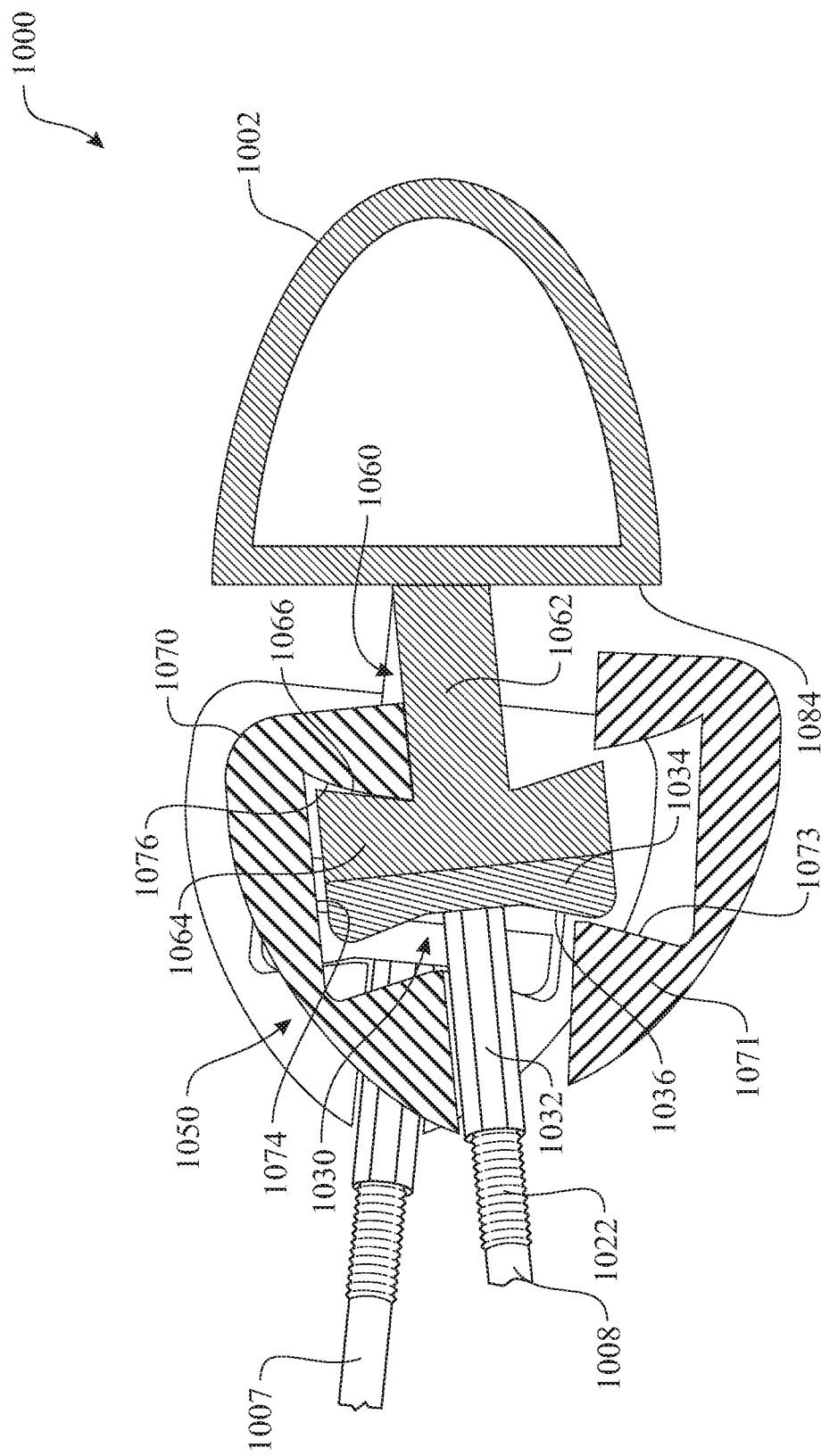
FIG. 32 presents a cross section view of the enhanced exemplary tension lifting wing wheel assembly previously illustrated in FIG. 31, wherein the spoke breakaway feature is shown in a partially separated state, initiated by a broken spoke.

A tensioning assembly coupling element connection cavity 1074 is formed within the tensioning assembly coupling element 1070. The tensioning assembly coupling element connection cavity 1074 is sized and shaped to enclose each of the spoke tensioning nipple flange 1034 and the tensioning stud flange 1064, as illustrated in FIG. 31. Additionally, the tensioning assembly coupling element connection cavity 1074 is sized to enable the spoke tensioning nipple flange 1034 and the tensioning stud flange 1064 to become dislodged from within the tensioning assembly coupling element connection cavity 1074, freeing a broken spoke 1007, 1008 from the tension airfoil turbine or lifting wing assembly 1000, as illustrated in FIG. 32. Details of the operation of the spoke tensioning breakaway assembly 1050 are described later within this disclosure.

A tensioning stud flange assembly retention surface 1066 is formed within the tensioning stud flange 1064. The tensioning stud flange assembly retention surface 1066 is formed having a debossed or inwardly extending shape. The debossed surface can be of any suitable shape, including a concave surface, as illustrated, a conically shaped surface, a "V" shaped surface, and the like. A tensioning coupling element stud flange retention surface 1076 is formed within the tensioning assembly coupling element 1070. The tensioning coupling element stud flange retention surface 1076 is shaped to matingly engage with the tensioning stud flange assembly retention surface 1066. The tensioning coupling element stud flange retention surface 1076 of the tensioning assembly coupling element 1070 would have a shape that mirrors that of the tensioning stud flange assembly retention surface 1066. More specifically, the tensioning coupling element stud flange retention surface 1076 would have a bossed or outwardly extending surface. The shape of the tensioning coupling element stud flange retention surface 1076 is preferably exaggerated compared to the shape of the surface of the tensioning stud flange assembly retention surface 1066, as illustrated. This differential in shapes of the mating surfaces focusing the contacting surfaces towards the centers accordingly.

Similarly, a spoke tensioning nipple spoke assembly retention surface 1036 is formed within the spoke tensioning nipple flange 1034. The spoke tensioning nipple spoke assembly retention surface 1036 is formed having a debossed or inwardly extending shape. The debossed surface can be of any suitable shape, including a concave surface, as illustrated, a conically shaped surface, a "V" shaped surface, and the like. A tensioning coupling element nipple flange retention surface 1073 is formed within the tensioning assembly coupling element 1070. The tensioning coupling element nipple flange retention surface 1073 is shaped to matingly engage with the spoke tensioning nipple spoke assembly retention surface 1036. The tensioning coupling element nipple flange retention surface 1073 would have a shape that mirrors that of the spoke tensioning nipple spoke assembly retention surface 1036. More specifically, the tensioning coupling element nipple flange retention surface 1073 would have a bossed or outwardly extending surface. The shape of the tensioning coupling element nipple flange retention surface 1073 is preferably exaggerated compared to the shape of the surface of the spoke tensioning nipple spoke assembly retention surface 1036, as illustrated. This differential in shapes of the mating surfaces focusing the contacting surfaces towards the centers accordingly.

As a tension is applied to the respective spoke 1008, the tension separates the spoke tensioning nipple flange 1034 and the tensioning stud flange 1064 from one another. During the separation between the spoke tensioning nipple flange 1034 and the tensioning stud flange 1064, the spoke tensioning nipple spoke assembly retention surface 1036 engages with the tensioning coupling element nipple flange retention surface 1073, pulling the tensioning assembly coupling element 1070, causing the tensioning coupling element stud flange retention surface 1076 to engage with the tensioning stud flange assembly retention surface 1066. The shape of the tensioning stud flange assembly retention surface 1066 and the tensioning coupling element stud flange retention surface 1076 draws the tensioning assembly coupling element 1070 to center along the tensioning stud trunk 1062. Similarly, the shape of the spoke tensioning nipple spoke assembly retention surface 1036 and the tensioning coupling element nipple flange retention surface 1073 draws the tensioning assembly coupling element 1070 to center along the spoke tensioning nipple body 1032. It is preferred to employ a pair of tensioning assembly coupling elements 1070 (identified as a 1070 and a 1071), thus balancing the spoke tensioning breakaway assembly 1050. The pair of tensioning assembly coupling elements 1070 can be independent of one another or hingeably coupled to one another.

When a spoke 1008 breaks, as illustrated in FIG. 32, the centrifugal force draws the spoke tensioning nipple flange 1034 towards the tensioning stud flange 1064. This enables the tensioning assembly coupling element 1070 to separate from the tensioning nipple assembly 1030 and the tensioning stud 1060. The tensioning assembly coupling element connection cavity 1074 is shaped and sized to allow each tensioning assembly coupling element 1070 to separate from the tensioning nipple assembly 1030 and the tensioning stud 1060. Once separated, the associated section of the spoke 1008 becomes free from the tension airfoil turbine or lifting wing assembly 1000. The exemplary configuration locates the spoke tensioning breakaway assembly 1050 proximate or integral with the tension airfoil outer rim 1002. A second spoke tensioning breakaway assembly 1050 can be integral with the hub. The inclusion of the pair of spoke tensioning breakaway assemblies 1050 enables complete release of an entire broken spoke 1008.

Although the exemplary illustrations present one configuration of the 1050, it is understood that any broken spoke ejection system can be employed by the tension airfoil turbine or lifting wing assembly 1000.

Figure 33:
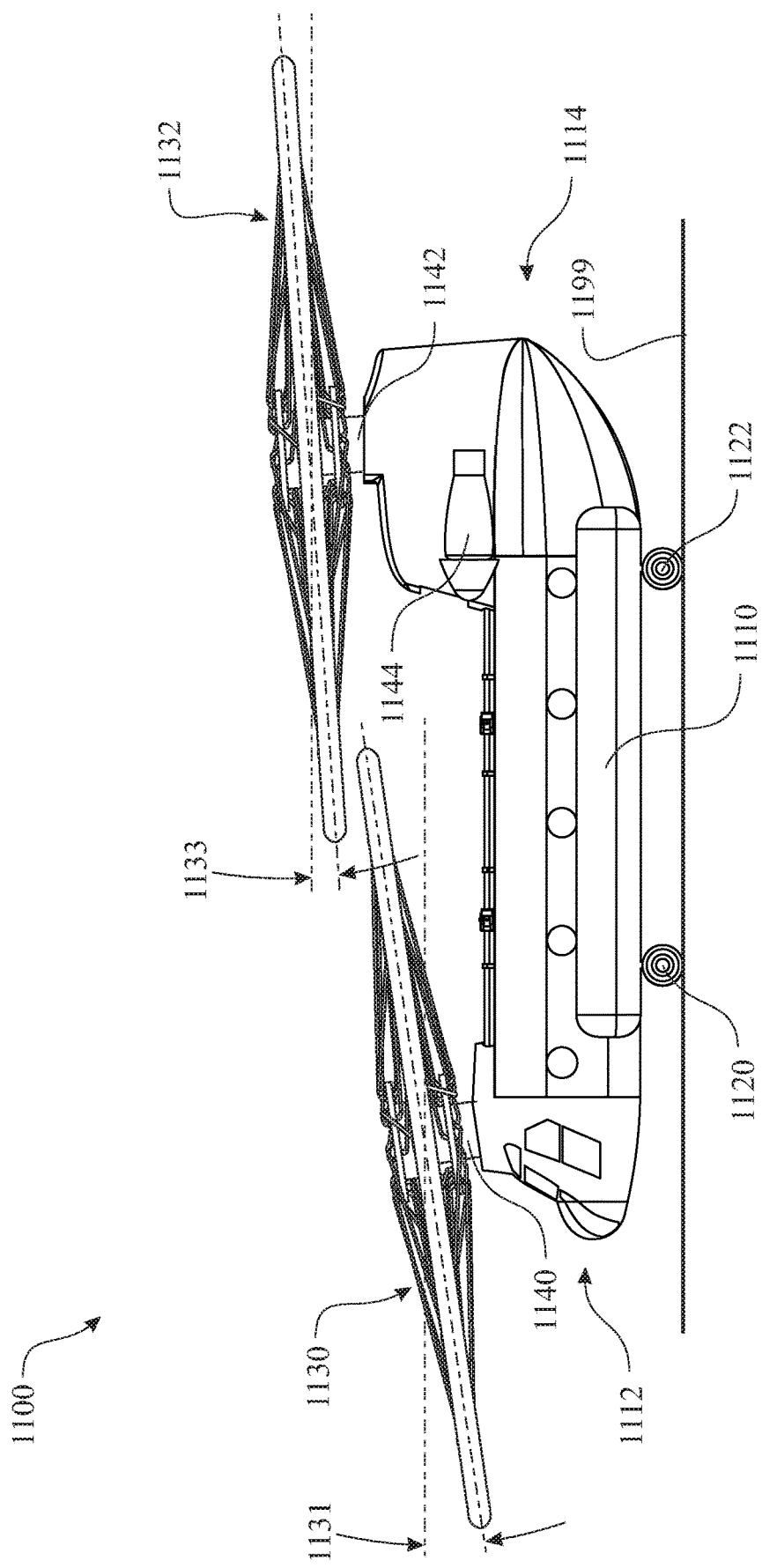
FIG. 33 presents a side view of an exemplary tandem rotor heavy-lift helicopter employing the tension lifting wing wheel assembly.
Figure 34:
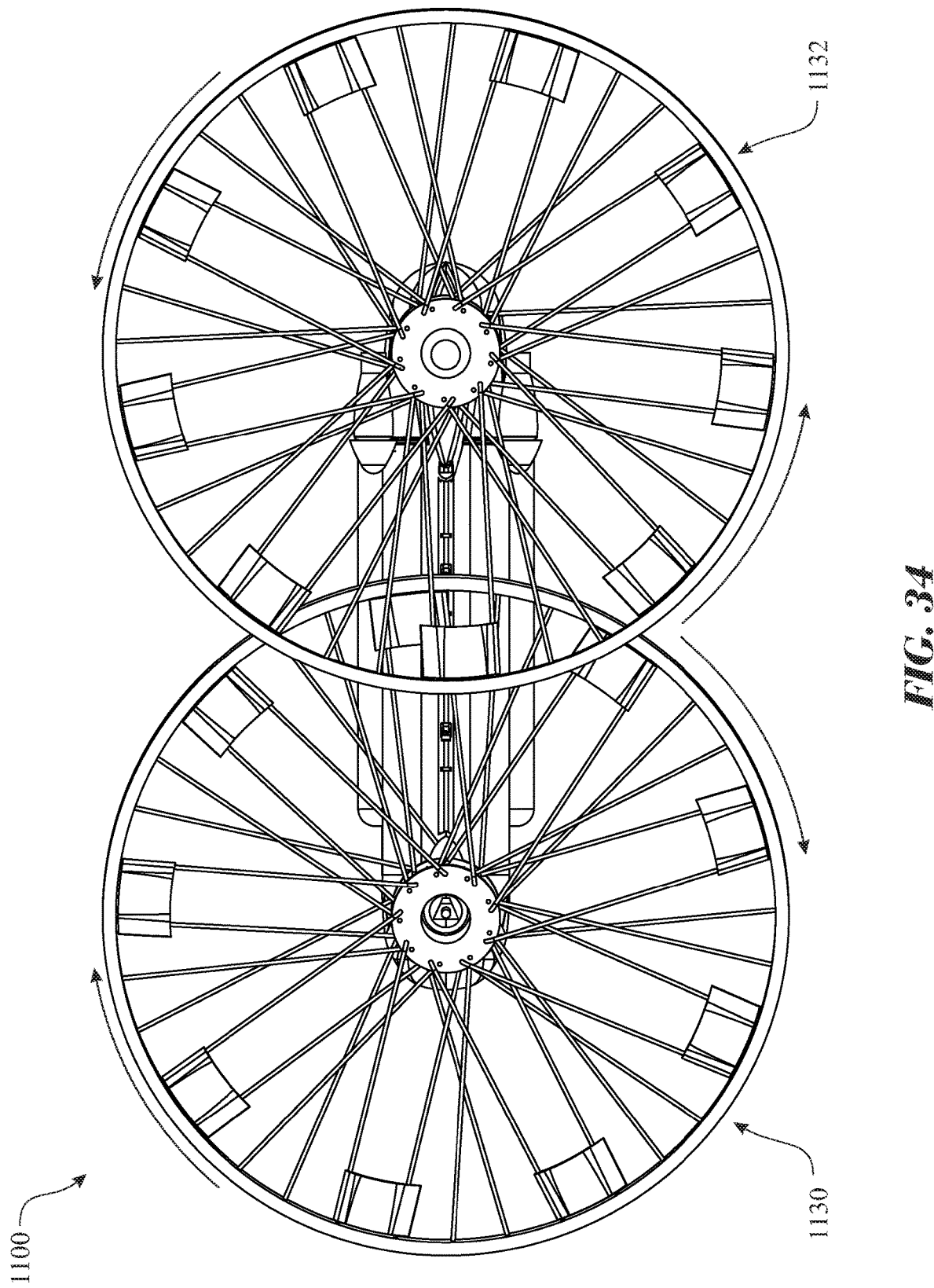
FIG. 34 presents a top view of the exemplary tandem rotor heavy-lift helicopter originally introduced in FIG. 33.

The tension airfoil turbine or lifting wing assembly 800 is designed to provide lift for heavy loads. In one application, an aircraft 1100, such as an exemplary tandem rotor heavy-lift helicopter 1100 employs a pair of tension airfoil turbine or lifting wing assemblies 800 (identified as a tandem rotor heavy-lift helicopter forward rotor assembly 1130 and a tandem rotor heavy-lift helicopter rearward rotor assembly 1132), as illustrated in FIGS. 33 and 34, to provide vertical lift. The tandem rotor heavy-lift helicopter 1100 includes an aircraft body 1110, such as a tandem rotor heavy-lift helicopter fuselage 1110, which provides structural support of the various flight and other operational components as well as storage for passengers and cargo. The orientation of the tandem rotor heavy-lift helicopter 1100 can be references by a tandem rotor heavy-lift helicopter front end 1112 and a tandem rotor heavy-lift helicopter rear end 1114. The tandem rotor heavy-lift helicopter rotor assemblies 1130, 1132 are operated by a rotor drive machine 1140, 1142. The rotor drive machines 1140, 1142 rotate each of the tandem rotor heavy-lift helicopter rotor assemblies 1130, 1132 in opposite or counter rotating directions. In the illustrated example, the tandem rotor heavy-lift helicopter forward rotor assembly 1130 rotates in a clockwise direction and the tandem rotor heavy-lift helicopter rearward rotor assembly 1132 rotates in a counterclockwise direction, as illustrated in FIG. 34. Each tandem rotor heavy-lift helicopter rotor assembly 1130, 1132 would be arranged having an angle 1131, 1133 that is slight forward from horizontal (horizontal can be reference by a landing surface 1199). As illustrated in FIG. 33, the tandem rotor heavy-lift helicopter forward rotor assembly angle 1131 is greater from horizontal compared to the tandem rotor heavy-lift helicopter rearward rotor assembly angle 1133. The tandem rotor heavy-lift helicopter forward rotor assembly 1130 and the tandem rotor heavy-lift helicopter rearward rotor assembly 1132 can include rims 802 having equally diameters, as illustrated, or rims 802 having different diameters. The tandem rotor heavy-lift helicopter forward rotor assembly 1130 and the tandem rotor heavy-lift helicopter rearward rotor assembly 1132 can be located where the tandem rotor heavy-lift helicopter forward rotor assembly 1130 and the tandem rotor heavy-lift helicopter rearward rotor assembly 1132 would overlap one another, as illustrated, or the tandem rotor heavy-lift helicopter forward rotor assembly 1130 and the tandem rotor heavy-lift helicopter rearward rotor assembly 1132 can be located having a gap therebetween.

The tandem rotor heavy-lift helicopter 1100 is designed for heavy lifting. The tandem rotor heavy-lift helicopter fuselage 1110 would include a structural frame suitable for supporting heavy loads.

Although the tandem rotor heavy-lift helicopter 1100 is illustrated having a pair of rotor assemblies 1130, 1132, it is understood that the helicopter 1100 can be configured having a single horizontally oriented rotor assembly 1130, 1132 and a second, vertically oriented rotor assembly 1130, 1132. It is understood that one of the horizontally oriented rotor assembly 1130, 1132 and the second, vertically oriented rotor assembly 1130, 1132 can be the tension airfoil turbine or lifting wing assembly 800 and the second of the horizontally oriented rotor assembly 1130, 1132 and the second, vertically oriented rotor assembly 1130, 1132 can be a currently employed rotor configuration.

Other noted features of the tandem rotor heavy-lift helicopter 1100 include landing gear 1120, 1122 and a tandem rotor heavy-lift helicopter propulsion jet 1144. The landing gear 1120, 1122 can be fixed or retractable. The landing gear 1120, 1122 can be of any suitable format, including wheels (as shown), landing skids, floatation pontoons, and the like.

Control of the tandem rotor heavy-lift helicopter 1100 can be achieved by use of a constant velocity (CV) joint integrated with at least one of the tandem rotor heavy-lift helicopter rotor assembly 1130, 1132 When integrated, the respective CV joint enables tilting of an associated tandem rotor heavy-lift helicopter rotor assembly 1130, 1132.

Figure 35:
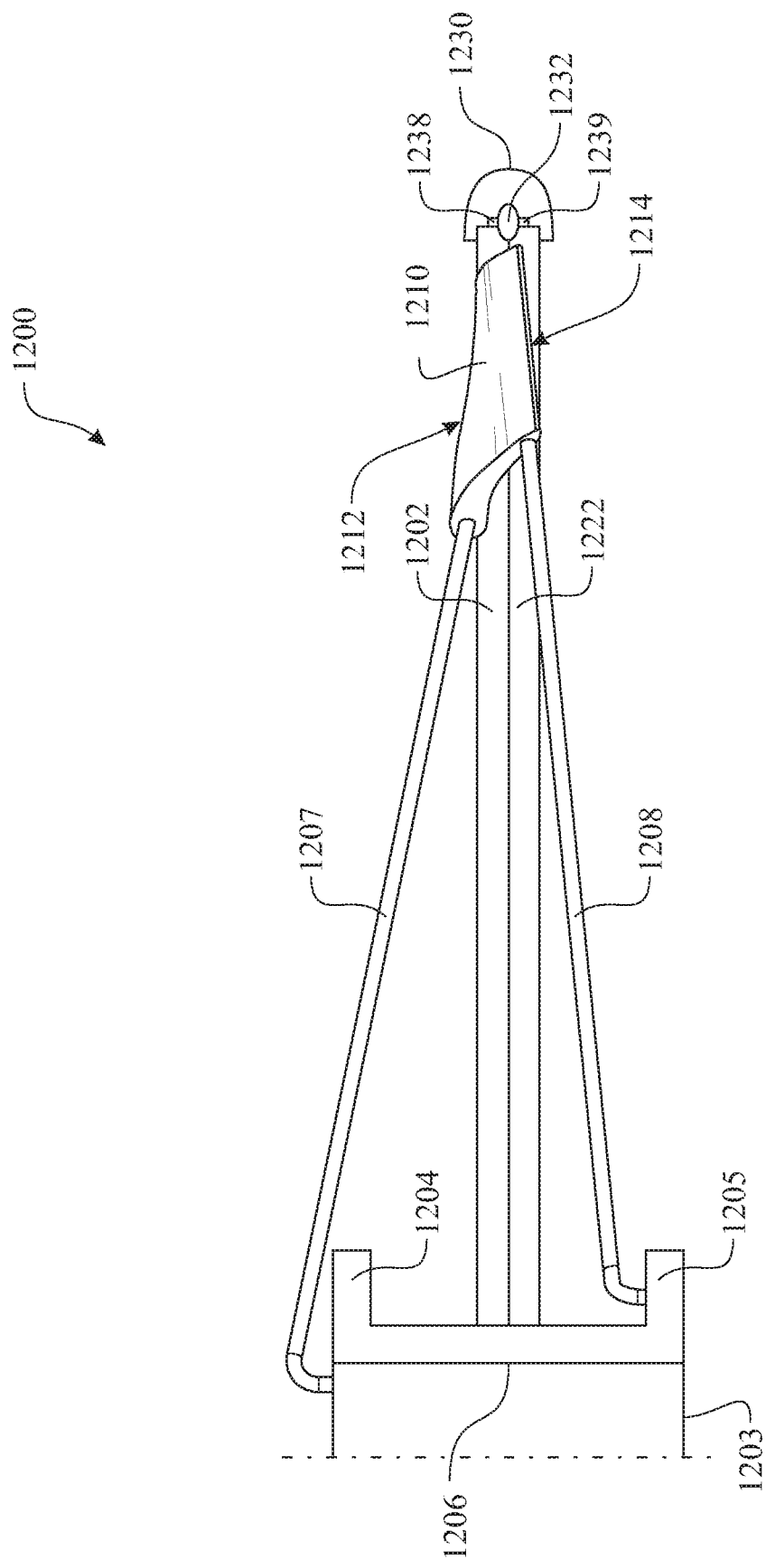
FIG. 35 presents a cross section view of an enhanced exemplary tension lifting wing wheel assembly introducing a wing angle of attack configuration, the illustration presenting a configuration having a low angle of attack.

The tension airfoil turbine or lifting wing assembly 800 and the tension airfoil turbine or lifting wing assembly 900 present configurations having fixed angles of attack. A lift angle adjusting tension lifting wing wheel assembly 1200, illustrated in FIGS. 35 and 36, introduces an enhanced version, wherein the lift angle adjusting tension lifting wing wheel assembly 1200 enables adjustability of the angle of attack of an angle adjusting wing 1210. Like features of the lift angle adjusting tension lifting wing wheel assembly 1200 and the tension airfoil turbine or lifting wing assembly 800 are numbered the same except preceded by the numeral '12'. The lift angle adjusting tension lifting wing wheel assembly 1200 introduces a pair of rims 1202, 1222. Distal ends of each tension lifting wing leading spoke 1207 are assembled to the tension lifting wing upper outer rim 1202 and distal ends of each tension lifting wing trailing spoke 1208 are assembled to the tension lifting wing first central hub assembly 1203. The axial spacing between tension lifting wing upper outer rim 1202 and the tension lifting wing first central hub assembly 1203 is controlled by engagement of a tension lifting wing angle adjusting cam 1232 against an upper outer rim axial adjusting controller feature 1238 of the tension lifting wing upper outer rim 1202 and a lower outer rim axial adjusting controller feature 1239 of the tension lifting wing first central hub assembly 1203. The tension lifting wing angle adjusting cam 1232 can be operated by any suitable rotating drive mechanism, which would preferably be located within a portion of a tension lifting wing peripheral rim 1230. The tension lifting wing peripheral rim 1230 would include features which retain the tension lifting wing upper outer rim 1202 and the tension lifting wing lower outer rim 1222 from extending beyond a predetermined separation distance. A plurality of separation mechanisms would be spaced around the tension lifting wing peripheral rim 1230 to ensure equal spacing during operation. In one application, the plurality of separation mechanisms would be substantially equally spaced around the tension lifting wing peripheral rim 1230 to ensure equal spacing during operation.

Figure 36:
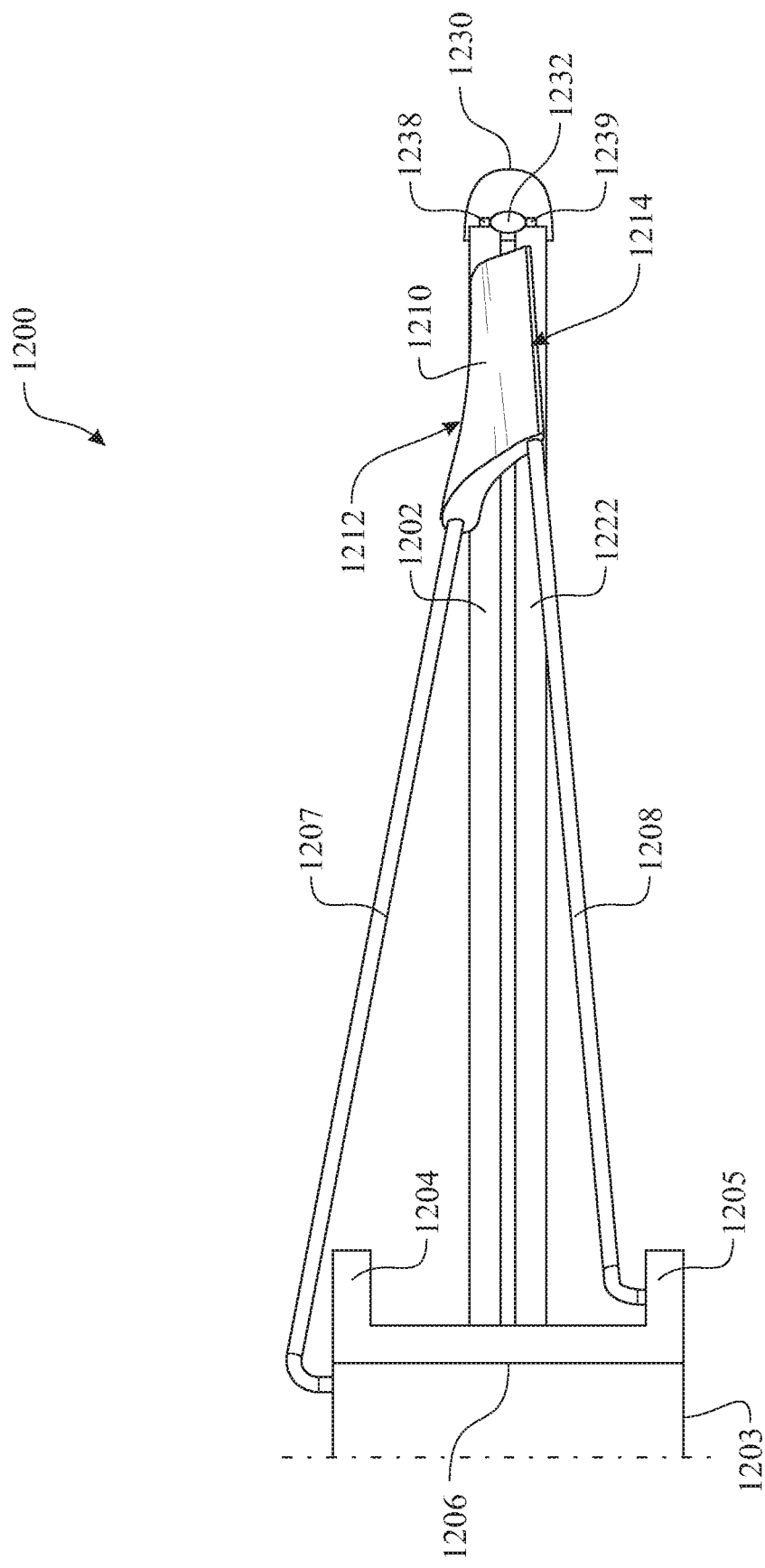
FIG. 36 presents a cross section view of the enhanced exemplary tension lifting wing wheel assembly originally introduced in FIG. 35, the illustration presenting a configuration having an increased angle of attack.

As the tension lifting wing angle adjusting cam 1232 is rotated, the tension lifting wing angle adjusting cam 1232 separates the upper outer rim axial adjusting controller feature 1238 and the lower outer rim axial adjusting controller feature 1239 from one another. The separation separates the tension lifting wing upper outer rim 1202 and the tension lifting wing lower outer rim 1222 from one another, as shown in FIG. 36. As the tension lifting wing upper outer rim 1202 and the tension lifting wing lower outer rim 1222 separate from one another, the distal distance between the tension lifting wing leading spoke 1207 and the tension lifting wing trailing spoke 1208 increases, causing the angle of attack of the angle adjusting wing 1210 to increase. With the increase of the angle of attack of the angle adjusting wing 1210, the lift increases at a lower rate of rotation of the lift angle adjusting tension lifting wing wheel assembly 1200. Although the separation mechanism employs a cam, it is understood that any mechanism that can control a distance between the tension lifting wing upper outer rim 1202 and the tension lifting wing lower outer rim 1222 can be employed.

The enhanced features of the lift angle adjusting tension lifting wing wheel assembly 1200 can be integrated into any of the previously described versions.

Although the tension airfoil turbine or lifting wing assembly 800 is detailed for use as a generally horizontally oriented lifting device, it is understood that the tension airfoil turbine or lifting wing assembly 800 can be generally vertically oriented for use as a propulsion device, for applications such as replacing or complimenting a propeller of an aircraft. The tension airfoil turbine or lifting wing assembly 800 can also be installed on an aircraft wherein the tension airfoil turbine or lifting wing assembly 800 rotates between a generally horizontal orientation and a generally vertical orientation.

In an alternative arrangement, the tension airfoil turbine or lifting wing assembly 800 can be utilized in a vertical orientation for converting wind to electrical power, wherein the tension airfoil turbine or lifting wing assembly 800 would replace the turbine wheel assembly 100, the crossover spoke turbine wheel assembly 300, the turbine blade subassembly 514, the turbine blade subassembly 614, or any other similar application. In an application where the turbine airfoil assembly 100, 300, 514, 614, 800 is used for electrical power generation, the tension airfoil turbine or lifting wing assembly 800 would be vertically oriented, rotating about a generally horizontal axis of rotation.

The turbine airfoil assembly 100, 300, 514, 614, 800 can be modified to enhance performance, while reducing the forces on the supporting structure 202, 519, 619. The airfoils 810 could impose a force upon the supporting structure 202, 519, 619 in an axial direction. The tension airfoil turbine or lifting wing assembly 800 can be modified, as illustrated as an exemplary tension airfoil turbine 1300. The tension airfoil turbine 1300 and the tension airfoil turbine or lifting wing assembly 800 include like elements, with the modifications described herein. Like elements of the tension airfoil turbine or lifting wing assembly 800 and the tension airfoil turbine 1300 are numbered the same, except elements associated with the tension airfoil turbine 1300 are preceded by the numeral "13".

Figure 37:
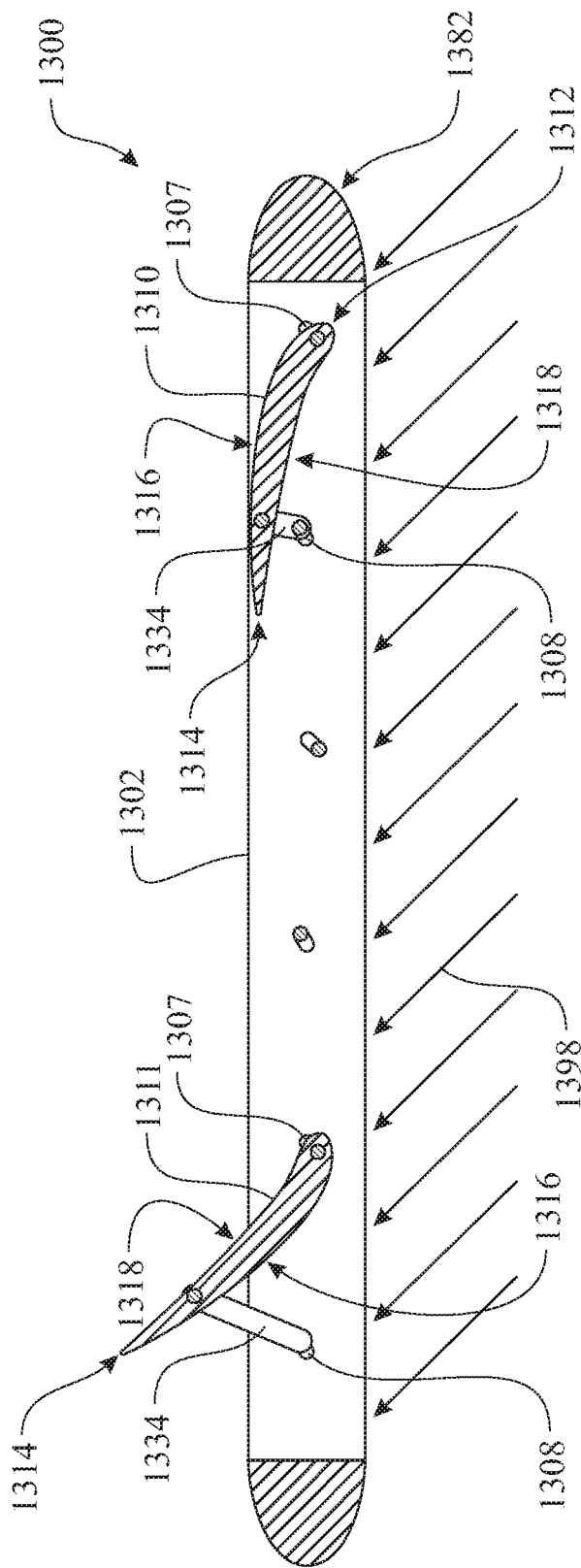
FIG. 37 presents a cross section view of a variant of the tension airfoil assembly originally introduced in FIG. 27, the illustration presenting a configuration that reduces an axial force created by lift generated during rotation of the tension airfoil assembly, wherein the axial force would be transferred to the turbine blade subassembly shaft.

The exemplary illustration presents each of the turbine blades 810 are arranged having the same orientation. It is recognized that the turbine blades 810 can be arranged in an alternating arrangement, referencing the tension airfoil turbine 1300 illustrated in FIG. 37, where a first turbine blade 1310 would be oriented with the airfoil in a first direction and a second turbine blade 1311 would be oriented with the airfoil in a second, opposite direction. In the exemplary arrangement, the convex shape of the airfoil of the first turbine blade 1310 would be facing a first radial direction and the convex shape of the airfoil of the second turbine blade 1311 would be facing a second, opposite radial direction. The advantage to this arrangement is that the turbine blade subassembly 1300 would rotate when driven by the wind, without applying an axial force to the turbine blade subassembly shaft (such as the turbine blade subassembly shaft 514 of the wind operated electrical power generating system 500). In the exemplary illustration, the angle of incidence of each turbine blade 1310, 1311 could be increased by introducing an airfoil support member 1334. The airfoil support member 1334 can be used to support the turbine blade 1310, 1311 at a region proximate a leading edge airfoil leading edge 1312, at a region proximate a trailing edge airfoil trailing edge 1314 (as shown), or both. Each of the turbine blades 1310, 1311 would be angled to accommodate a predetermined direction of wind flow 1398. The airfoil support member 1334 can be fixed or adjustable. When adjustable, the airfoil support member 1334 can be manually adjusted or adjusted using an integrated adjustment system, such as a power adjustment system (such as motor controlled), a pneumatic adjustment system, or any other suitable adjustment mechanism.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

REFERENCE ELEMENT DESCRIPTIONS

Ref No. Description
100 turbine wheel assembly
102 turbine outer rim
104 turbine central hub
106 axle bearing
108 turbine spoke
109 airflow interior region
110 turbine blades
112 blade leading edge
114 blade trailing edge
116 posterior edge
118 interior edge
120 blade leading edge pivot
122 anti-slip interface
130 incident angle controller
132 angle control cleat
134 angle control tether
140 breakaway anchor
142 breakaway clip
144 breakaway frame
150 turbine blade
152 blade leading edge
154 blade trailing edge
156 posterior edge
158 interior edge
160 turbine blade
162 blade leading edge
164 blade trailing edge
166 posterior edge
168 interior edge
198 wind flow
199 resultant blade motion
200 turbine deployment assembly
202 vertical riser support
204 electrical power generator
206 turbine wheel shaft
210 counterbalance
212 counterbalance support beam
300 crossover spoke turbine wheel assembly
302 turbine outer rim
304 turbine central hub
306 axle bearing
308 turbine spoke
309 airflow interior region
310 turbine blades
400 cable supported mast turbine assembly
410 power generating central hub assembly
412 central hub
414 hub support member
416 hub coupling member
420 mast
422 mast distal end
430 pliant turbine blade
432 rigid turbine blade
434 retracted turbine blade portion
440 mast-to-mast tension cable
442 mast-to-axle tension cable
450 electricity generating apparatus
452 generator interface
460 electricity generating apparatus
462 generator interface
464 generator mount
470 retracting mechanism
500 wind operated electrical power generating system
510 wind operated turbine assembly
512 turbine support housing
514 turbine blade subassembly
516 turbine blade
517 turbine blade outer rim surface
518 turbine blade subassembly shaft
519 vertical riser support structure
520 vertical riser support structure base section
522 vertical riser support structure rotating section
524 vertical riser support structure stabilizing column
530 turbine blade shaft supporting forward bearing assembly
532 turbine blade shaft supporting rear bearing assembly
534 vertical riser support structure base bearing assembly
536 vertical riser support structure upper stabilizing bearing assembly
540 electric generator
542 electric generator shaft
543 electric generator turbine rim engagement wheel
548 electric generator support component
549 electric output panel
550 grid tie
552 positive electrical output cable
554 negative electrical output cable
559 power grid
599 system supporting surface
600 wind operated electrical power generating system
610 wind operated turbine assembly
612 turbine housing
614 turbine blade subassembly
616 turbine blade
618 turbine blade subassembly shaft
619 vertical riser support structure
620 hydraulic pump
622 first hydraulic line
624 second hydraulic line
630 hydraulic motor
632 hydraulic motor shaft
634 hydraulic motor shaft rotational speed sensor
636 hydraulic motor shaft rotational speed sensor signal communication link
639 shaft coupling
640 electric generator
642 electric generator shaft
644 electric generator shaft rotational speed sensor
646 electric generator shaft rotational speed sensor signal communication link
649 electric output panel
650 grid tie
652 positive electrical output cable
654 negative electrical output cable
659 power grid
660 power control module
662 power control module electrical communication link
664 power controller enclosure
670 first rotational speed indicator
672 second rotational speed indicator
674 third rotational speed indicator
676 fourth rotational speed indicator
678 nth rotational speed indicator
680 first potentiometer 682 second potentiometer
684 third potentiometer
686 fourth potentiometer
688 nth potentiometer
690 transformer
699 system supporting surface
700 power output chart
702 rotational speed axis
704 power output axis
710 turbine theoretical output power curve
712 generator theoretical output power curve
714 stall point
750 power output chart
752 wind speed generated RPM axis
754 power output axis
760 current generator curve
762 turbine power curve
764 regulated generator curve
770 first RPM predetermined rotational speed
772 second RPM predetermined rotational speed
774 third RPM predetermined rotational speed
776 fourth RPM predetermined rotational speed
778 nth RPM predetermined rotational speed
780 first power output to grid tie
782 second power output to grid tie
784 third power output to grid tie
786 fourth power output to grid tie
788 nth power output to grid tie
800 tension airfoil turbine or lifting wing assembly
802 tension airfoil outer rim
803 tension airfoil central hub assembly
804 tension airfoil first central hub flange
805 tension airfoil second central hub flange
806 axle bearing
807 tension airfoil leading spoke
808 tension airfoil trailing spoke
810 airfoil
812 airfoil leading edge
813 airfoil outer edge
814 airfoil trailing edge
815 airfoil inner edge
816 airfoil upper surface
818 airfoil lower surface
882 tension airfoil outer rim aerodynamic surface
900 tension airfoil turbine or lifting wing assembly
902 tension airfoil outer rim
903 tension airfoil hub assembly
904 tension airfoil first central hub flange
905 tension airfoil second central hub flange
906 axle bearing
907 tension airfoil leading spoke
908 tension airfoil trailing spoke distal segment
909 tension airfoil trailing spoke proximal segment
910 airfoil
912 airfoil leading edge
914 airfoil trailing edge
916 airfoil upper surface
918 airfoil lower surface
922 spoke distal threading
924 spoke anchor flange
927 spoke proximal threading
928 spoke distal segment proximal threading
929 spoke proximal segment distal threading
930 spoke distal assembly tensioning nipple
932 spoke distal assembly tensioning nipple flange
934 spoke distal assembly tensioning nipple body
940 spoke distal assembly central tensioning system
942 spoke distal assembly central tensioning element
950 hub located spoke tensioning system
952 hub located spoke tensioning element
956 hub located spoke tensioning bracket
957 tensioning bracket cavity
1000 tension airfoil turbine or lifting wing assembly
1002 tension lifting airfoil outer rim
1007 tension lifting airfoil leading spoke
1008 tension lifting airfoil trailing spoke
1022 spoke distal threading
1030 tensioning nipple assembly
1032 spoke tensioning nipple body
1034 spoke tensioning nipple flange
1036 spoke tensioning nipple spoke assembly retention surface
1050 spoke tensioning breakaway assembly
1060 tensioning stud
1062 tensioning stud trunk
1064 tensioning stud flange
1066 tensioning stud flange assembly retention surface
1070 tensioning assembly first coupling element
1071 tensioning assembly second coupling element
1073 tensioning coupling element nipple flange retention surface
1074 tensioning assembly coupling element connection cavity
1076 tensioning coupling element stud flange retention surface
1084 tension lifting airfoil rim inner surface
1100 tandem rotor heavy-lift helicopter
1110 tandem rotor heavy-lift helicopter fuselage
1112 tandem rotor heavy-lift helicopter front end
1114 tandem rotor heavy-lift helicopter rear end
1120 tandem rotor heavy-lift helicopter front landing gear
1122 tandem rotor heavy-lift helicopter rear landing gear
1130 tandem rotor heavy-lift helicopter forward rotor assembly
1131 tandem rotor heavy-lift helicopter forward rotor assembly angle
1132 tandem rotor heavy-lift helicopter rearward rotor assembly
1133 tandem rotor heavy-lift helicopter rearward rotor assembly angle
1140 forward rotor drive machine
1142 rearward rotor drive machine
1144 tandem rotor heavy-lift helicopter propulsion jet
1199 landing surface
1200 lift angle adjusting tension lifting airfoil wheel assembly
1202 tension lifting airfoil upper outer rim
1203 tension lifting airfoil first central hub assembly
1204 tension lifting airfoil first central hub flange
1205 tension lifting airfoil second central hub flange
1206 axle bearing
1207 tension lifting airfoil leading spoke
1208 tension lifting airfoil trailing spoke
1210 angle adjusting airfoil
1212 angle adjusting airfoil leading edge
1214 angle adjusting airfoil trailing edge
1222 tension lifting airfoil lower outer rim
1230 tension lifting airfoil peripheral rim
1232 tension lifting airfoil angle adjusting cam
1238 upper outer rim axial adjusting controller feature
1239 lower outer rim axial adjusting controller feature
1300 tension airfoil turbine
1302 tension airfoil outer rim
1307 tension airfoil leading spoke 1308 tension airfoil trailing spoke
1310 airfoil
1312 airfoil leading edge
1314 airfoil trailing edge
1316 airfoil upper surface
1318 airfoil lower surface
1334 airfoil support member
1382 tension airfoil outer rim aerodynamic surface
1398 wind flow
R1 inner radius of rim
R2 radius of spoke hub attachment holes
R3 radial span of the spoke
H1 height of rim
C1 airfoil chord
S1 airfoil span

What is claimed is:

1. A tension airfoil assembly, comprising:
an outer rim;
a central hub assembly;
a plurality of spokes assembling the central hub assembly at a rotationally centralized position within the outer rim; and
a series of airfoils, each airfoil having an aerodynamically lifting shape extending between a leading edge and a trailing edge,
wherein a first end of each spoke is assembled to the central hub assembly and a second end of each spoke is assembled to the outer rim, a first spoke of the plurality of spokes being assembled to the central hub assembly in an arrangement extending in an acute angular direction from a radial orientation in a first direction and a second spoke of the plurality of spokes being assembled to the central hub assembly in an arrangement extending in an acute angular direction from a radial orientation in a second, opposite direction, wherein one spoke of the plurality of spokes attached to the central hub assembly crosses at least one another spoke of the plurality of spokes attached to the central hub assembly,
wherein each airfoil of the series of airfoils is assembled to the tension airfoil assembly by coupling an area of the airfoil proximate the leading edge to a leading edge spoke of the plurality of spokes and an area of the airfoil proximate the trailing edge to a trailing edge spoke of the plurality of spokes.

2. The tension airfoil assembly as recited in claim 1, wherein one spoke of the plurality of spokes crosses at least two another spokes of the plurality of spokes.

3. The tension airfoil assembly as recited in claim 1, wherein the airfoils are arranged having a gap provided between the trailing edge of each forward located airfoil and the airfoil leading edge of each trailing located airfoil.

4. The tension airfoil assembly as recited in claim 1, each airfoil having an airfoil outer edge located proximate the interior edge of the outer rim, the airfoil extending radially inward to an airfoil inner edge, wherein a distance between the airfoil outer edge and the airfoil inner edge is less than fifty percent of a radial span dimension, wherein the radial span dimension is a distance between an inner surface of the outer rim and an outer edge of the central hub assembly.

5. The tension airfoil assembly as recited in claim 1, wherein each leading edge spoke and each respective trailing edge spoke are substantially parallel with one another.

6. The tension airfoil assembly as recited in claim 1, wherein each airfoil is formed further comprising an angle of attack that changes along a radial direction.

7. The tension airfoil assembly as recited in claim 1, further comprising a tensioning mechanism, wherein the tensioning mechanism adjusts a tension within each respective spoke.

8. The tension airfoil assembly as recited in claim 1, further comprising at least one spoke breakaway feature, wherein the at least one spoke breakaway feature releases a segment of a broken spoke from the tension airfoil assembly.

9. An electrical power generating system comprising the tension airfoil assembly as recited in claim 1, the electrical power generating system further comprising a vertical riser support structure; and
an electric generator operated by rotation of an electric generator shaft,
wherein the tension airfoil assembly is rotationally supported by the vertical riser support structure in an orientation to be rotated about a generally horizontal axis,
wherein the electric generator shaft is arranged to be rotated by a rotation of the tension airfoil assembly.

10. An aircraft comprising the tension airfoil assembly as recited in claim 1, the aircraft further comprising a fuselage; and
at least one rotor drive machine supported by the fuselage,
wherein the tension airfoil assembly is rotationally driven by the at least one rotor drive machine to provide at least one of lift and propulsion to the aircraft.

11. A tension airfoil assembly, comprising:
an outer rim;
a central hub assembly having a first central hub flange spatially arranged from a second central hub flange by an axle bearing;
a plurality of spokes assembling the central hub assembly at a rotationally centralized position within the outer rim; and
a series of airfoils, each airfoil having an aerodynamically lifting shape extending between a leading edge and a trailing edge,
wherein a first end of each spoke is assembled to a respective central hub flange and a second end of each spoke is assembled to the outer rim, a first spoke of the plurality of spokes being assembled to the respective central hub flange in an arrangement extending in an acute angular direction from a radial orientation in a first direction from a first side of the respective central hub flange and a second spoke of the plurality of spokes being assembled to the respective central hub flange in an arrangement extending in an acute angular direction from a radial orientation in a second direction from a second side of the respective central hub flange, wherein one spoke of the plurality of spokes attached to the respective central hub flange crosses at least one another spoke of the plurality of spokes attached to the same respective central hub flange, wherein each airfoil of the series of airfoils is assembled to the tension airfoil assembly by coupling an area of the airfoil proximate the leading edge to a leading edge spoke of the plurality of spokes and an area of the airfoil proximate the trailing edge to a trailing edge spoke of the plurality of spokes.

12. The tension airfoil assembly as recited in claim 11, wherein one spoke of the plurality of spokes attached to the respective central hub flange crosses at least two another spokes of the plurality of spokes attached to the same respective central hub flange.

13. The tension airfoil assembly as recited in claim 11, wherein the airfoils are arranged having a gap provided between the wing trailing edge of each forward located airfoil and the airfoil leading edge of each trailing located airfoil.

14. The tension airfoil assembly as recited in claim 11, each airfoil having an airfoil outer edge located proximate the interior edge of the outer rim, the airfoil extending radially inward to an airfoil inner edge, wherein a distance between the airfoil outer edge and the airfoil inner edge is less than fifty percent of a radial span dimension, wherein the radial span dimension is a distance between an inner surface of the outer rim and an outer edge of the respective central hub flange.

15. The tension airfoil assembly as recited in claim 11, wherein each leading edge spoke and each respective trailing edge spoke are substantially parallel with one another.

16. The tension airfoil assembly as recited in claim 11, wherein each airfoil is formed further comprising an angle of attack that changes along a radial direction.

17. The tension airfoil assembly as recited in claim 11, further comprising a tensioning mechanism, wherein the tensioning mechanism adjusts a tension within each respective spoke.

18. The tension airfoil assembly as recited in claim 11, further comprising at least one spoke breakaway feature, wherein the at least one spoke breakaway feature releases a segment of a broken spoke from the tension airfoil assembly.

19. An electrical power generating system comprising the tension airfoil assembly as recited in claim 11, the electrical power generating system further comprising a vertical riser support structure; and
   an electric generator operated by rotation of an electric generator shaft,
   wherein the tension airfoil assembly is rotationally supported by the vertical riser support structure in an orientation to rotated about a generally horizontal axis,
   wherein the electric generator shaft is arranged to be rotated by a rotation of the tension airfoil assembly.

20. An aircraft comprising the tension airfoil assembly as recited in claim 11, the aircraft further comprising a fuselage; and
   at least one rotor drive machine supported by the fuselage,
   wherein the tension airfoil assembly is rotationally driven by the at least one rotor drive machine to provide at least one of lift and propulsion to the aircraft.

\* \* \* \* \*